(12) United States Patent
Palmer

(10) Patent No.: US 12,466,971 B2
(45) Date of Patent: Nov. 11, 2025

(54) PLANT CHAR COLORANTS

(71) Applicant: Nature Coatings Inc., Los Angeles, CA (US)

(72) Inventor: Stephanie Jane Palmer, Los Angeles, CA (US)

(73) Assignee: Nature Coatings Inc., Los Angeles, CA (US)

( * ) Notice: Subject to any disclaimer, the term of this patent is extended or adjusted under 35 U.S.C. 154(b) by 737 days.

(21) Appl. No.: 17/640,869

(22) PCT Filed: Sep. 25, 2020

(86) PCT No.: PCT/US2020/052929
§ 371 (c)(1),
(2) Date: Mar. 7, 2022

(87) PCT Pub. No.: WO2021/062312
PCT Pub. Date: Apr. 1, 2021

(65) Prior Publication Data
US 2022/0348782 A1    Nov. 3, 2022

Related U.S. Application Data

(60) Provisional application No. 62/907,411, filed on Sep. 27, 2019.

(51) Int. Cl.
*C09D 17/00* (2006.01)
*C09D 7/45* (2018.01)
*C09D 7/63* (2018.01)
*C09D 7/65* (2018.01)

(52) U.S. Cl.
CPC ............ *C09D 17/004* (2013.01); *C09D 7/45* (2018.01); *C09D 7/63* (2018.01); *C09D 7/65* (2018.01)

(58) Field of Classification Search
CPC .......... C09D 17/004; C09D 7/45; C09D 7/63; C09D 7/65; C09D 11/08; C09D 11/107; C09D 11/324; C09D 11/037; Y02E 50/10; Y02E 50/30; C10B 53/02
See application file for complete search history.

(56) References Cited

U.S. PATENT DOCUMENTS

| | | |
|---|---|---|
| 6,991,189 B2 | 1/2006 | Hahn et al. |
| 8,361,186 B1 | 1/2013 | Shearer et al. |
| 9,718,689 B2 | 8/2017 | Miller et al. |

(Continued)

FOREIGN PATENT DOCUMENTS

| | | |
|---|---|---|
| CN | 102443260 B | 4/2013 |
| CN | 108587083 A | 9/2018 |

(Continued)

OTHER PUBLICATIONS

Beilum Carbon, "The jetness of Pigment Carbon Black" (Year: 2023).*

(Continued)

*Primary Examiner* — Stefanie J Cohen
*Assistant Examiner* — Jialan Zhang
(74) *Attorney, Agent, or Firm* — Luedeka Neely PC

(57) ABSTRACT

Described herein are methods, and compositions for use in the coloration of materials. The compositions described herein are black pigments derived primarily from recently-living plants or animals and are therefore renewable.

16 Claims, 31 Drawing Sheets

(56) References Cited

U.S. PATENT DOCUMENTS

| | | | |
|---|---|---|---|
| 10,494,501 B2 | 12/2019 | Kander | |
| 10,532,931 B2 | 1/2020 | Walter et al. | |
| 10,619,102 B2 | 4/2020 | Sunderland | |
| 2003/0105213 A1* | 6/2003 | Hayashi | C09D 7/62 |
| | | | 524/495 |
| 2012/0302658 A1 | 11/2012 | Vanbesien et al. | |
| 2013/0053454 A1 | 2/2013 | Heiskanen et al. | |
| 2015/0064491 A1 | 3/2015 | Phipps et al. | |
| 2015/0252201 A1 | 9/2015 | Ortalano et al. | |
| 2016/0174605 A1 | 6/2016 | Dube et al. | |
| 2017/0058127 A1 | 3/2017 | Veettil | |
| 2017/0204017 A1 | 7/2017 | Bontchev et al. | |
| 2017/0245494 A1 | 8/2017 | Bardosh et al. | |
| 2017/0260399 A1* | 9/2017 | Holzinger | C09D 11/30 |
| 2019/0276320 A1 | 9/2019 | Decker | |
| 2020/0140692 A1* | 5/2020 | Albers | C01B 32/318 |
| 2020/0339818 A1 | 10/2020 | Benisch | |
| 2020/0339832 A1 | 10/2020 | Sunderland | |

FOREIGN PATENT DOCUMENTS

| | | | |
|---|---|---|---|
| GB | 2562557 A | * | 11/2018 |
| JP | 2010248313 A | | 11/2010 |
| JP | 2012240919 A | | 12/2012 |
| JP | 2012097151 B | | 10/2014 |
| JP | 5625755 B | | 11/2014 |
| JP | 2017008275 B | | 4/2017 |
| JP | 2019035091 B | | 3/2020 |

OTHER PUBLICATIONS

Surfynol CT-171 "https://coatings.specialchem.com/product/a-evonik-surfynol-ct-171" (Year: 2025).*

Maxwell et al., book chapter "Water based dispersants—the high performance challenge", Aug. 6, 2003 (Year: 2003).*

Hulse, V., "Biochar as a Substitute for Carbon Black in Lithographic Ink Production," Rochester Institute of Technology, Apr. 2017, pp. 1-31.

Krauss, K., "Black—the Fine Details," European Coatings Journal, May 2019, pp. 38-44.

Medalia, A.I., Richards, L. W., "Tinting Strength of Carbon Black," Journal of Colloid and Interface Science, vol. 40, No. 2, Aug. 1972, pp. 233-252.

Steven T. Barber and Thomas A. Trabold (PI), Golisano Institute for Sustainability, Rochester Institute of Technology, Waste Paper Derived Biochar for Sustainable Printing Products, Final Report Period of Performance: May 16, 2016-Dec. 31, 2017, Rochester, NY.

* cited by examiner

Spectrum 1

Spectrum 2

Spectrum 3

Spectrum 4

Spectrum 5

Spectrum 6

PLANT CHAR COLORANTS

RELATED APPLICATIONS

This application claims priority to Patent Cooperation Treaty (PCT) Patent Application No. PCT/US20/52929 filed Sep. 25, 2020 entitled: "PLANT CHAR CARBON PIGMENTS AND LIQUID DISPERSIONS THEREOF" which claims priority to U.S. provisional application Ser. No. 62/907,411, entitled "PLANT CHAR CARBON PIGMENTS AND LIQUID DISPERSIONS THEREOF" filed Sep. 27, 2019.

FIELD

Black pigments for use in inks, paints, coatings, resins and print pastes.

BACKGROUND

Black pigments for use in inks, paints, coatings, resins and print pastes are primarily derived from petroleum. There remains a need to derive high quality and comparable black pigments from renewable sources. For decades, pigment manufacturers have been trying to create high quality pigment dispersions with charcoal-type materials and have been unsuccessful. Prior to working with the present Applicant, a major pigment manufacturer attempted to create dispersions of carbonaceous particles derived from biochar. They were unsuccessful in creating a product that met industry standards. Indeed, they said it was not possible. Other pigment manufacturers have also tried and have said that at best it is only possible to achieve a weak tint strength from charcoal-type materials. Compositions meeting industry and these manufacturer's standards of excellence have been achieved using the chemistry and processes disclosed herein.

SUMMARY

The compositions and methods described herein pertain to black pigments for coloration. More specifically, disclosed herein is a pigment dispersion formulation that includes carbonaceous particulate matter derived from biochar and a dispersant. In some embodiments, the biochar is a wood biochar.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
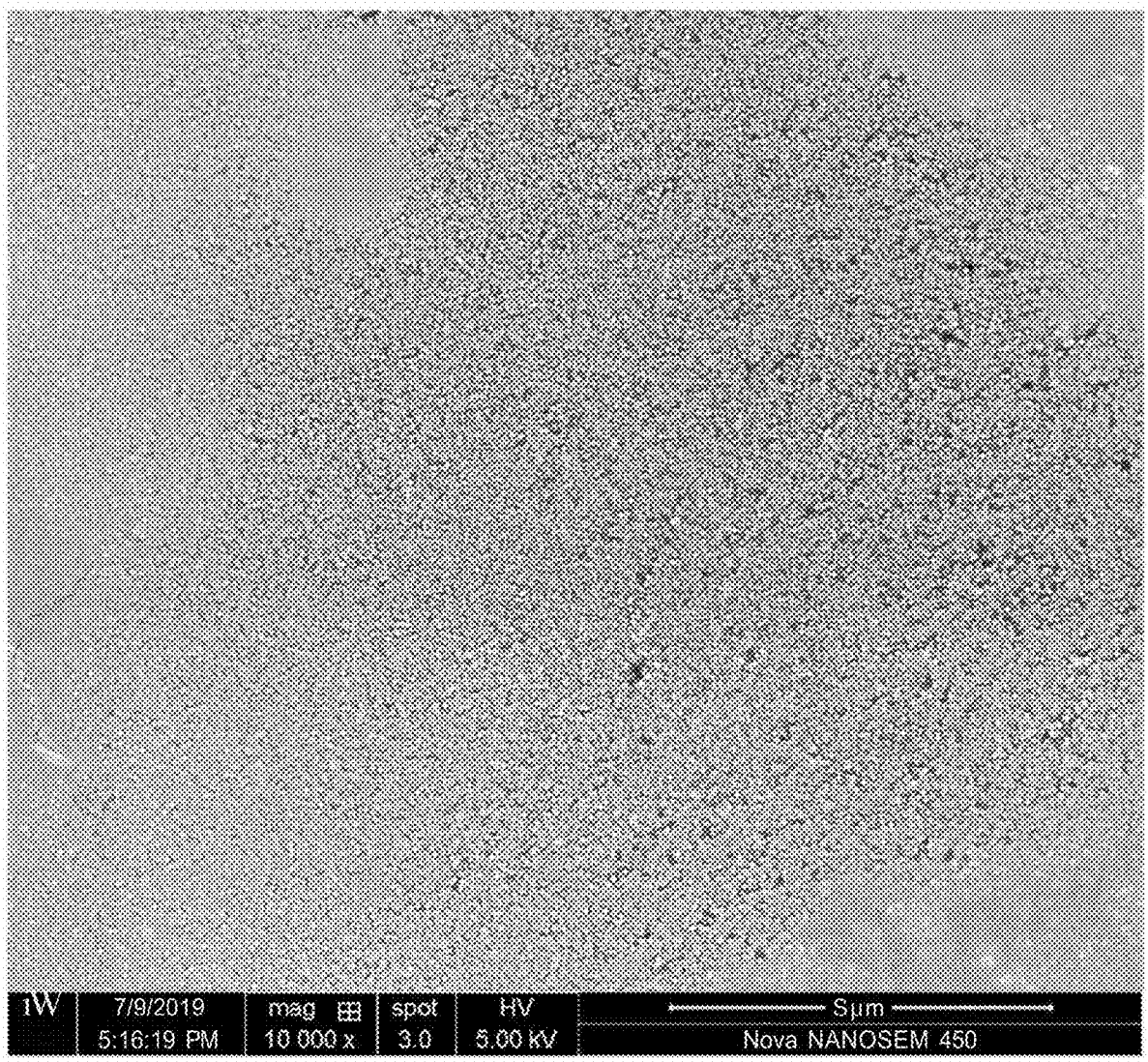
FIG. 1A shows a scanning electron microscope image at a magnification of 10,000× from a Sputtering Process illustrating a randomized sample of pigment particles that have been milled with a fluid and dried.

As used herein, the term "about" refers to an amount that is near the stated amount by 10%, 5%, or 1%, including increments therein. The term "about" refers to the value or range of values following the term. For example, "about 1-2" and "about 1 to 2" is meant be construed as "about 1 to about 2." Similarly, the term "between about 1 and 2" is meant to be construed as "between about 1 and about 2."

Various embodiments may specify information about the weights of certain components (such as pigment particles or a dispersant) and the weight of a total composition (such as a dispersion) containing such component(s). In some instances, a subscript may be used to designate the portion being referenced. For example, $W_P$ may be used to refer to the weight of particles, $W_D$ may be used to express the weight of dispersant, and $W_T$ may be used to express the total weight of the composition. In some instances, a fraction with subscripted designations may be used, such as $W_P/W_T$, and the fractional value may be multiplied by 100 to be expressed as a weight percentage, such as "60% $W_P/W_T$." When a weight percentage of a component of a composition is expressed herein without explicit reference to the relevant comparator, such as "the [designated component] is present in 10% by weight," it means the designated component is 10% of the total weight of the composition. Likewise, when a weight percentage of a chemical element or compound (such as ash content) in a designated component (such as plant char feedstock) is expressed without reference to the relevant comparator, it means that the designated element or compound is present as a percent of the total weight of the designated component.

Pigments have been used for millennia for artistic, functional and decorative purposes, dating back to cave paintings and continuing to the present day. The technology discussed herein pertains to pigments for black colorations. Black is a color, the perception of which is evoked by the total absence of light that stimulates any of the three types of color sensitive cone cells in the human eye and that has very low brightness compared to the surroundings. A true black visual stimulation is void of hue and grayness. Black is the darkest possible color. Prehistoric painters typically used charcoal from wood or animal bones that was partially combusted for gray or near black coloration. In modern times similar pigments are also prepared by partial combustion or pyrolysis of vegetable and fruit wastes, bone, horn, ivory, and similar materials. Pyrolysis involves placing the material in a chamber and heating it in the presence of little or no oxygen. Described herein are materials derived from recently-living plants or animals are referred to as "char(s)" or "biochar(s)."

In contrast with chars, petroleum carbon black is a pigment derived from petroleum or natural gas. Petroleum carbon black, also called lamp black, pigment black, soot or black carbon, is used for black colorations. Petroleum carbon black is a fine particle carbon pigment obtained as soot from the incomplete combustion of many different types of products, such as natural gas, or oil. Petroleum carbon black is usually a fine, soft, black powder. It is very stable and unaffected by light, acids and alkalis. It is commonly used in printing inks, dope dyes and in Chinese ink sticks. Petroleum carbon black is used as a pigment in coatings, rubber, plastics, paints, carbon paper, and crayons. Some additional synonyms for petroleum carbon black pigment are Channel black; lampblack; Pigment Black 6 or 7; CI 77266; gas black; diamond black; smoke black; soot black; flame black; furnace black; acetylene black; thermal black; graphite; charcoal black; coal black; sumi (Jap.); hiilimusta (Fin.); nero di carbone (It.); noir de carbone (Fr.)." Various standard petroleum carbon blacks have been defined by the American Society for Testing and Materials (ASTM). For example: ASTM D209-81(2012) Standard Specification for Lampblack Pigment; ASTM D210-05(2011) Standard Specification for Bone Black Pigment; ASTM D561-82(2014) Standard Specification for Carbon Black Pigment for Paint; ASTM D769-01(2012) Standard Specification for Black Synthetic Iron Oxide.

Black pigments may be prepared from chars or petroleum carbon black. Chars are renewable sources of pigments, which is a desirable trait from an ecological and sustainable perspective. However, historical or modern implementations of chars generally do not provide a pigment with properties comparable to the coloration properties provided by petroleum carbon black. Difficulties specific to char include the creation of uniform submicron particles, the creation of dispersions, and the creation of spherical particles. Described herein are char pigment dispersion formulations with properties comparable to petroleum carbon black dispersion formulations that avoid the deleterious aspects of the production and use of petroleum carbon black.

Polycyclic aromatic hydrocarbons (PAHs) are a class of chemicals of which long-term exposure to low levels of some PAHs have caused cancer in laboratory animals. PAHs occur naturally in coal, crude oil, and gasoline. They also are produced when coal, oil, gas, wood, garbage, and tobacco are burned. Consequently, it would be expected that PAHs would be present in biochar feedstock. It is also expected that PAHs present in biochar feedstock would be retained in pigment dispersion formulations comprising carbonaceous particulate matter derived from biochar. The most efficient way to reduce the presence of PAHs in such dispersions is to utilize biochar that has minimal PAH content. In some embodiments, the polycyclic aromatic hydrocarbons are present in biochar feedstock (and presumably in carbonaceous particulate matter derived from such feedstock) in a concentration of less than about 50 mg/kg. In some embodiments, the polycyclic aromatic hydrocarbons are present in in the biochar at a concentration of less about 10 mg/kg or at a concentration that is undetectable. It is quite unexpected that PAH concentrations would be this low in pyrolysis or thermal decomposition of carbohydrate materials such as a biochar.

Pigment Compositions Derived from Pigment Dispersion Formulations

The pigment compositions described herein comprise particles. Randomized samples of pigment particles are obtained by taking a sample from a substantially uniformly-mixed liquid pigment dispersion. The particles may be characterized by a particle number, size, size distribution, surface area, shape, surface texture or any combination thereof. Observed characteristics can vary with measurement technique. Described herein are multiple techniques for the measurement of certain characteristics. For example, average diameter of particle size is described herein with respect to a variety of measurement techniques including Scanning Electron Microscope (SEM) imagery, Scanning Transmission Electron Micrography (STEM) imagery, Dynamic Light Scattering (DLS), and Laser Scattering (LS), or image analysis software such as ImageJ. The term "STEM" as used herein is a generalized term that refers to generic scanning transmission electron micrography as well as micrography using a "Lacey STEM process" and micrography using a "STEM Process" as defined herein.

Characterization

In some embodiments a randomized sample of particles is measured. In some embodiments, the diameters of particles of carbonaceous matter derived from biochar are measured on a scanning transmission electron micrography (STEM) two-dimensional micrograph with a magnification of at least 50,000×. In some embodiments the particles are measured by spatial analysis on a two-dimensional micrograph from a Lacey STEM process with a magnification of at least 50,000×. In some embodiments the confidence interval is calculated for a 90% confidence level. In some embodiments the confidence level is calculated at a 95% confidence level. In some embodiments the confidence interval is calculated at a 97.5% confidence level. In some embodiments, about 80% of the particles by number, or at least 100 particles, have a mean diameter that is less than about 1000 nm. In some embodiments, about 80% of the particles by number, or at least 100 particles, have a mean diameter that is less than about 900 nm. In some embodiments, about 80% of the particles by number, or at least 100 particles, have a mean diameter that is less than about 800 nm. In some embodiments, about 80% of the particles by number, or at least 100 particles, have a mean diameter that is less than about 700 nm. In some embodiments, about 80% of the particles by number, or at least 100 particles, have a mean diameter that is less than about 600 nm. In some embodiments, about 80% of the particles by number, or at least 100 particles, have a mean diameter that is less than about 500 nm. In some embodiments, about 80% of the particles by number, or at least 100 particles, have a mean diameter that is less than about 400 nm. In some embodiments, about 80% of the particles by number, or at least 100 particles, have a mean diameter that is less than about 300 nm. In some embodiments, about 80% of the particles by number, or at least 100 particles, have a mean diameter that is less than about 200 nm. Disclosed herein is a pigment composition having particles derived from biochar where at least about 80% of the particles by number, or at least 100 particles, have a mean diameter that is less than about 100 nm. In some embodiments, about 80% of the particles by number, or at least 100 particles, have a mean diameter that is less than about 50 nm. In some embodiments, about 80% of the particles by number, or at least 100 particles, have a mean diameter that is less than about 25 nm. In some embodiments about 80% of the particles by number, or at least 100 particles, have a mean diameter that is in a range between 1000 nm and 25 nm including all ranges subsumed therein. In some embodiments, about 95% of the particles by number, or at least 100 particles, have a mean diameter that is less than about 1000 nm. In some embodiments, about 95% of the particles by number, or at least 100 particles, have a mean diameter by number, or at least 100 particles, that is less than about 900 nm. In some embodiments, about 95% of the particles by number, or at least 100 particles, have a mean diameter that is less than about 800 nm. In some embodiments, about 95% of the particles by number, or at least 100 particles, have a mean diameter that is less than about 700 nm. In some embodiments, about 95% of the particles by number, or at least 100 particles, have a mean diameter that is less than about 600 nm. In some embodiments, about 95% of the particles by number, or at least 100 particles, have a mean diameter that is less than about 500 nm. In some embodiments, about 95% of the particles by number, or at least 100 particles, have a mean diameter that is less than about 400 nm. In some embodiments, about 95% of the particles by number, or at least 100 particles, have a mean diameter that is less than about 300 nm. In some embodiments, about 95% of the particles by number, or at least 100 particles, have a mean diameter that is less than about 200 nm. In some embodiments, about 95% of the particles by number, or at least 100 particles, have a mean diameter that is less than about 50 nm. In some embodiments, about 95% of the particles by number, or at least 100 particles, have a mean diameter that is less than about 50 nm. In some embodiments, about 95% of the particles by number, or at least 100 particles, have a mean diameter that is less than about 25 nm. In some embodiments, about 95% of the particles by number, or at least 100 particles, have a mean diameter that is in a range between 15-25 nm. In some embodiments, about 80% of the particles by number, or at least 100 particles, have a mean diameter that is within a range between about 0.1 nm and 1000 nm and all ranges subsumed therein. In some embodiments, about 80% of the particles by number, or at least 100 particles, have a mean diameter that is within a range between about 0.1 nm and 500 nm. In some embodiments, about 80% of the particles by number, or at least 100 particles, have a mean diameter that is within a range between about 1 nm and 300 nm. In some embodiments, about 80% of the particles by number, or at least 100 particles, have a mean diameter that is within a range between about 1 nm and 200 nm. In some embodiments, about 80% of the particles by number, or at least 100 particles, have a mean diameter that is within a range between about 1 nm and 100 nm. In some embodiments, about 80% of the particles by number, or at least 100 particles, have a mean diameter that is within a range between about 10 nm and 50 nm. In some embodiments, about 80% of the particles by number, or at least 100 particles, have a mean diameter that is within a range between about 50 nm and 100 nm. In some embodiments, about 80% of the particles by number, or at least 100 particles, have a mean diameter that is within a range between about 15 nm and 25 nm. In some embodiments, about 90% of the particles by number, or at least 100 particles, have a mean diameter that is within a range between about 0.1 nm and 1000 nm including all ranges subsumed therein. In some embodiments, about 90% of the particles by number, or at least 100 particles, have a mean diameter that is within a range between about 0.1 nm and 500 nm. In some embodiments, about 90% of the particles by number, or at least 100 particles, have a mean diameter that is within a range between about 1 nm and 300 nm. In some embodiments, about 90% of the particles by number, or at least 100 particles, have a mean diameter that is within a range between about 1 nm and 200 nm. In some embodiments, about 90% of the particles by number, or at least 100 particles, have a mean diameter that is within a range between about 1 nm and 100 nm. In some embodiments, about 90% of the particles by number, or at least 100 particles, have a mean diameter that is within a range between about 10 nm and 50 nm. In some embodiments, about 90% of the particles by number, or at least 100 particles, have a mean diameter that is within a range between about 50 nm and 100 nm. In some embodiments, about 90% of the particles by number, or at least 100 particles, have a mean diameter that is within a range between about 15 nm and 25 nm. In some embodiments, about 95% of the particles by number, or at least 100 particles, have a mean diameter that is within a range between about 0.1 nm and 1000 nm including all ranges subsumed therein. In some embodiments, about 95% of the particles by number, or at least 100 particles, have a mean diameter that is within a range between about 0.1 nm and 500 nm. In some embodiments, about 95% of the particles by number, or at least 100 particles, have a mean diameter that is within a range between about 1 nm and 300 nm. In some embodiments, about 95% of the particles by number, or at least 100 particles, have a mean diameter that is within a range between about 1 nm and 200 nm. In some embodiments, about 95% of the particles by number, or at least 100 particles, have a mean diameter that is within a range between about 1 nm and 100 nm. In some embodiments, about 95% of the particles by number, or at least 100 particles, have a mean diameter that is within a range between about 10 nm and 50 nm. In some embodiments, about 95% of the particles by number, or at least 100 particles, have a mean diameter that is within a range between about 50 nm and 100 nm. In some embodiments, about 95% of the particles by number, or at least 100 particles, have a mean diameter that is within a range between about 15 nm and 25 nm. In some embodiments, about 99.7% of the particles by number, or at least 100 particles, have a mean diameter that is within a range between about 0.1 nm and 1000 nm including all ranges subsumed therein. In some embodiments, about 99.7% of the particles by number, or at least 100 particles, have a mean diameter that is within a range between about 0.1 nm and 500 nm. In some embodiments, about 99.7% of the particles by number, or at least 100 particles, have a mean diameter that is within a range between about 1 nm and 300 nm. In some embodiments, about 99.7% of the particles by number, or at least 100 particles, have a mean diameter that is within a range between about 1 nm and 200 nm. In some embodiments, about 99.7% of the particles by number, or at least 100 particles, have a mean diameter that is within a range between about 1 nm and 100 nm. In some embodiments, about 99.7% of the particles by number, or at least 100 particles, have a mean diameter that is within a range between about 10 nm and 50 nm. In some embodiments, about 99.7% of the particles by number, or at least 100 particles, have a mean diameter that is within a range between about 50 nm and 100 nm. In some embodiments, about 99.7% of the particles by number, or at least 100 particles, have a mean diameter that is within a range between about 15 nm and 25 nm. In some embodiments about 80% to about 99.7% of the particles by number, or at least 100 particles, have a mean diameter that is in a range from about 0.1 nm and 1000 nm including all ranges subsumed therein.

In some embodiments, a distribution of particle sizes is obtained from a randomized sample. Once a randomized sample has been obtained, the particle sizes are estimated and then the distribution of particle sizes is described. Often the terms D10, D50, and D90 are used to describe a particle size distribution. The D10 diameter has ten percent of the particles smaller and ninety percent larger. D50 is the median diameter where fifty percent of the particles are larger and 50% are smaller. D90 defines the diameter where ninety percent of the distribution has a smaller particle size and ten percent has a larger particle size. A three-point specification featuring the D10, D50, and D90 diameters is considered complete and appropriate for most particulate materials. How these points are expressed may vary. Some specifications use a format where the D10, D50, and D90 must not be more than (NMT) a stated size. For example: a particle size distribution may be described as D10 NMT 20 µm; D50 NMT 80 µm and D90 NMT 200 µm. Although only one size is stated for each point there is an implied range of acceptable sizes (i.e. the D50 passes if between 20 and 80 µm). Alternatively, a range of values may be explicitly stated. For example: D10 10-20 µm; D50 70-80 µm; and D90 180-200 µm.

In some embodiments, an error-band is included. The term "total error band" is used herein to specify all sources of including sampling and sample preparation calculated at a 95% confidence level. An example is: D50 NMT 100 µm with a total error band of +/−5% on size. Other statistics are sometimes used to describe a particle size distribution. The most common calculations are standard deviation and variance. The standard deviation (St Dev.). The standard deviation specification defines the diameter where approximately 68.27% of the total population lies within +/−1 St Dev, and 95.45% lies within +/−2 St Dev.

In some embodiments, the distribution of particle sizes is determined by laser scattering measurements. Disclosed herein is a pigment composition having particles derived from biochar, where the D90 particle size equal to or less than about 1 micron as determined by laser scattering measurements. In some embodiments the D90 particle size is between about 100 nm to 1 about micron as determined by laser scattering measurements. In some embodiments, the D90 particle size equal to or less than about 950 nm. In some embodiments, the D90 particle size equal to or less than about 900 nm. In some embodiments, the D90 particle size equal to or less than about 800 nm. In some embodiments, the D90 particle size equal to or less than about 700 nm. In some embodiments, the D90 particle size equal to or less than about 600 nm. In some embodiments, the D90 particle size equal to or less than about 500 nm. In some embodiments, the D90 particle size equal to or less than about 400 nm. In some embodiments, the D90 particle size equal to or less than about 300 nm. In some embodiments, the D90 particle size equal to or less than about 200 nm. In some embodiments, the D90 particle size equal to or less than about 100 nm. In some embodiments, the D90 particle size equal to or less than about 50 nm. In some embodiments, the D90 particle size equal to or less than about 25 nm. In some embodiments, the D90 particle size is between about 500 nm and 1 micron. In some embodiments, the D90 particle size is between about 400 nm and 1 micron. In some embodiments, the D90 particle size is between about 300 nm and 900 nm. In some embodiments, the D90 particle size is between about 200 nm and 800 nm. In some embodiments, the D90 particle size is between about 300 nm and 500 nm. In some embodiments, the D90 particle size is between about 400 nm and 800 nm. In some embodiments, the D90 particle size is about 1 nm to about 1,000 nm. In some embodiments, the D90 particle size is at least about 1 nm. In some embodiments, the D90 particle size is about 1 nm to about 1,000 nm including all ranges subsumed therein. In some embodiments, the D50 particle size is between about 100 nm and 900 nm including all ranges subsumed therein.

Uniformity of pigment particle size is important because it stabilizes the fluid flow characteristics of inks, paints, coatings, resins and print pastes, and because uniformity is important for the consistency and quality of a pigment's coloration and tinting strength properties. In many applications it is desirable to have the distribution of particle size characterized as "monodispersive" or close to monodispersive. A monodispersive distribution is a distribution where all of the particles have substantially the same size. When Dynamic Light Scattering (DLS) is used to estimate size distribution, the variation in particle size is often expressed as a polydispersity index (PDI) which is calculated as (stddev/mean)$^2$. For nanoparticles, it is commonly understood that a distribution is "monodisperse" when the PDI is under 0.05. In some embodiments of pigment compositions comprising particles derived from biochar disclosed herein the PDI values are between 0.1 and 0.2. While this uniformity is not strictly indicative of a monodisperse nanoparticle distribution, it is indicative of sufficient particle size uniformity to be characterized as near monodispersive and to meet the requirements for many inks, paints, coatings, resins and print pastes. Other analytical techniques may be used to assess the monodispersive nature of particles. For example, images from a scanning transmission electron microscope may be analyzed by various means including image analysis software such as ImageJ to estimate of the variation in the particle sizes and assess their monodispersive characteristics.

STEM images acquired using the Lacey STEM protocol may be used to estimate the variation in particle sizes and spheroidal nature of a randomized sample of particles. The prescribed method of particle size estimation for embodiments disclosed in STEM images herein is referred to as the "Geometry Protocol." The Geometry Protocol may be used to estimate the diameter of particles in the image. A particle having circularity value of 1.0 indicates a perfect circle. As the value approaches 0.0, it indicates an increasingly elongated polygon. Since the particles are at rest and in a random orientation the circularity measurement accurately indicates how spheroidal the particles are. An example of image analysis software that may be used for this purpose is "ImageJ" software available from the U.S. National Institutes of Health (https://imagej.nih.gov/ij/). The following steps constitute the Geometry Protocol:
  a. Using the Lacey STEM protocol, acquire an image of a randomized sample a dispersion of carbonaceous particles derived from biochar.
  b. Utilize ImageJ or equivalent software to measure the diameter of at least 100 particles in the image.
  c. Utilize the ImageJ or equivalent software to measure the circularity of the at least 100 particles in the image.
  d. Utilize statistical software to calculate the mean diameter of the at least 100 particles.
  e. Utilize statistical software to calculate the standard deviation of the mean diameter of the at least 100 particles.
  f. Utilize statistical software to calculate the mean circularity of the at least 100 particles.
  g. Utilize statistical software to calculate the standard deviation of the mean circularity of the at least 100 particles.

Figure 27:
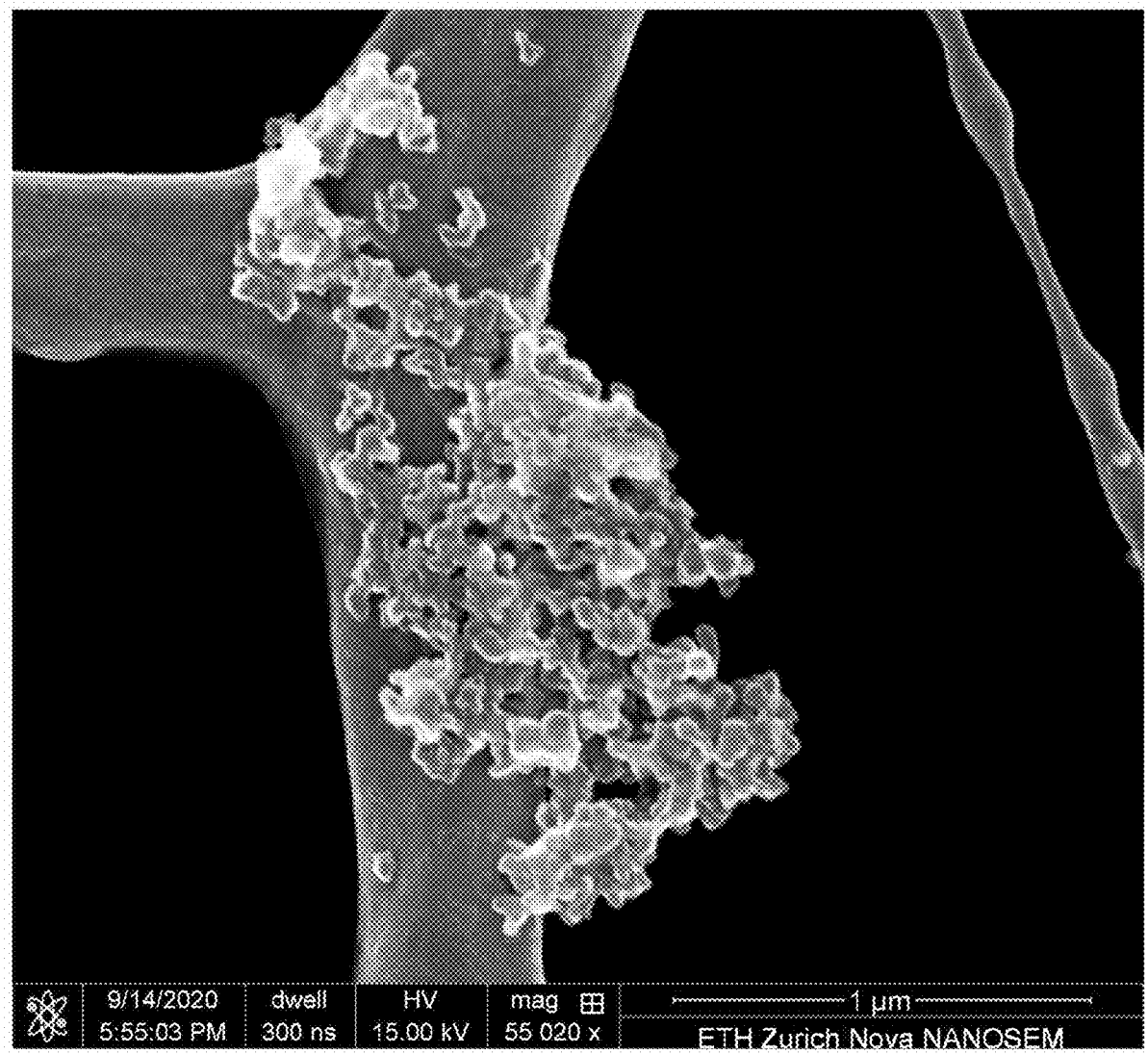
FIG. 27 shows a scanning transmission electron microscope image from a Lacey STEM Process illustrating particles from Formulation 11 disclosed herein.

A sample of pigment particles in a dispersion formulation comprising carbonaceous particles matter derived from biochar as disclosed herein was evaluated according to the Geometry Protocol. That sample is illustrated in FIG. 27. The results were as follows:

|  | Biochar Sample |
|---|---|
| Mean diameter of 100 particles (μm) | 0.0586087 |
| Standard deviation of the diameter of the 100 particles | 0.0103 |
| Mean circularity of the at least 100 particles | 0.824 |
| Standard deviation as a % of mean diameter | 17.6% |
| Standard deviation of the mean circularity of the 100 particles | 0.2387087 |
| Standard deviation as a % of mean circularity | 28.97% |

Figure 28:
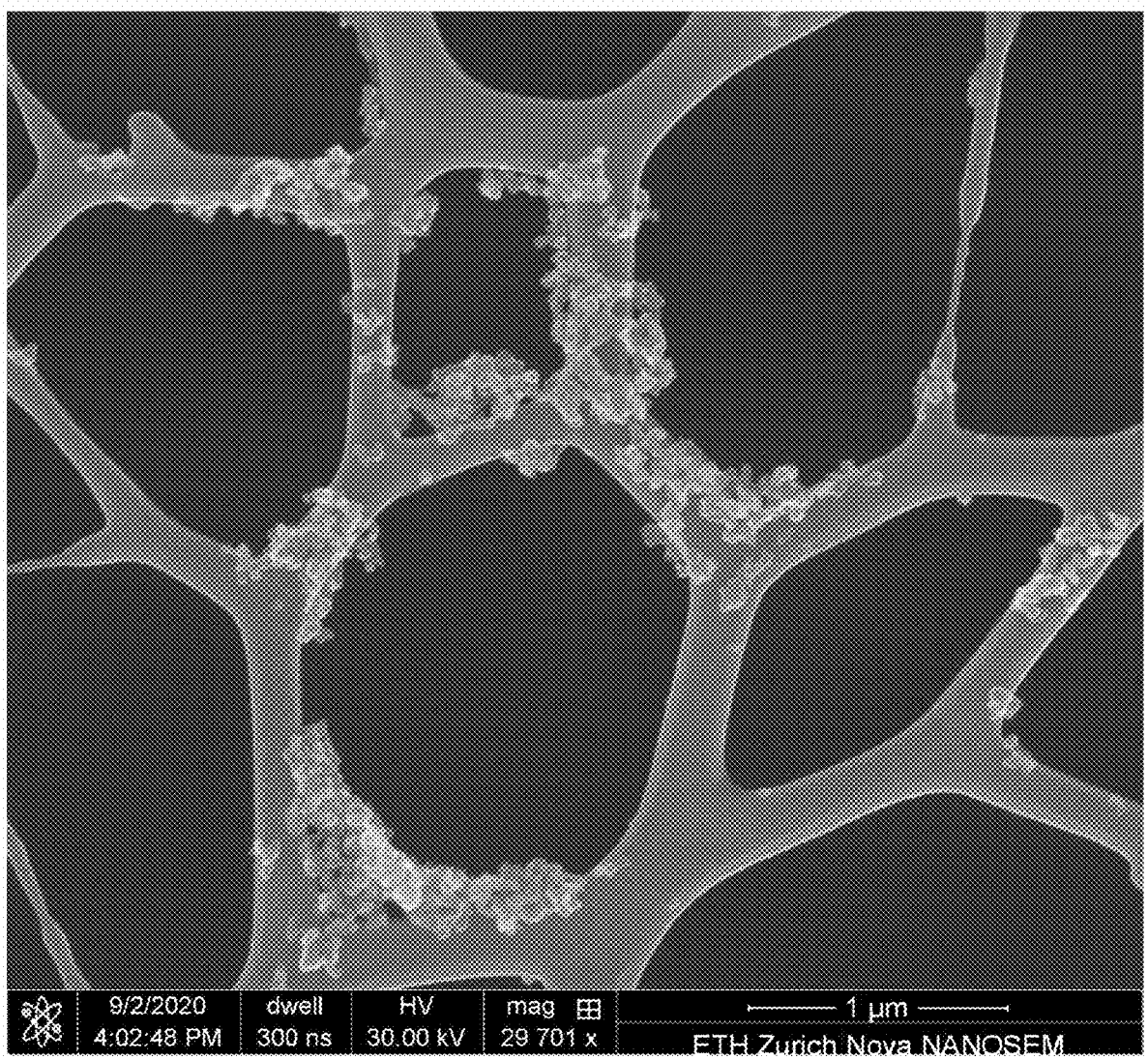
FIG. 28 shows a scanning transmission electron microscope image from a Lacey STEM Process illustrating reference petroleum carbon black particles.

For comparison a sample of commercial petroleum-derived carbon black was tested using the Geometry Protocol. That sample is illustrated in FIG. 28. The results were as follows:

|  | PCB Sample |
|---|---|
| Mean diameter of 100 particles (μm) | 0.0253 |
| Standard deviation of the diameter of the 100 particles | 0.0193 |
| Standard deviation as a % of mean diameter | 76.3% |
| Mean circularity of the at least 100 particles | 0.630 |
| Standard deviation of the mean circularity of the 100 particles | 0.2529455 |
| Standard deviation as a % of mean circularity | 40.1% |

Surprisingly the mean diameter of particles in a dispersion formulation comprising carbonaceous particles matter derived from biochar as disclosed herein were only slightly larger than the mean diameter of particles in a commercial petroleum-derived carbon black. Even more surprising, the particles from a dispersion formulation comprising carbonaceous particles matter derived from biochar as disclosed herein were more spherical than the particles in a commercial petroleum-derived carbon black.

In some embodiments, the distribution of particle sizes is determined by dynamic light scattering measurements based on polystyrene latex with a refractive index of 1.590 and absorption of 0.010 as the reference material. In some embodiments, 80% of the particles are less than one micron in size. In some embodiments, 90% of the particles are less than one micron in size. In some embodiments, 95% of the particles are less than one micron in size. In some embodiments, 99% of the particles are less than one micron in size. In some embodiments, 99.9% of the particles are less than one micron in size. Disclosed herein is a pigment composition having particles derived from biochar where the particle size distribution has a maximum intensity of less than about 500 nm as determined by dynamic light scattering measurements. In some embodiments, the particle size distribution has a maximum intensity of less than about 400 nm. In some embodiments, the particle size distribution has a maximum intensity of less than about 300 nm. In some embodiments, the particle size distribution has a maximum intensity of less than about 200 nm. In some embodiments, the particle size distribution has a maximum intensity of less than about 100 nm. In some embodiments, the particle size distribution has a maximum intensity of less than about 50 nm. In some embodiments, the particle size distribution has a maximum intensity of less than about 20 nm. In some embodiments, the particle size distribution has a maximum intensity of between about 0.01-1000 nm including all ranges subsumed therein. In some embodiments, the particle size distribution has a maximum intensity of between about 165-171 nm.

Any statement specifying a particle size distribution for micro particles is, as a practical necessity, an estimation. One consideration in specifying particle size distributions is an estimate of the variation in the particle sizes. One way that variation may be expressed is in terms of standard deviations ("sigma" statistics) or equivalent percentages. One standard deviation or one-sigma, plotted either above or below the average value, includes 68 percent of all data points. Two-sigma includes 95 percent and three-sigma includes 99.7 percent. Another way to express variation is in terms of the percentage of particles below a certain size. For example, a D90 value of 900 nm means that 90 percent of the particles are estimated to be 900 nm or smaller.

Another consideration when specifying particle size parameters involves statements regarding the accuracy and reliability with which the parameters are reported. Often the preciseness of a parameter is reported in terms of being "about" a specified value. Often the reliability of a parameter is reported in terms of a confidence level, such as "a 95% confidence level." The science of particle size characterization is well developed, and the particle size parameters cited herein are to be interpreted accordingly.

In some embodiments, the particles are characterized by Raman measurements under a laser excitation at a wavelength of 514.5 nm with an 1800 gr/mm grating. In some embodiments, the particles exhibit a Raman spectra with a G position between about 1590 and about 1605 (cm-1) and an I(D)/I(G) ratio between about 2.54 and about 3.02. In some embodiments, the particles exhibit a Raman spectra with a G position between about 1580 and about 1605 (cm-1) and an I(D)/I(G) ratio between about 2.49 and about 3.07.

In some embodiments, the surface area of the particles is determined by static pressure gas adsorption, also termed specific surface area analysis by gas physisorption (static volumetric method). In some embodiments, the surface area of the particles is greater or equal to about 100 $m^2g^{-1}$. In some embodiments, the surface area of the particles is greater or equal to about 200 $m^2g^{-1}$. In some embodiments, the surface area of the particles is greater or equal to about 300 $m^2g^{-1}$. In some embodiments, the surface area of the particles is greater or equal to about 350 $m^2g^{-1}$. In some embodiments, the surface area of the particles is between about 100 $m^2g^{-1}$ to about 1000 $m^2g^{-1}$ including all ranges subsumed therein.

Biochar feedstock includes carbon and, in some embodiments, the carbon content in biochar feedstock is in a range from about 55% up to about 80% including all ranges subsumed therein. In some embodiments, the carbon content is in a range from about 80% to about 95% including all ranges subsumed therein. In some embodiments, the carbon content is greater than or equal to about 95%. In some embodiments, the carbon content is greater than or equal to about 95%.

In some embodiments a pigment dispersion formulation has carbonaceous biochar particulate matter in no greater than about 75% by weight, and a dispersant in no greater than about 40% by weight, and an optional anti-coagulant in no greater than about 20% by weight, and an optional defoamer in no greater than about 5% by weight, and an optional preservative or biocide in no greater that about 5% weight. In some embodiments, the biochar particulate matter is no greater than about 70% by weight. In some embodiments, the biochar particulate matter is no greater than about 65% by weight. In some embodiments, the biochar particulate matter is no greater than about 55% by weight. In some embodiments, the biochar particulate matter is no greater than about 50% by weight. In some embodiments, the biochar is no greater than about 45% by weight. In some embodiments, the biochar is no greater than about 40% by weight. In some embodiments, the biochar is no greater than about 30% by weight. In some embodiments the biochar is no greater than about 25% by weight. In some embodiments, the dispersant is no greater than about 35% by weight. In some embodiments, the dispersant is no greater than about 30% by weight. In some embodiments, the dispersant is no greater than about 25% by weight. In some embodiments, the dispersant is no greater than about 20% by weight. In some embodiments, the dispersant is no greater than about 15% by weight. In some embodiments, the dispersant is no greater than about 10% by weight. In some embodiments, the dispersant is no greater than about 5% by weight. In some embodiments, the anti-coagulant is no greater than about 20% by weight. In some embodiments, the anti-coagulant is no greater than about 15% by weight. In some embodiments, the anti-coagulant is no greater than about 10% by weight. In some embodiments, the anti-coagulant is no greater than about 5% by weight. In some embodiments, the defoamer is no greater than about 2.5% by weight. In some embodiments, the defoamer is no greater than about 1.0% by weight. In some embodiments, the composition is for use as ink for pigmentation. Disclosed herein is a dispersion comprising the biochar pigment of any one of the above embodiments. In some embodiments, the biochar feedstock carbon content is greater than or equal to about 70%. In some embodiments, the biochar feedstock carbon content is in a range from about 70% to about 99.9% including all ranges subsumed therein.

In some embodiments, the char is a biochar and comprises ash. Ash is any material that is not pure carbon. In some embodiments, ash is a mixture of calcium, magnesium, potassium, or phosphorous, and compounds thereof. In some embodiments, the ash content is less than or equal to about 30%. In some embodiments, the ash content is less than or equal to about 25%, or less than or equal to about 20%, or less than or equal to about 15%, or less than or equal to about 10%, or less than or equal to about 9%, or less than or equal to about 8%, or less than or equal to about 7%, or less than or equal to about 6%, or less than or equal to about 5%, or less than or equal to about 4%, or less than or equal to about 3%, or less than or equal to about 2%, or less than or equal to about 1%, or less than or equal to about 0.1%. In some embodiments, the ash content is about 1% to about 30%. In some embodiments, the ash content is at most about 30%. In some embodiments, the ash content is about 1% to about 3%, or about 1% to about 5%, or about 1% to about 10%, or about 1% to about 15%, or about 1% to about 20%, or more than 20%.

Characteristics of Black Pigment Dispersions

Pigments are often fabricated as dispersions, "pigment dispersions," which are essentially concentrated forms of liquid colorants in either water, solvents, UV curable liquids or oils that are subsequently diluted by manufacturers of inks, paints, print paste, coatings, resins and other coloring media that employ pigments.

Disclosed herein are "dispersion formulations." In various embodiments a dispersion formulation may be used in a mill to reduce its particles derived from biochar from sizes of several microns or larger to smaller sizes, even submicron sizes in a homogenous mixture. In various embodiments the dispersion formulation is discharged from the mill and is then ready for use as a pigment dispersion. Dispersion formulations may include a milling fluid. The milling fluid is typically advantageous in milling operations to create small (e.g., submicron) particle sizes, and at least a portion of the milling fluid remains when the dispersion formulation is discharged from the mill for use as a pigment dispersion. The milling fluid may be water, solvent, a vehicle/activator or oil. Dispersion formulations typically include a dispersant. Among other functions a dispersant may improve the milling process.

Unexpected characterizations of some embodiments of dispersion formulations disclosed herein are exceptional Blackness [My] and exceptional Jetness [Mc], and exceptional Tint Strength [T]. Blackness My is a measure of the degree of blackness, directly related to the reflectance. The color-dependent jetness value Mc differs from My by taking into account the precise undertone or hue of the black pigment. The higher the value for My and Mc, the greater the perceived jetness or blackness. Blackness My and Jetness Mc values over 250 are generally considered to exhibit high blackness and jetness. Pigments derived from biochar would be expected to resemble charcoal, which is dark gray and not black, with expected Blackness My and Jetness Mc values under 200. Unexpectedly, some embodiments of pigment dispersions disclosed herein exhibit blackness My and Jetness Mc values of 300 or higher.

Tint Strength (T) is another figure of merit for pigments. For black pigments, Tint Strength is its efficiency in decreasing reflectance when mixed with a white pigment. Tint Strength (T) is a measurement of relative reflectivity when a pigment is let down in a print paste formula. In some embodiments, tint strength (T) is greater or equal to about 75%. In some embodiments, tint strength (T) is greater or equal to about 80%. In some embodiments, tint strength (T) is greater or equal to about 85%. In some embodiments, tint strength (T) is greater or equal to about 90%. In some embodiments, tint strength (T) is greater or equal to about 91%. In some embodiments, tint strength (T) is greater or equal to about 92%. In some embodiments, tint strength (T) is greater or equal to about 93%. In some embodiments, tint strength (T) is greater or equal to about 94%. In some embodiments, tint strength (T) is greater or equal to about 95%. In some embodiments, tint strength (T) is greater or equal to about 96%. In some embodiments, tint strength (T) is greater or equal to about 97%. In some embodiments, tint strength (T) is greater or equal to about 98%. In some embodiments, tint strength (T) is greater or equal to about 99%. In some embodiments, tint strength (T) is about 80% to about 99%. In some embodiments, tint strength (T) is at least about 80%.

Samples of embodiments disclosed herein for pigment dispersion formulations comprising carbonaceous particulate matter derived from biochar are tested for Tint Strength (T) according to the following "Tint Strength Protocol."

Testing is conducted according to ASTM D-2066—"Standard Test Methods for Relative Tinting Strength of Paste-Type Printing Ink Dispersions" with the following specifics:

The standard and unknown dispersions are each reduced to the same concentration in a suitable tinting base as follow:
  975 g standard print base formula
  25 g pigment dispersion
Standard was made with a comparable grade carbon black pigment.
Drawdowns with Mayer Rod #7 are completed on bleached, 100% cotton fabric; Dried for 1 minute at 105° C.; Cured for 5 minutes at 150° C. Drawdowns of the tints are evaluated for tinting strength by Test Method B—Instrumental Evaluation:
  Reflectance Measuring Instrument: a spectrophotometer with hemispherical (integrating sphere) geometry conforming to Test Method E 1331
  The tinting strength of the unknown dispersion is calculated according to the Kubelka-Munk equation.

Embodiments disclosed herein registered Tint Strength (T) values of between 94% and 99% in comparison to the standard. Tint Strength T values in excess of 90% are considered exceptional and are unexpected for a pigment made from biochar. It should be noted that testing according to ASTM D-2066 is done with a dispersion that is reduced to a finished ink formulation. A finished ink formulation contains a pigment dispersion, among other chemicals or auxiliaries, that is used in a printing, coating, or painting application. With these embodiments, only one-tenth as much pigment dispersion is required as compared to a commercially available pigment made from biomass to achieve the same coloration in a finished ink formulation. As an example, a finished ink formulation made from biomass chars that is commercially available from a competitive source has 20% pigment loading. In comparison, a finished ink formulation made from embodiments disclosed herein achieves significantly higher blackness (My) and jetness (Mc) values with only a 2% pigment loading.

Color fastness is a characteristic of materials that have been colorized by pigments. One industry standard is INTERNATIONAL STANDARD ISO 105—Textiles—Tests for color fastness. Of particular interest is Part B02: "Color fastness to artificial light: Xenon arc fading lamp test." This part of ISO 105 specifies a method for determining the effect on the color of textiles of all kinds and in all forms to the action of an artificial light source representative of natural daylight (D65). ISO Standard 105 Part B02 is the basis for testing color fastness according to the following "UV Protocol":
  Light source: As specified in ISO 105 Part B02
  Standard: Blue wool
  Apparatus Setup: Exposure Cycle A1:
  Humidity: Normal
  Climatic Condition Replicated: Temperate zone
  Black Standard Temperature: (47±3) ° C.
  Black Panel Temperature: (47±3) ° C.
  Test specimen: Dyed strip of 100% cotton cloth
  Exposure time: 100 hours Scores from ISO Standard 105 Part B02 range from 1 (very low color fastness to light) to 8 (very high color fastness to light), where each higher numbered reference is approximately twice as fast as the previous number. Five test specimens dyed with pigment dispersion formulations disclosed herein were tested according to the UV Protocol. Four of the specimens scored an 8, which is equivalent to a commercial petroleum carbon black test specimen. One specimen of an embodiment disclosed herein scored between 5 and 6. It is unexpected that a pigment derived from biochar would achieve scores of 8.

Several standardized tests may be used to evaluate how black a pigment is. Blackness (My) is a measure of the degree of blackness, directly related to the reflectance. Typical reflectance values are typically below 5% and can be below 1% for the best blacks. In some embodiments, blackness is greater or equal to about 200. In some embodiments, blackness is greater or equal to about 250. In some embodiments, blackness is greater or equal to about 350.

Jetness (Mc) is a complex function of surface area, primary particle size, and degree of dispersion. Black pigments possessing smaller primary particle sizes tend to impart a higher degree of jetness than those having larger primary particles. In some embodiments, jetness is greater or equal to about 200. In some embodiments, jetness is greater or equal to about 260. In some embodiments, jetness is greater or equal to about 350.

Undertone (dM) quantifies how neutral the black pigment plus binder is. Undertone is calculated as dM=Mc−My. If dM<0, the undertone is brown-reddish. A dM value=0 would suggest the black is perfectly achromatic or neutral. If dM>0, then the black exhibits a bluish undertone which is often preferred. In some embodiments, undertone is greater than 0.

In some embodiments, blackness (My) is greater or equal to about 50. In some embodiments, blackness (My) is greater or equal to about 100. In some embodiments, blackness (My) is greater or equal to about 150. In some embodiments, blackness (My) is greater or equal to about 200. In some embodiments, blackness (My) is greater or equal to about 250. In some embodiments, blackness (My) is greater or equal to about 300. In some embodiments, blackness (My) is greater or equal to about 350. In some embodiments, blackness (My) is greater or equal to about 400. In some embodiments, blackness (My) is about 50 to about 400.

In some embodiments, jetness (Mc) is greater or equal to about 50. In some embodiments, jetness (Mc) is greater or equal to about 100. In some embodiments, jetness (Mc) is greater or equal to about 150. In some embodiments, jetness (Mc) is greater or equal to about 200. In some embodiments, jetness (Mc) is greater or equal to about 250. In some embodiments, jetness (Mc) is greater or equal to about 300. In some embodiments, jetness (Mc) is greater or equal to about 315. In some embodiments, jetness (Mc) is greater or equal to about 350. In some embodiments, jetness (Mc) is greater or equal to about 400.

Samples of embodiments disclosed herein for pigment dispersion formulations comprising carbonaceous particulate matter derived from biochar are tested for blackness (My) and Jetness (Mc) according to the following "Black Protocol."

A Hunber LabScanXE instrument, or an equivalent 45/0 geometry instrument is used for the test with a black glass tile as the black reference
  The following settings are established:
    XYZ Color Space D65 illuminant
    10 Degree observer 45/0 Geometry
    1.2" port size
  Samples are tested as-is in a polystyrene (PS) petri dish as the sample container/window. Where samples have adequate viscosity that the petri dish surfaces maintained a large enough gap to keep the samples opaque and in-place between the windows. Where samples do not have the required viscosity an 'O'-ring spacer is used to maintain a fixed, sealed gap that retains the sample and provides adequate sample pathlength for opacity.

The following results were achieved for 5 composition embodiments disclosed herein (identified by "ID") in the following table. Note that composition 2019-006343-01 was tested twice.

| | LabScan XE | | | | |
|---|---|---|---|---|---|
| ID | X | Y | Z | Blackness My | Jetness Mc |
| 2019-006343-01 | 0.27 | 0.29 | 0.44 | 253.76 | 269.59 |
| 2019-006343-01B* | 0.27 | 0.29 | 0.44 | 253.76 | 269.59 |
| 2019-006343-02 | 0.10 | 0.11 | 0.18 | 295.86 | 316.01 |
| 2019-006343-03 | 0.11 | 0.12 | 0.19 | 292.08 | 310.44 |
| 2019-006343-04 | 0.14 | 0.15 | 0.24 | 282.39 | 300.42 |
| 2019-006343-05 | 0.15 | 0.16 | 0.24 | 279.59 | 294.62 |
| BLACK GLASS | 0.00 | 0.00 | 0.00 | | |
| White point values for D65/10 conditions | | | | | |
| Xn= | 94.811 | | | | |
| Yn= | 100.000 | | | | |
| Zn= | 107.304 | | | | |

*sample re-prepared and tested due to values differing from other samples. Shows reproducibility of method.

In some embodiments, the undertone (dM) is greater than 0. In some embodiments, the undertone (dM) is 0.

An alternate approach to evaluating a black pigment is to utilize a CIELAB color space (also known as CIE L*a*b* or sometimes abbreviated as simply "Lab" color space), which is a color space defined by the International Commission on Illumination (CIE) in 1976. It expresses color as three values: L* for the lightness from black (0) to white (100), a* from green ( ) to red (+), and b* from blue ( ) to yellow (+). CIELAB was designed so that the same amount of numerical change in these values corresponds to roughly the same amount of visually perceived change. dL* (delta L*) expresses Lightness/Darkness Difference or the shade of gray (black/white). These values express hue (color) in black pigment samples. Perfectly black samples reflect no hues and absorb all wavelengths of light.

In some embodiments, the black pigments described herein have an L* value read against a $TiO_2$ reference blank suspension having an L* value of 84.99. In some embodiments, the L* value is about 30 to about 75. In some embodiments, the L* value is at least about 30. In some embodiments, the L* value is at most about 75. In some embodiments, the L* value is about 30 to about 35. The black pigments described herein have an a* value read against a $TiO_2$ reference blank suspension having an a* value of −0.16. In some embodiments, the a* value is about −0.47 to about −0.2. In some embodiments, the a* value is at least about −0.47. In some embodiments, the a* value is at most about −0.2. The black pigments described herein have a b* value read against a $TiO_2$ reference blank suspension having an b* value of +0.69. In some embodiments, the b* value is about 0.1 to about 1.5. In some embodiments, the b* value is at least about 0.1. In some embodiments, the b* value is at most about 1.5. The black pigments described herein have a dL* value read against a TiO2 reference blank suspension having an dL* value of 84.99. In some embodiments, the dL* value is about −50 to about −15. In some embodiments, the dL* value is about −50 or lower (more negative). In some embodiments, the dL* value is about −15 or higher (less negative).

In some embodiments of the technology disclosed herein a randomized sample of pigment particles in liquid dispersions is further characterized when tested according to the black pigment color analysis described herein as having an L* value in a range between 48.0 and 58.0 as read against a $TiO_2$ reference blank suspension having an L* value of 84.99 and having an a* value in a range between −0.23 and −0.42 as read against a $TiO_2$ reference blank suspension having an a* value of −0.16 and having a b* value in a range between 0.15 and 1.25 as read against a $TiO_2$ reference blank suspension having a b* value of 0.69 and having a dL* value in a range between −26 and −37 as read against a $TiO_2$ reference blank suspension having a dL* value of 84.99.

In some embodiments of the technology disclosed herein a randomized sample of pigment particles in liquid dispersions is further characterized when tested according to the black pigment color analysis described herein as having an L* value in a range between 40.0 and 65.0 as read against a $TiO_2$ reference blank suspension having an L* value of 84.99 and having an a* value in a range between −0.15 and −0.50 as read against a $TiO_2$ reference blank suspension having an a* value of −0.16 and having a b* value in a range between 0.1 and 1.5 as read against a $TiO_2$ reference blank suspension having a b* value of 0.69 and having a dL* value in a range between −20 and −45 as read against a $TiO_2$ reference blank suspension having a dL* value of 84.99.

In some embodiments, dispersions uniformly distribute the individual pigment particles through the liquid medium for a period of time. In some embodiments, the dispersion does not have settled pigment particles at the bottom of a vessel or have phase separation between the components of the dispersion. In some embodiments, phase separation occurs when water or solvent separates from the dispersion. In some embodiments, the dispersion maintains its density for a period of time and does not change or morph in consistency. For example, in some embodiments, dispersion does not gel after a period of time. In some embodiments, pigment dispersions increase color strength, create higher light fastness, have low or high opacity and have other performance characteristics.

A particular type of material called a "pigment dispersion formulation" is disclosed herein. In references to technology disclosed herein the terms "pigment dispersion" and "dispersion" refer to pigment dispersion formulations. In a wet milling process a mechanical mill is charged with media (typically small beads or spheres), and in embodiments disclosed herein, is also charged with biochar feed stock and chemicals such as a milling fluid or a vehicle/activator used to facilitate the grinding of the biochar into sub-micron carbonaceous particles. The mill has a high-speed rotating agitator shaft. When the agitator rotates, it transmits kinetic energy to the media. The charge of biochar feed stock and chemicals is pumped through the mill at a process flow rate. Energy from the media acts on the biochar solids suspended in a liquid (slurry) to tear them apart (shearing) or crush them, reducing them to micro sizes. The particles are simultaneously dispersed in the liquid becoming a dispersion formulation. The components of the dispersion formulation are homogenized in the mill.

In various embodiments a dispersion formulation may be used as a mill base in a mill to reduce its particles derived from biochar from sizes of several microns or larger to smaller sizes, even submicron sizes. These results are unexpected because conventional wet and dry milling processes and chemistry plateau out with particle sizes never being diminished to any practical extent below several microns in diameter. Additional milling time only served to increase the viscosity of the mix, which eventually forced the termination of the process. The inclusion of micro fibrillated cellulose in the mill base may account for some of this success.

In various embodiments when the milling process is complete the dispersion formulation is discharged from the mill and is then ready for use as a pigment dispersion. The micro fibrillated cellulose helps keep the pigment particulate matter in suspension. In some embodiments the dispersion formulation may be dried, and the resulting micro size particles used in other products.

In some embodiments, the composition comprises a dispersant. In some embodiments of the technology disclosed herein a dispersion includes about 15 to 60% $W_P/W_T$ pigment particles and about 15 to 60% $W_D/W_T$ of a dispersant, for example sodium lignosulfonate or lignosulfonic acid dispersant or an unstructured or structured acrylic polymer or co-polymer dispersant or an unstructured or structured acrylate polymer or co-polymer dispersant or a hydroxy-functional carboxylic acid ester dispersant or a styrene maleic anhydride dispersant where $W_P$ is the weight of the pigment particles, and $W_D$ is the weight of the dispersant, and $W_T$ is the total weight of the dispersion and the fractions are expressed as percentages. In some embodiments, the dispersion is about 20 to 60% $W_P/W_T$ pigment particles and about 15 to 55% $W_D/W_T$ of a dispersant. In some embodiments, the dispersion is about 25 to 55% $W_P/W_T$ pigment particles and about 15 to 50% $W_D/W_T$ of a dispersant. In some embodiments, the dispersion is about 30 to 50% $W_P/W_T$ pigment particles and about 15 to 45% $W_D/W_T$ of a dispersant. In some embodiments, the dispersion is about 30 to 50% $W_P/W_T$ pigment particles and about 15 to 40% $W_D/W_T$ of a dispersant. In some embodiments, the dispersion is about 20 to 50% $W_P/W_T$ pigment particles and about 20 to 50% $W_D/W_T$ of a dispersant. In some embodiments, the dispersion is about 20 to 55% $W_P/W_T$ pigment particles and about 25 to 45% $W_D/W_T$ of a dispersant.

In some embodiments of the technology disclosed herein a dispersion includes pigment particles and a dispersant comprising modified acrylic or acrylate co-polymers with pigment affinic groups. In some embodiments this dispersion further includes a dispersion comprising hydroxyl-functional carboxylic acid esters with pigment affinic groups.

In some embodiments of the technology disclosed herein a dispersion includes pigment particles and a sodium lignosulfonate or lignosulfonic acid, sodium salt based dispersant and a hydroxyl-functional carboxylic acid ester with pigment affinic groups.

In some embodiments, the dispersant may include a commercial product marketed or produced under the brand name EFKA, Dispex, Dispers, METOLAT, ZETASPERSE, DISPERBYK, BYKJET, E-SPERSE, Solsperse, Solplus, JEFFSPERSE, K-SPERSE, DISPARLON, DISPERSOGEN, AJISPER, LUCRAMUL, or any combination thereof. In some embodiments, the dispersant may include any dispersant marketed or produced in BASF's EFKA PX line, EFKA FA line, EFKA PU line, EFKA PA line, Dispex Ultra PA line, Dispex Ultra FA line, Dispex Ultra PX line, Dispex AA line, Dispex CX line, or any combination thereof. In some embodiments, the dispersant may include TEGO Dispers 745 W, TEGO Dispers 750 W, TEGO Dispers 760 W, METOLAT 392 (MUNZING), BYKJET 9170 (BYK), BYKJET 9151 (BYK), BYKJET 9152 (BYK), BYK-9076, BYK-9077, or any combination thereof. In some embodiments, the dispersant may include any dispersant marketed or produced by BASF, TEGO, EVONIK, MUNZING, BYK, Ethox, Lubrizol, Huntsman, King Industries, Clariant, AjinomotoFine Techno Co., Silok, Levaco, or any combination thereof.

In some embodiments, the dispersant may include a high molecular weight dispersant and may include a low molecular weight dispersant. In some embodiments, the dispersant may include an acrylic dispersant, acrylate, acrylic acid, acrylate acid, carboxylic dispersant, carboxylic acid, polymeric dispersant, polyacrylic acid and copolymer dispersant, polyacrylic, polycarboxylic copolymer, polycarboxylic acid, hydrophobic polycarboxylic copolymer, polyacrylate, sodium polyacrylate, potassium polyacrylate, ammonium salt amphiphilic, phosphate with sodium cation polyacrylate, ammonium salt of polycarboxylic acid, polyphosphate, polyelectrolyte, polyurethane, star-shaped dispersant, comb-branched copolymer dispersant, block copolymer, block copolymers based on controlled free radical polymerization (CFRP or CRP), quaternary ammonia salt, high molar volume (HMV) dispersant, styrene/maleic anhydride copolymer dispersant, sodium salt of styrene/maleic anhydride, tertiary amine, alkanol-amine, synthetic ester, ammonium naphthalene sulfonate dispersant, ethoxylated linear fatty alcohol, ethoxylated fatty acid ester, sorbitan monolaurate, Tween 20, Tween 80, stearic acid, oleic acid, diglyceride, saponified vegetable oil, ether alcohol, alkylammonium salt of a high molecular-weight polymer, distillate of pinus, Kraft lignin, amphiphilic block copolymer, acrylate diblock copolymer, phosphonic acid ester polymeric dispersant, neutralized phosphonic acid ester polymeric dispersant, aromatic polyethylene glycol ether phosphate, anionic polyether sulfate, aliphatic polycarboxylic acid amine salt, modified polymer contained carboxylic acid, polycarboxylic acid esters, formulation of polarity acidic esters and high molecular weight alcohols, polar acidic esters, high molecular weight alcohols, polyamino amides, polyethers, nitrogen graft polymer, fatty acid calcium, polyolefin, naphthalene acid, naphthalene sulfonic acid, polymer with formaldehyde, surface-functionalized dispersant, terpolymer, terpolymer of benzyl methacrylate acid, methacrylic acid, potassium silicate, ammonium lignosulfonate, purified lignosulfonate, hydroxypropul sulfonated lignin, mono functional oleoalkylene oxide block copolymers, alklphenol ethoxylate dispersant, alkyd resin, calcium sulfonate, calcium salt, mineral spirits, zinc sulfonate, 2-butoxyethanol, butyl acetate, amine salt of polyester phosphate ester, amine salt of phosphate, polyether phosphate, polymer with phosphoric acid group, liposome, surfactant-based dispersants, polymeric based dispersant, alkylpolyamine, polyethylene wax, aqueous solution of sulfated castor oil or sulfonated organic substances, sulfonated polymer, dispersant with pigment affinic groups or binder compatible chains, oligomeric dispersant, including fatty acid based ones and fatty acid modified emulsified ones, or any combination thereof.

In some embodiments, the dispersant may include an amphiphilic block copolymer, polycarboxylic acid esters and polyamino amides, ammonium salt polyacrylate, sodium lignosulphonate, polyurethane based, lecithin, polyvinyl acetate, structured acrylate copolymer with pigment affinic groups with controlled polymerization, copolymer with controlled polymerization, structured copolymer with controlled polymerization, polyester phosphate ester, alkanol-amines, glycerol monostearate, styrene/maleic anhydride copolymer, nitrogen graft, terpolymer of benzyl methacrylate acid, block copolymer with free radical polymerization, 2-amino-2methyl-1-propanol, ethoxylated linear fatty alcohol, mono functional oleo-alkylene oxide block copolymer, cation polyacrylate salt with phosphate, 100% active dispersants, non-active or semi-active dispersants, monomer dispersants or any combination thereof.

In some embodiments, the dispersant may include a structured acrylate copolymer with pigment affinic groups with controlled polymerization, acrylic block copolymer with controlled polymerization, copolymer with controlled polymerization, acrylic block copolymer with controlled polymerization and pigment affinic groups, sodium salt lignosulfonate, acrylate block copolymer with controlled free radical polymerization, or any combinations thereof.

In some embodiments, the dispersant may include acrylic and acrylate dispersants, lignin based dispersants, hydroxypropyl cellulose, hydroxyethyl cellulose, polylysine, sodium dodecyl sulfate, decyl glucoside, carboxymethyl cellulose, hydroxypropyl methyl cellulose, hydroxy ethyl methyl cellulose, dioctyl sodium sulfosuccinate, chitosan, alginate sodium alginates, solsperse 4300, tannic acid, aspartic acid, alum sulfate, alum acetate, Polyquaterium 10, glycerin, glycerol monostearate, mono and diglycerides, fumaric acid, cinnamic acid, and any combination thereof. In some embodiments of the technology disclosed herein a dispersion includes rape seed oil.

In some embodiments, the dispersant may include anionic, cationic, electro-neutral, non-ionic, electrostatic, steric, non-ionogenic, polar, non-polar, medium-polar, an amphoteric surfactant, a surfactant, soya lecithin, soya oil, linseed oil, phosphoric acid ester salt of a high molecular weight copolymer with pigment affinic groups, or any combination thereof.

In some embodiments, the dispersant may include a commercial dispersant. In some embodiments, the commercial dispersant includes Vanisperse CB, AMP 95, KRAFTSPERSE, BYKJET 9171, BYK 190, BYK 191, BYKJET 9152, DISPERBYK 2015, BYKJET 9151, BASF Dispex Ultra PX 4585, Marasperse CBOS-4, and any combination thereof.

In some embodiments, the composition further comprises an optional defoamer. In some embodiments, the defoamer is molecular based, oil (mineral or vegetable) based, siloxane based, polysiloxanes based, silicone based, oil-wax based, oil-silica based, glycol emulsion based, polyacrylate based, modified fatty acids based, polyether based, modified amine based, or any combination thereof. In some embodiments, the defoamer is BYK 1740.

In some embodiments, the composition includes an optional anti-coagulant. In some embodiments, the anti-coagulant includes a cellulose. In some embodiments, the cellulose is micro fibrillated cellulose.

In some embodiments, the composition comprises an optional solvent. In some embodiments, the solvent is n-butyl acetate, methyl soyate, ethyl lactate, ethyl acetate, iso-propyl acetate, mineral spirits, aromatic, an ester, a ketone, ethanol, or any combination thereof.

In some embodiments, the composition comprises an optional activator/vehicle. In some embodiments, the activator/vehicle comprises an oligomer, a monomer or a photoinitiator. In some embodiments, the activator/vehicle is unsaturated polyester, acrylated polyester, acrylated epoxy resin, aliphatic acrylated urethane, aromatic acrylated urethane, acrylated silicone resin, acrylated polyethers, acrylated melamines, acrylated oils, N-vinyl urethanes, thiolene, vinyl based monomer, vinyl acetate, N-vinyl pyrrolidone, monoacrylates, diacrylates, triacrylates, tetracrylates, pentacrylates, allylic monomers, plasticizing monomers, plasticizing diluents, aromatic ketones, synergistic amines, alkyl benzoin ethers, thioxathones and derivatives, benzyl ketals, acylphospine oxide, ketoxime ester, acyloxime ester, quaternary ammonium salt, acetophenone derivatives, engineered microbes, fatty acids, carboxylic acids, bio-renewable or biomass derived, or any combination thereof.

In some embodiments, the composition further comprises an optional preservative or biocide. In some embodiments, the preservative or biocide is caprylhydroxamic acid, koralone, propyl gallate, thymol, eugenol, citral, cinnamaldehyde, carvacrol, ortho-phthalaldehyde, peracetic acid, kathon (MIT/CMIT), DMDM hydantoin, or any combination thereof.

Source Materials

In some embodiments, chars are made from plants or animals. Plant chars have their origins in plants (e.g., as trees, grasses) whereas animal chars have their origin in animals (e.g., bones, teeth, poultry litter). Plant char is identified as distinct from animal char by one or more of the following characteristics: (1) Animal char typically contains more than 40 g/kg of total phosphorous compared with less than 0.3 g/kg in a typical plant char, and (2) microscopic examination of chars from animal feedstocks, litter, and digestate are substantially devoid of pores whereas plant substrates become porous char.

In some embodiments, plant chars are biochars. In some embodiments, biochar is produced from purpose-grown crops such as kenaf, switchgrass, miscanthus, and corn. In some embodiments, biochar is produced from end-of-life biomass materials such as animal manure, sewage sludge, and agricultural and forestry residues. Agricultural and forestry residues that may be used to produce biochars include stubble from farm crops (e.g., corn, wheat, oats, sorghum, maize, canola and triticale), harvest residuals such as rice hulls, corn cobs, seeds, peels, nutshells, coffee pulp, and by-products. Agricultural and forestry residues that may be used to produce biochars include stubble from farm crops (e.g., corn, wheat, oats, sorghum, maize, canola and triticale), harvest residuals such as rice hulls, corn cobs, seeds, peels, nutshells, and coffee pulp. In some embodiments, biochar may also be produced from trees and from by-products of tree production such as bark, sawdust, wood shavings and pruned shoots from trees. Tree types include hardwoods and softwoods, with some varieties of trees classified as both hardwoods and softwoods. Hardwoods include Oak (including White Oak, Red Oak, Ash (including Black Ash and Blue Ash), Eucalyptus, Bamboo, Maple (including Florida Maple, Black Maple, and Sugar Maple), Walnut, Hickory (including Water Hickory, Bitternut Hickory, Pignut Hickory, Pecan, Shellbark Hickory, Shagbark Hickory, Black Hickory, and Mockernut Hickory), Cherry, Cottonwood, Sycamore, Willow, Birch, Flowering Dogwood, Persimmon, Beech, Waterlocust, Honeylocust, Kentucky Coffeetree, American Holly, Walnut (including Black Walnut), Osage Orange, Apple, Mulberry (including White and Red Mulberry) and Sassafras. Softwoods include Pine, Loblolly, Silverbell, Butternut, Sweetgum, Poplar (including Yellow Poplar and Silver Poplar), Magnolia, Sweetbay, Tupelo and Black Gum, Empress Tree, Redbay, Sycamore, Cottonwood, Balsam, Aspen (including Bigtooth Aspen and Quaking Aspen), Boxelder, Cedar, Cypress, Spruce, Douglas-fir, Fir, Maple (including Red Maple and Silver Maple), Buckeye (including Ohio Buckeye and Yellow Buckeye), Birch (including River Birch, Water Birch, Paper Birch, Gray Birch), Chinkapin (including Allegheny Chinkapin and Ozark Chinkapin), Cottonwood (including Eastern Cottonwood, Swamp Cottonwood, Plains Cottonwood, Black Cottonwood, Fremont Cottonwood, and Narrowleaf Cottonwood), Basswood (including American Basswood and White Basswood), Elm (including Rock Elm Winged Elm, American Elm, Cedar Elm, Siberian Elm, Slippery Elm, and September Elm), Catalpa, Larch, Coast Redwood, Hackberry, Sugarberry, Cherry (including Pin Cherry and Black Cherry), Hemlock, Ash (including White Ash, Green Ash, and Pumpkin Ash), Willow (including Peachleaf Willow, Black Willow, and Diamond Willow), Sugi, and Kauri. The above sources of biochar may be used separately or in combinations. Methods and apparatuses for producing biochars are disclosed, for example, in U.S. Pat. No. 8,361,186B1—"Biochar," U.S. Pat. No. 8,772,559B2—"Biochar generator and associated methods," and U.S. Pat. No. 9,809,502B2—"Enhanced Biochar."

In some embodiments, disclosed herein is a composition having particles derived from a biochar present in about 1-75% by weight, a dispersant present is 10-40% by weight, an optional anti-coagulant present in about 1-20% by weight, an optional defoamer present in about 0.01-5% by weight, and an optional preservative or biocide in about 0.001-5%. In some embodiments, the biochar is present in about 5-70% by weight.

In some embodiments, the biochar is present in about 20-60% by weight. In some embodiments, the biochar is present in about 30-50% by weight. In some embodiments, the biochar is present in about 20-80% by weight including all ranges subsumed therein.

In some embodiments, the dispersant is present in about 15-35% by weight. In some embodiments, the dispersant is present in about 15-30% by weight. In some embodiments, the dispersant is present in about 10-30% by weight. In some embodiments, the dispersant is present in about 20-30% by weight. In some embodiments, the dispersant is present in about 15-35% by weight. In some embodiments, the dispersant is present in about 20-25% by weight. In some embodiments, the dispersant is present in about 25-30% by weight. In some embodiments, the dispersant is present in about 1% by weight to about 40% by weight including all ranges subsumed therein. In some embodiments, the dispersant is present in about 5% by weight to about 30% by weight. In some embodiments the dispersant is present in about 5% by weight to about 40% by weight.

In some embodiments, the anti-coagulant is present in about 5-20% by weight. In some embodiments, the anti-coagulant is present in about 1-15% by weight. In some embodiments anti-coagulant is present in about 1% by weight to about 20% by weight including all ranges subsumed therein.

In some embodiments, the defoamer is present in about 0.01 to about 5.0% by weight including all ranges subsumed therein.

In some embodiments, the preservative or biocide is present in about 0.001% to about 5% by weight including all ranges subsumed therein.

In some embodiments, the biochar is no greater than about 70% by weight. In some embodiments, the biochar is no greater than about 65% by weight. In some embodiments, the biochar is no greater than about 55% by weight. In some embodiments, the biochar is no greater than about 50% by weight. In some embodiments, the biochar is no greater than about 45% by weight. In some embodiments, the biochar is no greater than about 40% by weight. In some embodiments, the biochar is no greater than about 30% by weight.

In some embodiments, the dispersant is no greater than about 35% by weight. In some embodiments, the dispersant is no greater than about 30% by weight. In some embodiments, the dispersant is no greater than about 25% by weight. In some embodiments, the dispersant is no greater than about 20% by weight. In some embodiments, the dispersant is no greater than about 15% by weight. In some embodiments, the dispersant is no greater than about 10% by weight.

In some embodiments, the anti-coagulant is no greater than about 20% by weight. In some embodiments, the anti-coagulant is no greater than about 15% by weight. In some embodiments, the anti-coagulant is no greater than about 10% by weight. In some embodiments, the anti-coagulant is no greater than about 5% by weight.

In some embodiments, the defoamer is no greater than about 2.5% by weight. In some embodiments, the defoamer is no greater than about 1.0% by weight. In some embodiments, the defoamer is no greater than about 0.75% by weight.

In some embodiments, the preservative or biocide is no greater than about 5.0% by weight. In some embodiments, the preservative or biocide is no greater than about 2.5% by weight. In some embodiments, the preservative or biocide is no greater than about 1.0% by weight. In some embodiments, the preservative or biocide is no greater than about 0.1% by weight. In some embodiments, the preservative or biocide is no greater than about 0.01% by weight.

In some embodiments, the composition is petroleum free, and comprises biochar present in 1-75% by weight, dispersant present is 10-40% by weight, anti-coagulant optionally present in 1-20%, and defoamer optionally present in 0.01-5% by weight.

Pigment Particles

Disclosed herein are various embodiments of pigments and pigment dispersions that include carbonaceous particulate matter derived from biochar. As used herein the term "particle" refers to a singular particle of the type often referred to as a primary particle in descriptions of carbon black pigment. As used herein, the term "particulate matter" refers to (1) clusters of particles, (2) chains of particles, or (3) individual particles, either solely or in combination of two or all three.

The following characteristics and features of the characteristics of the technology disclosed herein may apply as independent features or characteristics and may apply in combinations of two or more features or characteristics.

Some embodiments of the technology disclosed herein provide a randomized sample of carbon pigment spheroidal-particles wherein at least 99.7% of the particles by number have a maximum diameter that is less than 25 nm as measured on a scanning transmission electron micrography (STEM) two-dimensional micrograph with a magnification of at least 50,000×.

Some embodiments of the technology disclosed herein provide a randomized sample of carbon pigment spheroidal-particles wherein at least 95% of the particles by number have a maximum diameter that is less than 25 nm as measured on a scanning transmission electron micrography (STEM) micrograph with a magnification of at least 50,000×.

Some embodiments of the technology disclosed herein provide a randomized sample of carbon pigment spheroidal-particles wherein at least 99.7% of the particles by number have a maximum diameter that is less than 50 nm as measured on a scanning transmission electron micrography (STEM) two-dimensional micrograph with a magnification of at least 50,000×.

Some embodiments of the technology disclosed herein provide a randomized sample of carbon pigment spheroidal-particles wherein at least 95% of the particles by number have a maximum diameter that is less than 50 nm as measured on a scanning transmission electron micrography (STEM) micrograph with a magnification of at least 50,000×.

Some embodiments of the technology disclosed herein provide a randomized sample of carbon pigment spheroidal-particles wherein at least 99.7% of the particles by number have a maximum diameter that is within a range between 15 nm and 25 nm as measured on a scanning transmission electron micrography (STEM) two-dimensional micrograph with a magnification of at least 50,000×.

Some embodiments of the technology disclosed herein provide a randomized sample of carbon pigment spheroidal-particles wherein at least 95% of the particles by number have a maximum diameter that is within a range between 15 nm and 25 nm as measured on a scanning transmission electron micrography (STEM) micrograph with a magnification of at least 50,000×.

Some embodiments of the technology disclosed herein provide a randomized sample of carbon pigment spheroidal-particles wherein at least 99.7% of the particles by number have a maximum diameter that is within a range between 10 nm and 50 nm as measured on a scanning transmission electron micrography (STEM) two-dimensional micrograph with a magnification of at least 50,000×.

Some embodiments of the technology disclosed herein provide a randomized sample of carbon pigment spheroidal-particles wherein at least 95% of the particles by number have a maximum diameter that is within a range between 5 nm and 500 nm as measured on a scanning transmission electron micrography (STEM) micrograph with a magnification of at least 50,000×.

Figure 5:
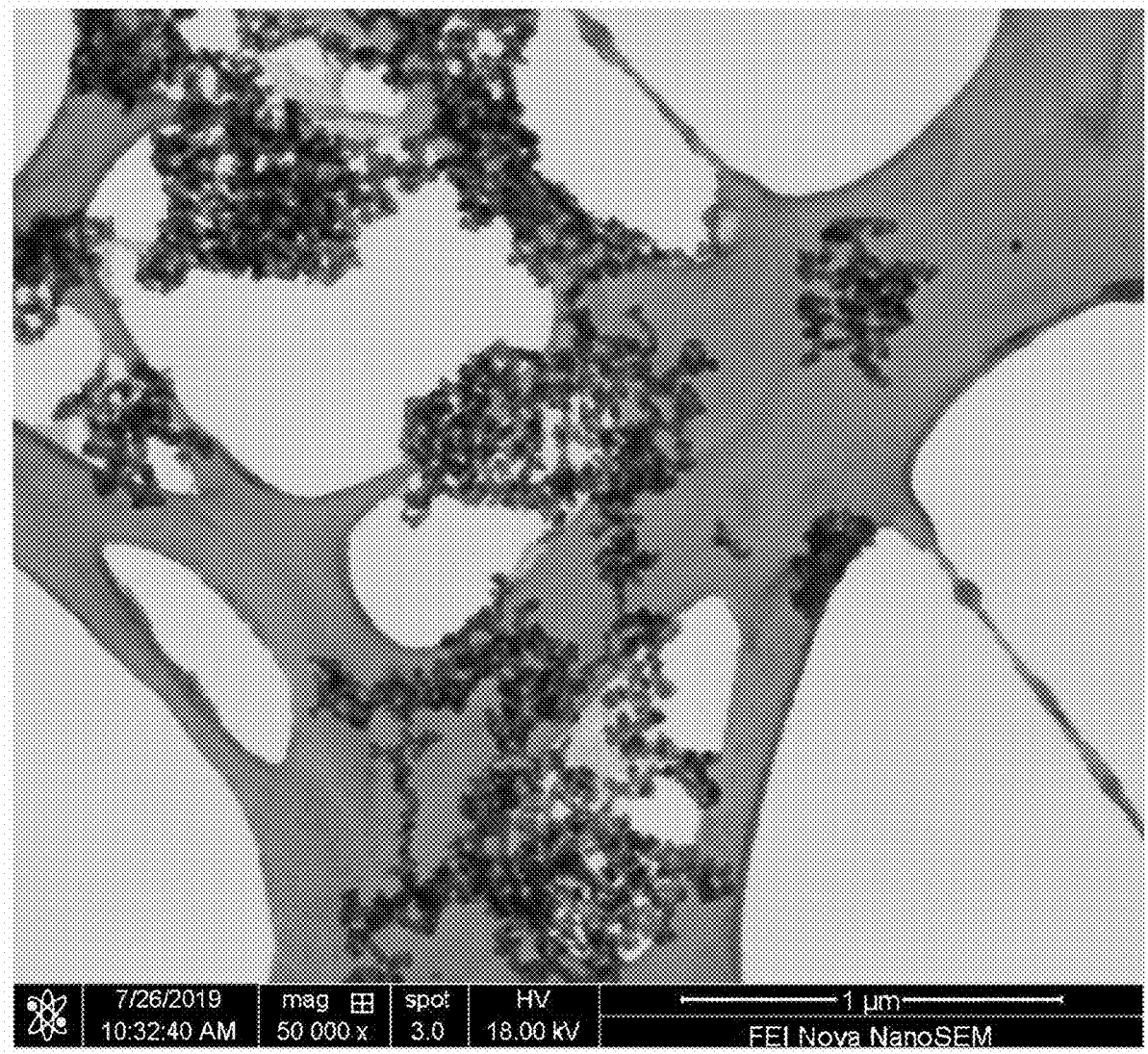
FIG. 5 shows a scanning transmission electron microscope image at a magnification of 50,000× from a Lacey STEM Process illustrating a randomized sample of pigment particles where at least 95% of the particles by number, or at least 100 particles, have a diameter in the range between 15 nm and 25 nm.
Figure 6:
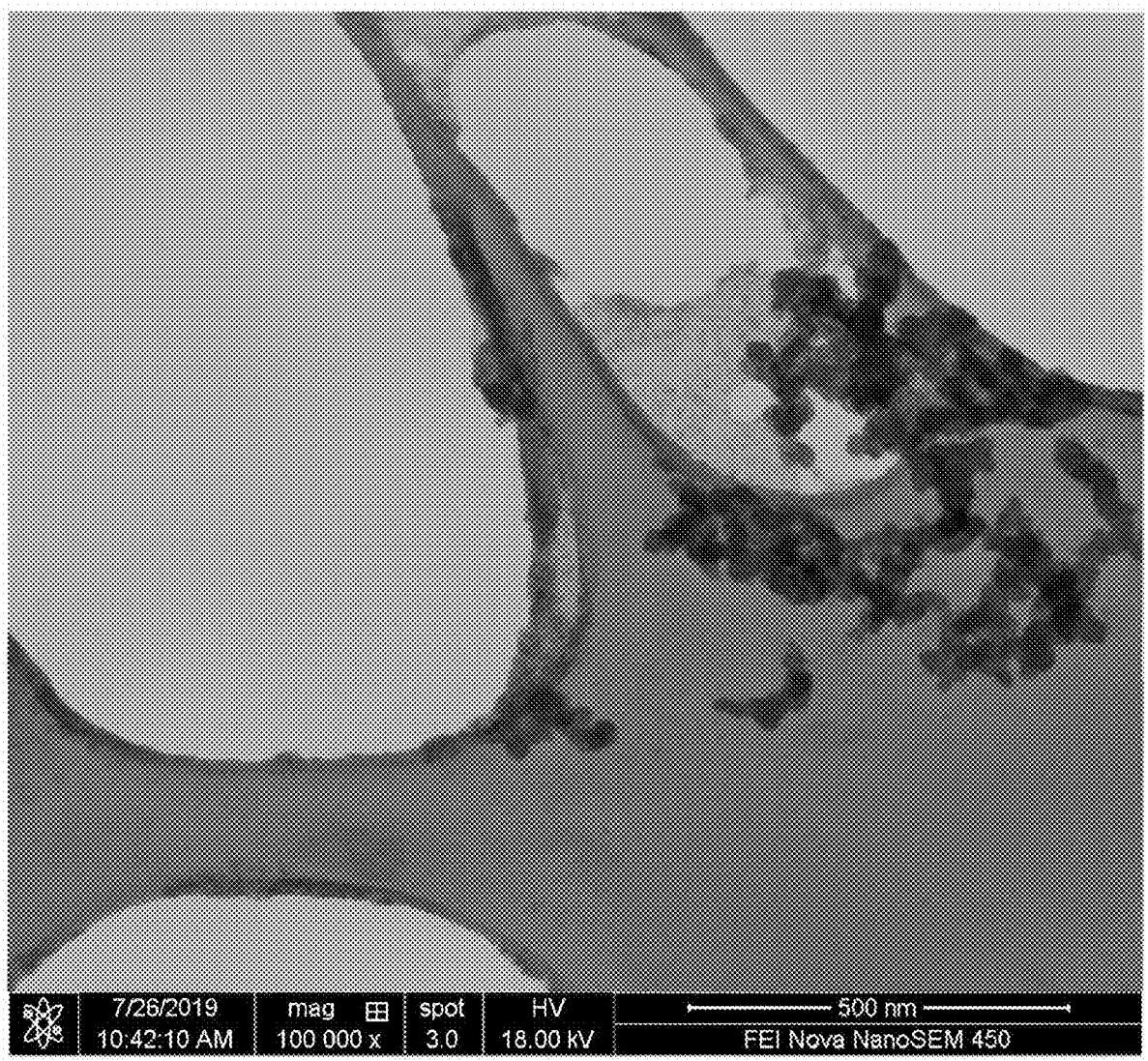
FIG. 6 shows a scanning transmission electron microscope image at a magnification of 100,000× from a Lacey STEM Process illustrating a randomized sample of pigment particles where at least 95% of the particles by number, or at least 100 particles, have a diameter in the range between 15 nm and 25 nm.

FIGS. 5 and 6 illustrate particles that have a spheroidal shape. A spheroidal shape is characterized by appearing as a sphere with no apparent ellipsoidal distortions.

As used herein the term "carbon pigment particles" refers to particles that are at least 80% pure elemental carbon.

In some embodiments of the technology disclosed herein sub-micron carbon pigment particles are plant char pigment particles.

As used herein the term "sub-micron" carbon pigment particles and "sub-micron" carbon particles refers to particles where at least 99.9% of the particles are less than one micron in size as measured by dynamic light scattering based on polystyrene latex with a refractive index of 1.590 and absorption of 0.010 as the reference material.

It is important to recognize that for the sub-micron size carbon particles derived from biochar having a spheroidal or sphere-like shapes, high Mc and My values and tint strength as disclosed herein, the particles are the result of wet milling processes and chemistry disclosed herein. These particle characterizations are unexpected because conventional wet and dry milling processes and chemistry were found to not achieve uniformity of shape or near monodisperse quality, which leads to low tint strength and low My and Mc values. Additional milling time did not produce uniform spheroidal or sphere-like shapes, high Mc or My values or high tint strength. Further, in typical manufacturing methods disclosed herein a step includes the use of a filter with pore sizes that are larger than the typical particle sizes of embodiments disclosed herein (which are often much less than one micron), and the filtrate forms the dispersion. This comparatively large pore size filtration is evidence that the process, not sieving, is responsible for the sub-micron particle size distributions, uniformity of shape and near monodisperse quality in the pigment compositions.

Figure 19:
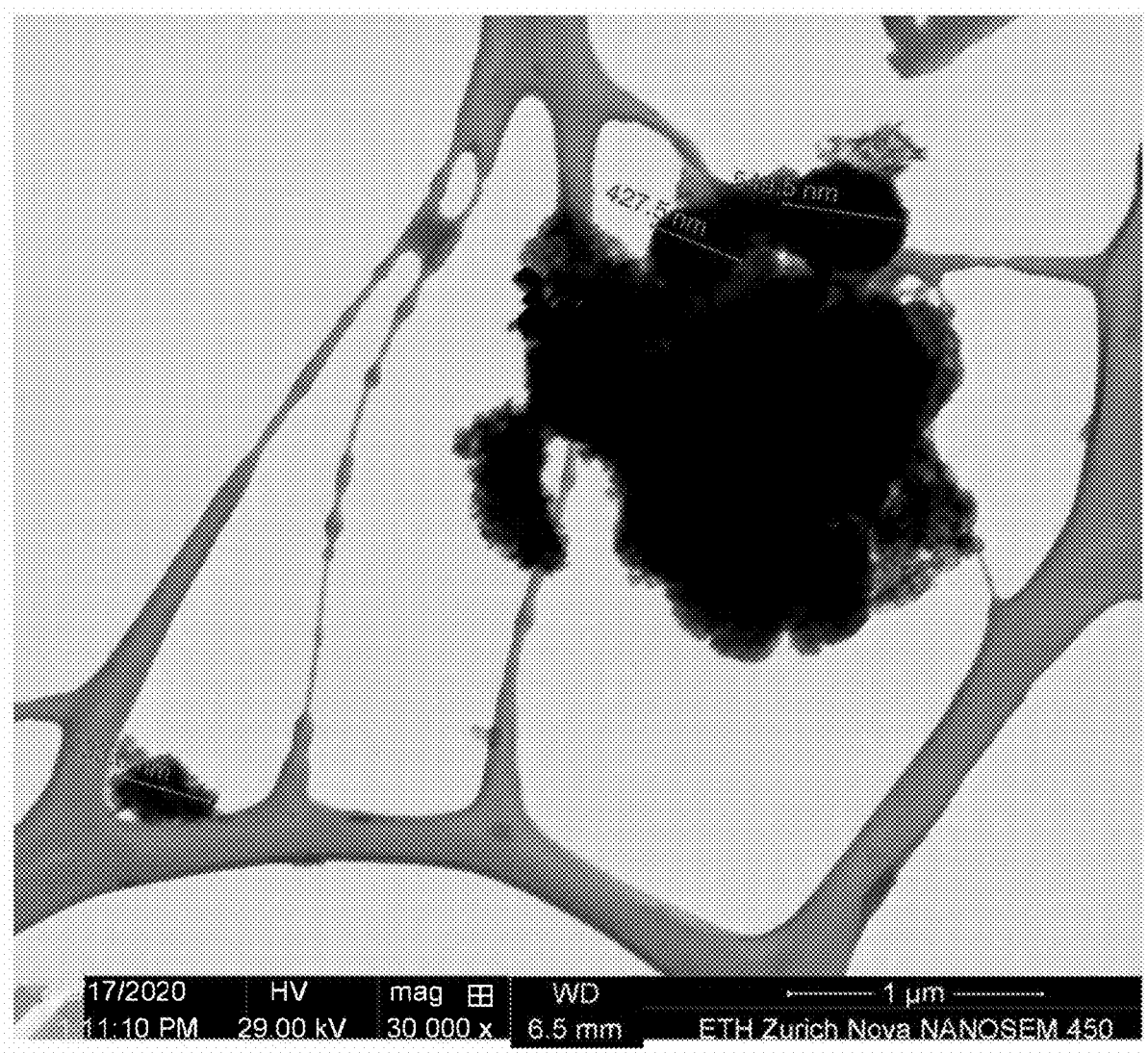
FIG. 19 shows a scanning transmission electron microscope image at a magnification of 50,000× from a Lacey STEM Process illustrating biomass-derived pigment particles from a commercially available reference source not associated with the present applicant.

For example, FIG. 19 is an image prepared using the Lacey STEM process illustrating biomass-derived pigment particles from a commercially available source not associated with the present applicant. Although these particles are milled (according to the company's web site), they do not achieve the same exceptional characteristics of the embodiments disclosed herein. Instead, small-scale fibrous features are evident on the surface of the particles in FIG. 19. This competitive material does not exhibit a smooth surface as defined herein, as evident from FIG. 27 which illustrates smooth surfaces of embodiments disclosed herein. In addition, the particles depicted in FIG. 19 exhibit considerable variations in size and deviations from a spheroidal geometric shape compared with FIGS. 5 and 6 which illustrate the spheroidal shape of embodiments disclosed herein.

Some embodiments of the technology disclosed herein provide a randomized sample of carbon pigment particles having a particle size distribution as measured by dynamic light scattering based on intensity that has an average particle size that is within a range between 115 and 120 nm and a polydispersity index that is within a range between 0.170 and 0.200, based on polystyrene latex with a refractive index of 1.590 and absorption of 0.010 as the reference material.

Some embodiments of the technology disclosed herein provide a randomized sample of sub-micron carbon pigment particles having a particle size distribution as measured by dynamic light scattering based on intensity that has an average particle size that is within a range between 165 and 171 nm and a polydispersity index that is within a range between 0.10 and 0.15, based on polystyrene latex with a refractive index of 1.590 and absorption of 0.010 as the reference material.

Some embodiments of the technology disclosed herein are characterized by a randomized sample of sub-micron carbon pigment particles having a particle size distribution measured by dynamic light scattering based on intensity that has an average particle size that is within a range between 115 and 120 nm and a polydispersity index that is within a range between 0.170 and 0.200, based on polystyrene latex with a refractive index of 1.590 and absorption of 0.010 as the reference material.

Some embodiments of the technology disclosed herein are characterized by a randomized sample of sub-micron carbon pigment particles having a particle size distribution measured by dynamic light scattering based on intensity that has an average particle size that is within a range between 165 and 171 nm and a polydispersity index that is within a range between 0.10 and 0.15, based on polystyrene latex with a refractive index of 1.590 and absorption of 0.010 as the reference material.

Some embodiments of the technology disclosed herein are characterized by a randomized sample of sub-micron carbon pigment particles having a particle size distribution measured by dynamic light scattering based on intensity that has an average particle size that is within a range between 115 and 120 nm and a polydispersity index that is within a range between 0.170 and 0.200, based on polystyrene latex with a refractive index of 1.590 and absorption of 0.010 as the reference material.

Some embodiments of the technology disclosed herein are characterized by a randomized sample of sub-micron carbon pigment particles having a particle size distribution measured by dynamic light scattering based on intensity that has an average particle size that is within a range between 165 and 171 nm and a polydispersity index that is within a range between 0.10 and 0.15, based on polystyrene latex with a refractive index of 1.590 and absorption of 0.010 as the reference material.

In some embodiments disclosed herein, under laser excitation at a wavelength of 514.5 nm with an 1800 gr/mm grating, compositions having carbonaceous particulate matter exhibit a Raman spectra with a G position between 1590 and 1595 (cm-1) and an I(D)/I(G) ratio between 2.54 and 3.02. In some embodiments disclosed herein, under laser excitation at a wavelength of 514.5 nm with an 1800 gr/mm grating, compositions having carbonaceous particulate matter exhibit a Raman spectra with a G position between 1585 and 1600 (cm-1) and an I(D)/I(G) ratio between 2.49 and 3.08. In some embodiments disclosed herein, under laser excitation at a wavelength of 514.5 nm with an 1800 gr/mm grating, compositions having carbonaceous particulate matter exhibit a Raman spectra with a G position between 1580 and 1605 (cm-1) and an I(D)/I(G) ratio between 2.43 and 3.14.

In some embodiments of the technology disclosed herein a dispersion includes 15-50% $W_P/W_T$ pigment particles and 15-50% $W_D/W_T$ of a sodium lignosulfonate or lignosulfonic acid dispersant or an unstructured or structured acrylic polymer or co-polymer dispersant or an unstructured or structured acrylate polymer or co-polymer dispersant or a hydroxy-functional carboxylic acid ester dispersant or a styrene maleic anhydride dispersant where $W_p$ is the weight of the pigment particles, and $W_D$ is the weight of the dispersant, and $W_T$ is the total weight of the dispersion and the fractions are expressed as percentages.

In some embodiments of the technology disclosed herein a dispersion includes 15-50% $W_p/W_T$ pigment particles, and 15-50% $W_D/W_T$ of an unstructured or structured acrylic polymer or co-polymer dispersant or an unstructured or structured acrylate polymer or co-polymer dispersant, or a sodium lignosulfonate or lignosulfonic acid sodium salt based dispersant, the dispersion characterized when tested according to the black pigment color analysis described herein as having an L* value in a range between 48.0 and 58.0 as read against a $TiO_2$ reference blank suspension having an L* value of 84.99 and having an a* value in a range between −0.23 and −0.42 as read against a $TiO_2$ reference blank suspension having an a* value of −0.16 and having a b* value in a range between 0.15 and 1.25 as read against a $TiO_2$ reference blank suspension having a b* value of 0.69 and having a dL* value in a range between −26 and −37 as read against a $TiO_2$ reference blank suspension having a dL* value of 84.99, where $W_p$ is the weight of the pigment particles, $W_D$ is the weight of the dispersant and $W_T$ is the total weight of the dispersion and the fractions are expressed as percentages.

In some embodiments of the technology disclosed herein a dispersion includes 15-50% $W_p/W_T$ pigment particles, and 15-50% $W_D/W_T$ of an unstructured or structured acrylic polymer or co-polymer dispersant or an unstructured or structured acrylate polymer or co-polymer dispersant, or a sodium lignosulfonate or lignosulfonic acid sodium salt based dispersant, the dispersion characterized when tested according to the black pigment color analysis described herein as having an L* value in a range between 40.0 and 65.0 as read against a $TiO_2$ reference blank suspension having an L* value of 84.99 and having an a* value in a range between −0.15 and −0.50 as read against a $TiO_2$ reference blank suspension having an a* value of −0.16 and having a b* value in a range between 0.1 and 1.5 as read against a $TiO_2$ reference blank suspension having a b* value of 0.69 and having a dL* value in a range between −20 and −45 as read against a $TiO_2$ reference blank suspension having a dL* value of 84.99, where $W_p$ is the weight of the pigment particles, $W_D$ is the weight of the dispersant and $W_T$ is the total weight of the dispersion and the fractions are expressed as percentages.

In some embodiments of the technology disclosed herein a dispersion includes pigment particles and a dispersant comprising modified acrylic or acrylate co-polymers with pigment affinic groups. In some embodiments this dispersion further includes a dispersion comprising hydroxyl-functional carboxylic acid esters with pigment affinic groups.

In some embodiments of the technology disclosed herein a dispersion includes pigment particles and a sodium lignosulfonate or lignosulfonic acid, sodium salt based dispersant and a hydroxyl-functional carboxylic acid ester with pigment affinic groups.

In some embodiments of the technology disclosed herein a dispersion includes rape seed oil.

In some embodiments of the technology disclosed herein the plant char is a biochar.

Particle Morphology and Identification

In some embodiments, disclosed herein are pigment dispersion compositions having carbonaceous particles derived from biochar that are formed as particles having a smooth surface (as illustrated in FIG. 27. As used herein the term "smooth surface" refers to a particle surface that when imaged with a Lacey STEM Process displays approximate spatial uniformity and consistency and where local variations in surface height have a wavy-like form, and surface height variations are without roughness or angularity.

FIGS. 1A, 1B, 2A and 2B illustrate particles that have sphere-like morphologies. Sphere-like morphologies are characterized by granular shapes that may be somewhat oblate or ellipsoidal in shape compared with a perfect sphere.

In some applications of the technology disclosed herein it may be desirable to use carbonaceous particles derived from biochar as a direct substitute for petroleum-derived carbon black. ASTM International maintains ASTM Standard D3053, "Standard Terminology Relating to Carbon Black," which is directed specifically to carbon black derived from petroleum. D3053 defines carbon black as "an engineered material, primarily composed of elemental carbon, obtained from the partial combustion or thermal decomposition of hydrocarbons, existing as aggregates of aciniform morphology which are composed of spheroidal primary particles which exhibit uniformity of primary particle sizes within a given aggregate and turbostratic layering within the primary particles." General scientific literature typically describes turbostratic structure as having carbon layers that are arranged in a haphazardly folded or crumbled manner. The turbostratic structure in the primary particles appear as nano-scale or smaller features.

Most commercial carbon black is produced from petroleum. In some embodiments disclosed herein carbon particles derived from biochar substantially conform to most of the first portion of the definition of carbon black in ASTM Standard D3053: "an engineered material, primarily composed of elemental carbon, obtained from the partial combustion or thermal decomposition of hydrocarbons, existing as aggregates of aciniform morphology which are composed of spheroidal primary particles which exhibit uniformity of primary particle sizes within a given aggregate." One difference between the first portion of ASTM D3053's definition of carbon black compared with embodiments of carbon particles derived from biochar as disclosed herein is that ASTM D3053-defined carbon black is "obtained from partial combustion or thermal decomposition of hydrocarbons [C+H]" whereas carbon particles derived from biochar are obtained from pyrolysis or thermal decomposition of carbohydrates (C+H+O). A further distinction is that in most applications of carbon particles derived from biochar, the final portion of the definition of carbon black (i.e., "turbostratic layering within the primary particles") does not affect pigment characteristics described herein and does not need to be evaluated.

The ASTM D3053 definition of carbon black refers to "aciniform morphology." Aciniform morphology is commonly understood to refer to "shaped like a cluster of grapes." This describes in part certain embodiments of pigment compositions comprising carbonaceous particles derived from biochar that are disclosed herein. However, a more complete term for pigment compositions comprising carbonaceous particles derived from biochar is "chained aciniform morphology." As used herein the term "chained aciniform morphology" refers to two grape-like clusters of particles that are interconnected by at least one particle that connects to only two other particles.

Figure 20:
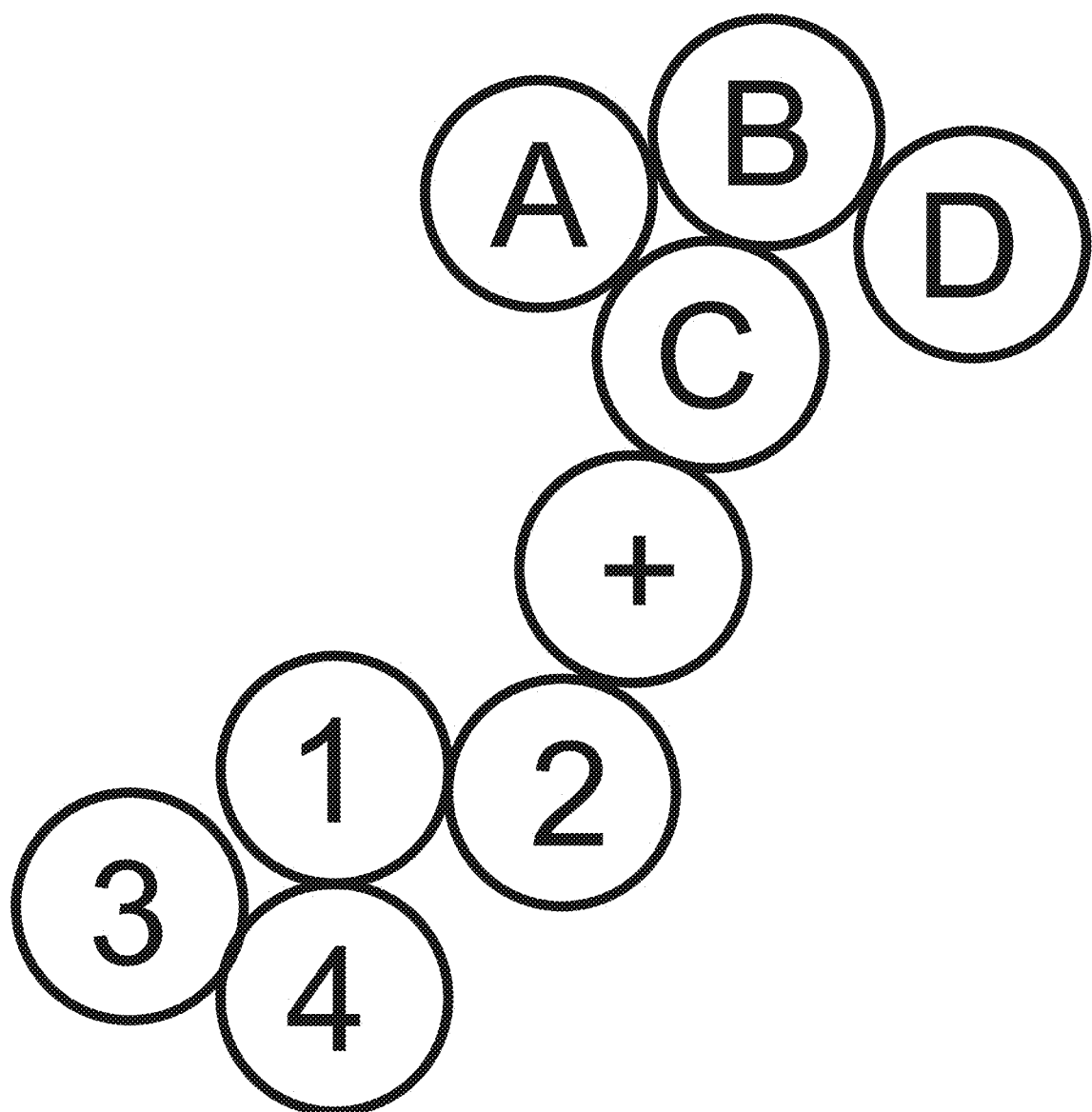
FIGS. 20-21 show somewhat schematic illustrations of a chained aciniform morphology of pigment products according to the disclosure.
Figure 21:
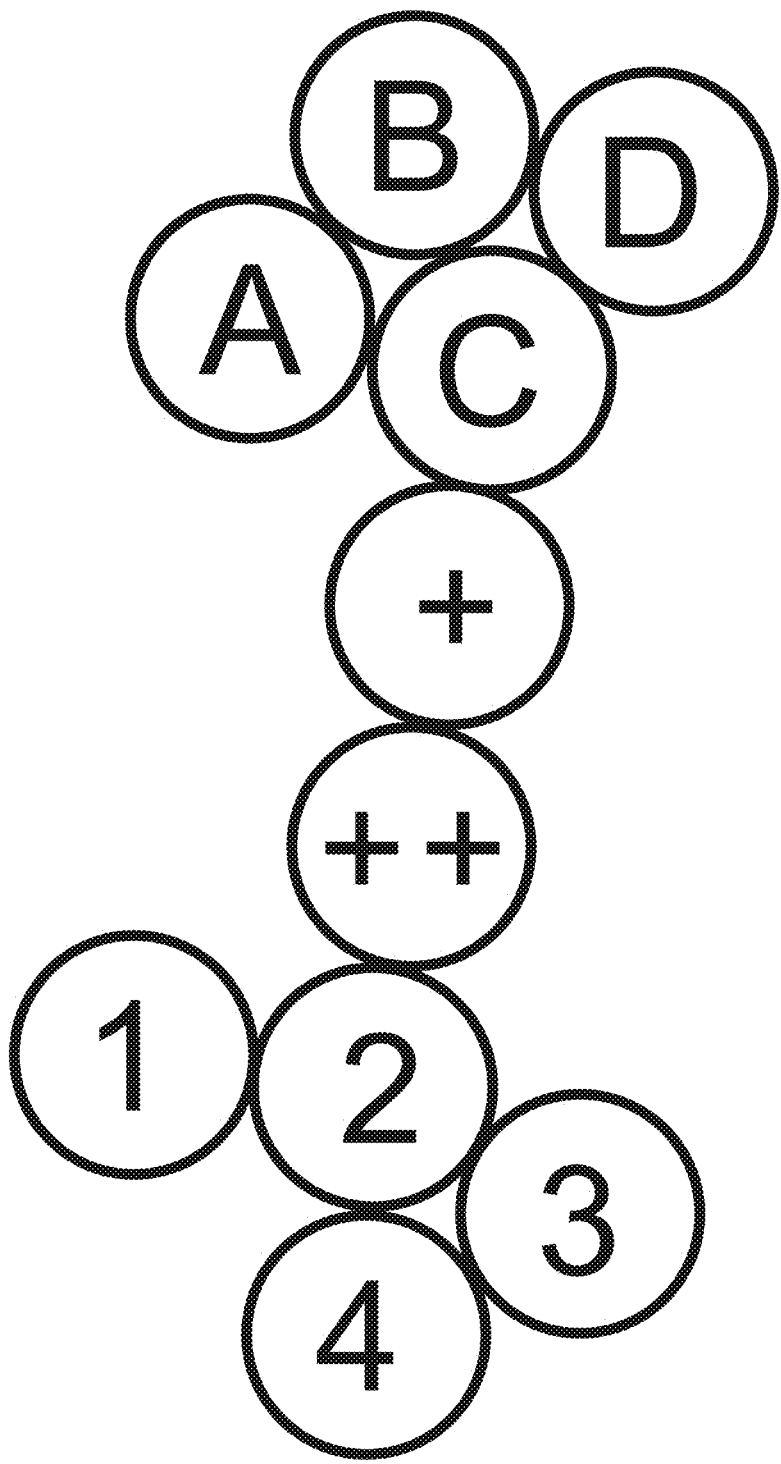
Figure 22:
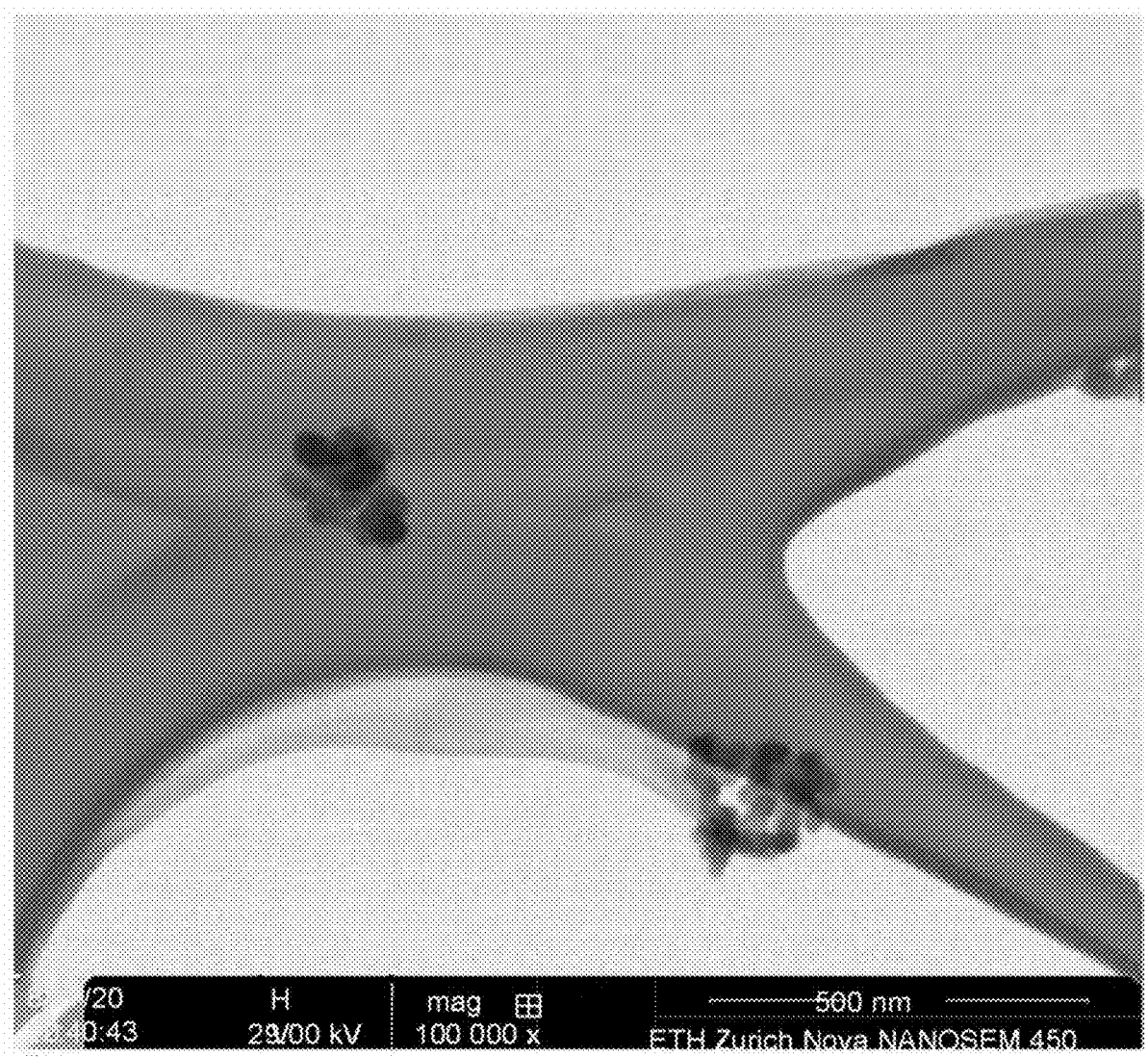
FIG. 22 shows a scanning transmission electron microscope image at a magnification of 100,000× from a Lacey STEM Process illustrating clusters of reference commercial petroleum-derived carbon black.

FIGS. 20 and 21 illustrate a first cluster of particles A, B, C, and D and a second cluster of particles 1, 2, 3, 4. In FIG. 20 the first cluster of particles and the second cluster of particles are connected by a particle "+" that only connects to two other particles ("C" and "2"). In FIG. 21 the first cluster of particles and the second cluster of particles are interconnected by particles "+" and "++". Particle "+" connects only to particle "C" and "++" and particle "++" connects only to particles "+" and "2".

Figure 5A:
FIG. 5A a scanning transmission electron microscope image at a magnification of 50,000× from a Lacey STEM Process illustrating interconnecting particles evidencing a chained aciniform morphology.

FIG. 5A (bearing annotations of FIG. 5) illustrate grape-like clusters (shown encircled) and interconnecting particles (identified by pointing arrows) that connect to only two other particles, evidencing a chained aciniform morphology.

It is generally known that in liquids carbon black derived from petroleum creates clusters called "structure." The term "high structure" refers to clusters with a lot of branches and "low structure" refers to clusters with few branches. These clusters are often referred to as "transient structures" because the structures can be broken up with milling or force. In contrast, and surprisingly, some embodiments of carbonaceous particles derived from biochar disclosed herein form structure (e.g., a chained aciniform morphology) through milling or force.

One measure of the degree of structure in carbon particulates is the oil absorption number (OAN). The OAN is the number of cubic centimeters of dibutyl phthalate (DBP) or paraffin oil absorbed by 100 g of carbon black under specified conditions. The OAN value is proportional to the degree of aggregation of structure level of the carbon black. A high OAN number corresponds to a high structure, i.e. a high degree of branching and clustering of the aggregates. The OAN value for samples of pigments having carbonaceous particulate matter derived from biochar is determined using ASTM D2414, "Oil Absorption Number of Sample (OAN)" with dibutyl phthalate (DBP) used as the oil. Procedures for conducting this test are sufficient in that standard without a need for further elaboration.

A sample of feedstock for a pigment dispersion formulation having carbonaceous particulate matter derived from biochar as disclosed herein was tested according to ASTM D2414 and the result was an OAN number of 136.4 ml/100 g. This is surprising because the OAN for loose black petroleum carbon black is typically less than about 132 ml/100 g.

Figure 23:
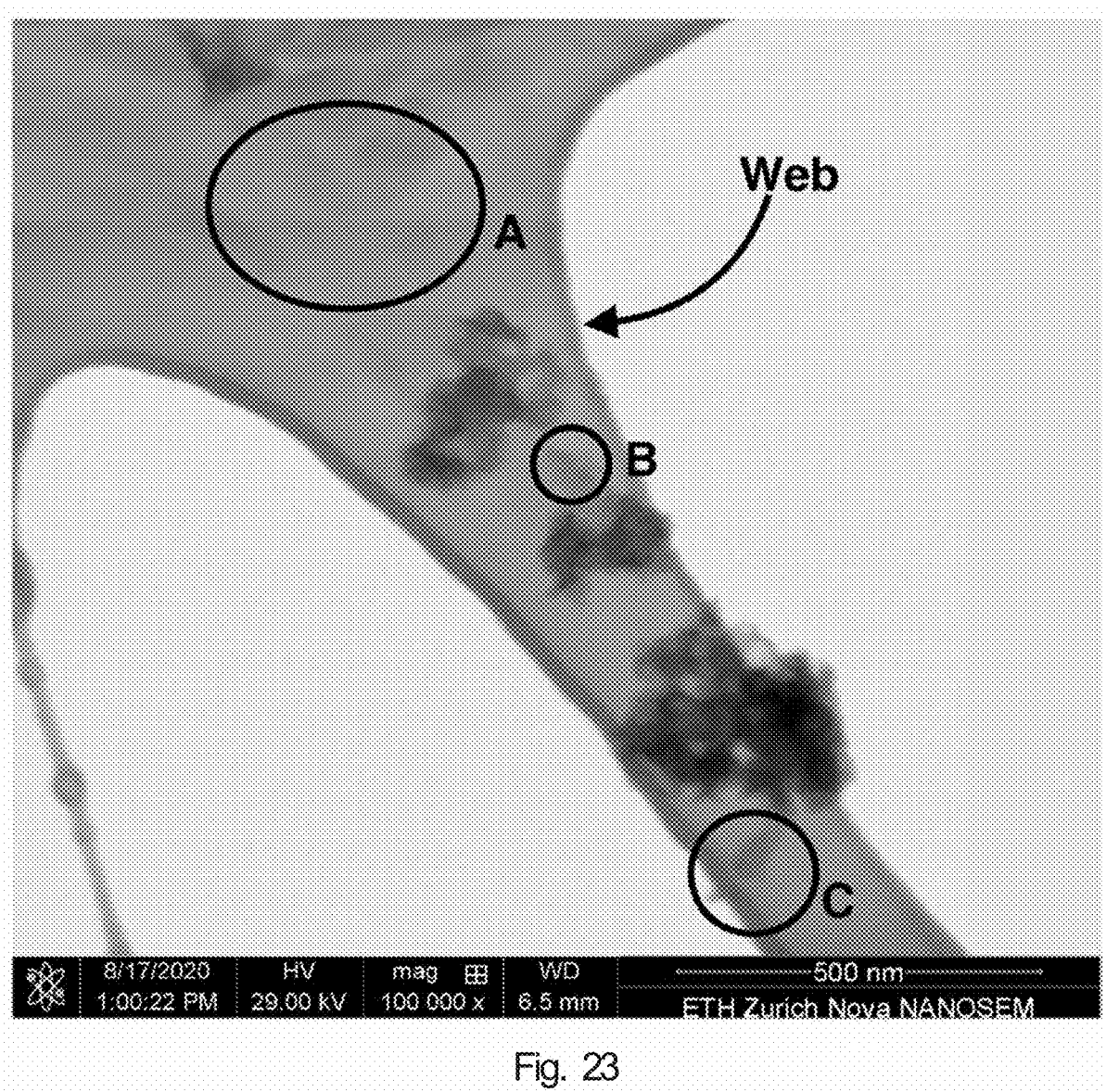
FIG. 23 shows a scanning transmission electron microscope image at a magnification of 100,000× from a Lacey STEM Process illustrating biomass-derived pigment particles from a commercially available reference source.
Figure 24:
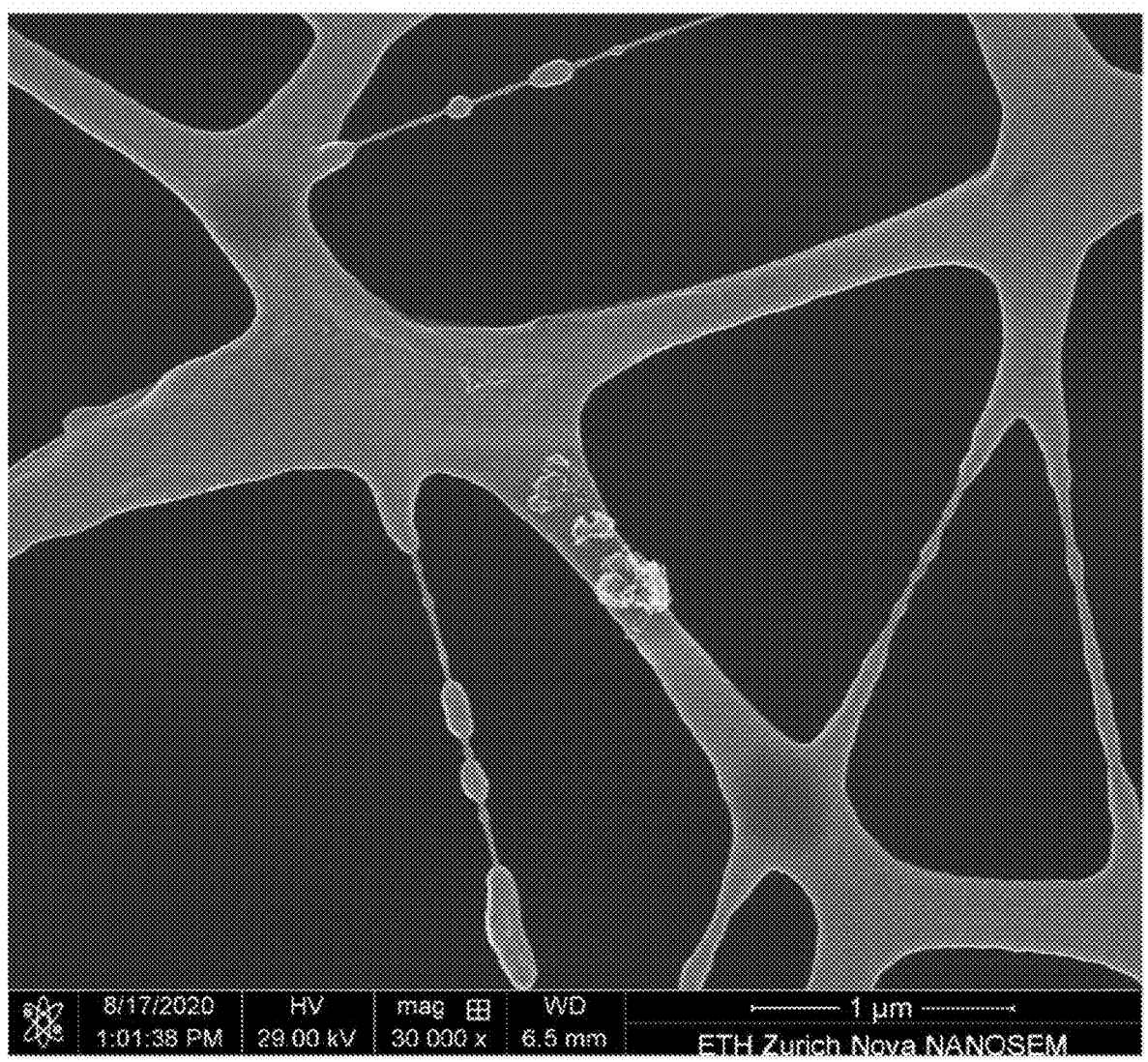
FIG. 24 shows the image of FIG. 23 at a magnification of 30,000×, without electron transmission.

Referring again to the commercially available biomass-derived pigment particles and FIG. 19 depicting a micrograph of a competitive product, three individual particles are measured at 433.6 nm, 427.5 nm and 549.5 nm. These particles are much larger than embodiments disclosed herein having particles less than 100 nm in diameter. Furthermore, the biomass-derived pigment particles from a commercially available source not associated with the present applicant, as depicted in FIG. 19 do not exhibit the chained aciniform morphology disclosed herein. This disparity is further evident from FIG. 23. FIG. 23 illustrates the "web" that is characteristic in photomicrograph images made from the Lacey STEM process. FIG. 23 also illustrates that in some instances there may be portions of an image (labeled A, B, and C) that present some ambiguity in determination of what represents particles and what represents inhomogeneity of the web. These ambiguities may be resolved by referring to the image processed without transmission in order to not see through the particles. That variation is depicted in FIG. 24. The material depicted in image of FIG. 24 is the same as that in FIG. 23 except that the image of FIG. 24 is at a magnification of 30,000× (compared with 100,000× in FIG. 23) so the objects appear smaller in FIG. 24. None-the-less, it is apparent from FIG. 24 that the regions A, B, and C are not images of particles.

Figure 25:
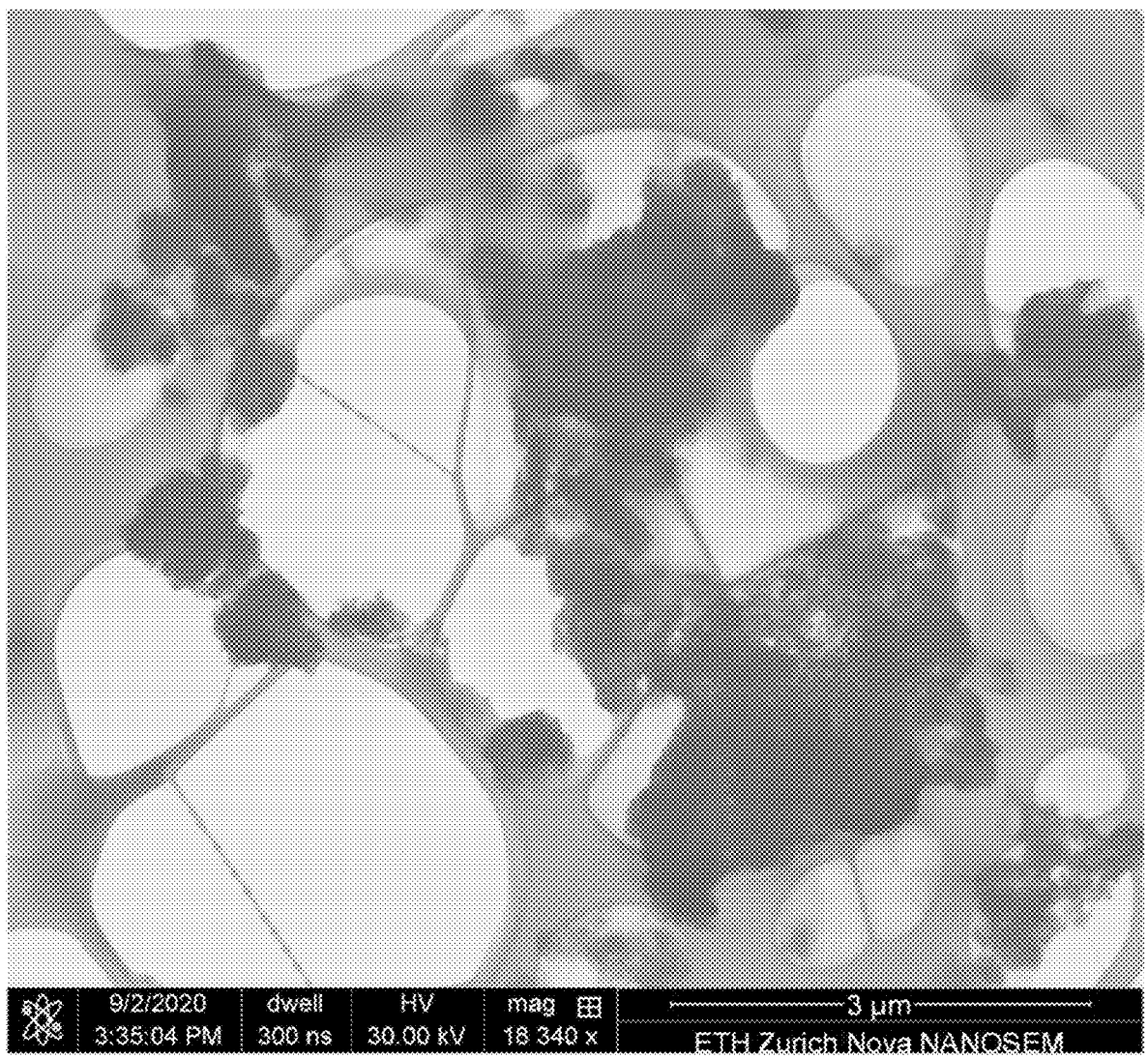
FIG. 25 shows a scanning transmission electron microscope image at a magnification of 30,000× from a Lacey STEM Process illustrating biomass-derived pigment particles from a commercially available reference source.
Figure 26:
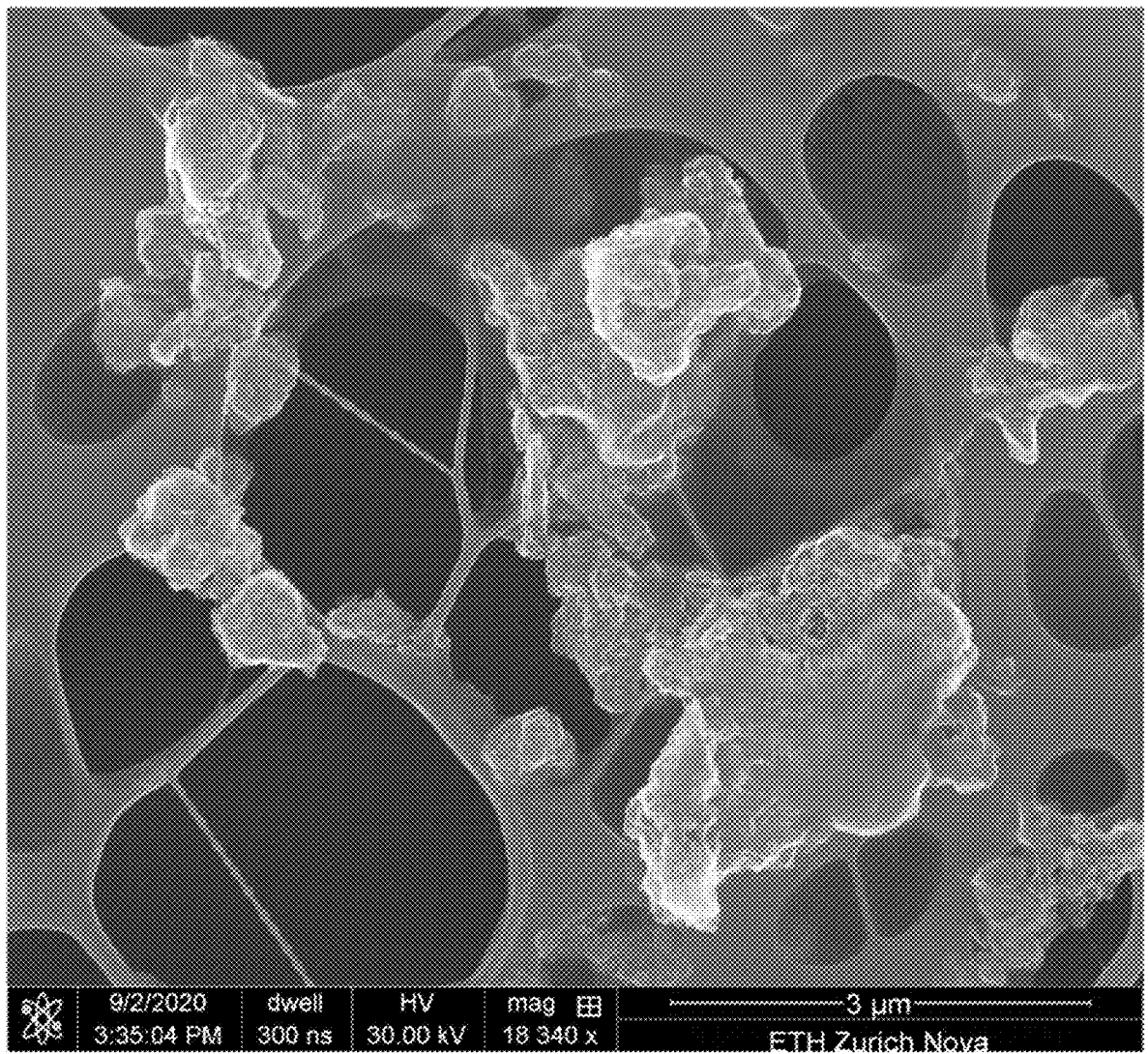
FIG. 26 shows the image of FIG. 25 without electron transmission.

FIG. 25 in combination with FIG. 26 illustrate that particles from the commercial source of pigments derived from biomass do not exhibit the smooth surfaces of embodiments of the present disclosure that are evident from FIG. 27. Any ambiguity about roughness of the surface of particles in FIG. 25 imaged from a Lacey STEM process is resolved in view of FIG. 26 which portrays the same particles of FIG. 25 without electron transmission.

The embodiments disclosed herein for carbonaceous particles derived from biochar having a chained aciniform morphology are quite unexpected, in view of the state-of-the art of carbonaceous pigments at the priority date of this disclosure.

In some embodiments, particularly in embodiments of particles milled with a fluid and dried and imaged with the Sputtering Process, the morphologies of aggregates of pigment particles made from plant chars show the particle surface and shape. Disclosed herein in some embodiments are pigment carbon particles formed as mostly individual particles (as illustrated in FIGS. 1A, 1B, 2A and 2B). Such particles would be expected to exhibit the chained aciniform morphology when imaged with the Lacey STEM process.

Disclosed here are various biochars and combinations of biochars evaluated for effectiveness as a potential pigment. Features evaluated included surface area, surface groups, pure carbon content, ash content, compatibility with dispersants, the amount of polyaromatic hydrocarbons, and the size of the particles resulting from milling of the biochar. The following one or more criteria were used to select appropriate plant char feed stock for milling pigments: a surface area above 200 m2/g; a carbon content of ≥80%; an ash content of ≤20%; high compatibility with dispersants; polycyclic aromatic hydrocarbon (PAH) content of ≤50 mg/kg; and ability of the feedstock to be milled to a d90 particle size of less than 1 micron. In some embodiments, a high compatibility with dispersants is one or more of the following; pigment loading of a minimum of 20% in a dispersion while also maintaining low viscosity during milling or grinding; minimal or no gelling during grinding or milling; little to no phase separation after milling; stable viscosity through Oven Testing at 60° C. for 5 weeks; and stable storage for a minimum of 1 month.

Petroleum carbon black (PCB) particles aggregate together to make fused small branches. This is sometimes referred to as "high" structure if multiple branches are made and "low" structure if only one or two branches are made. Typically, high structure improves dispersibility of the carbon but reduces blackness. Unexpectedly, embodiments of dispersions of carbonaceous particulate matter derived from biochar disclosed herein have comparatively high structure and yet exhibit exceptional blackness.

PCB can lean towards brown or other colors, commonly called "bronzing." In some embodiments, disclosed herein are particles with a much truer black color. This characteristic is referred to as Masstone. With PCB, the smallest primary particle sizes, such as 10 nm, are typically required for a blue black. In some embodiments, disclosed herein are primary particles with larger sizes, such as 25 nm, which achieve a blue black. The advantage is easier dispersions with preferred black hues.

In some embodiments, the char particles disclosed herein are 100% bio-renewable.

Samples of biochar feedstock for pigment dispersion formulations comprising carbonaceous particulate matter derived from biochar are tested for PAH content according to the following "PAH Protocol."

Samples are tested using Environmental Protection Agency (EPA) Method: SW846 8270C, Semi-volatile Organic Compounds by Gas Chromatography/Mass Spectrometry (GC/MS)

Method 8270 is used to determine the concentration of semi-volatile organic compounds in extracts prepared from many types of solid waste matrices, soils, air sampling media and water samples.

The extracts are performed by EPA Method SW846 3546

The extracts are tested for Semi-volatile Organic Compounds, or PAHs, using EPA Method SW846 8270C In some embodiments the char particles disclosed herein have undetectable (ND) amounts of polycyclic aromatic hydrocarbons (PAH), as indicated by the following test results.

| CAS No. | Compound | Result | RL | MDL | Units |
| --- | --- | --- | --- | --- | --- |
| 83-32-9 | Acenaphthene | ND | 2200 | 540 | ug/kg |
| 208-96-8 | Acenaphthylene | ND | 2200 | 540 | ug/kg |
| 120-12-7 | Anthracene | ND | 2200 | 540 | ug/kg |
| 56-55-3 | Benzo(a)anthracene | ND | 2200 | 540 | ug/kg |
| 205-99-2 | Benzo(b)fluoranthene | ND | 2200 | 540 | ug/kg |
| 207-08-9 | Benzo(k)fluoranthene | ND | 2200 | 540 | ug/kg |
| 191-24-2 | Benzo(g,h,i)perylene | ND | 2200 | 540 | ug/kg |
| 50-32-8 | Benzo(a)pyrene | ND | 2200 | 540 | ug/kg |
| 218-01-9 | Chrysene | ND | 2200 | 540 | ug/kg |
| 53-70-3 | Dibenzo(a,h)anthracene | ND | 2200 | 540 | ug/kg |
| 206-44-0 | Fluoranthene | ND | 2200 | 540 | ug/kg |
| 86-73-7 | Fluorene | ND | 2200 | 540 | ug/kg |
| 193-39-5 | Indeno(1,2,3-cd)pyrene | ND | 2200 | 540 | ug/kg |
| 90-12-0 | 1-Methylnaphthalene | ND | 2200 | 760 | ug/kg |
| 91-57-6 | 2-Methylnaphthalene | ND | 2200 | 980 | ug/kg |

-continued

| | | | | | |
|---|---|---|---|---|---|
| 91-20-3 | Naphthalene | ND | 2200 | 760 | ug/kg |
| 85-01-8 | Phenanthrene | ND | 2200 | 540 | ug/kg |
| 129-00-0 | Pyrene | ND | 2200 | 540 | ug/kg |

| CAS No. | Surrogate Recoveries | Run# 1 | Run# 2 | Limits |
|---|---|---|---|---|
| 321-60-8 | 2-Fluorobiphenyl | 21%$^b$ | 1%$^b$ | 23-130% |
| 4165-60-0 | Nitrobenzene-d5 | 31% | 6%$^b$ | 12-131% |
| 1718-51-0 | Terphenyl-d14 | 1% | 0%$^b$ | 29-141% |

(a) Sample extracted beyond hold time.
(b) Outside control limits due to matrix interference. Confirmed by re-extraction and reanalysis.
ND = Not detected
MDL = Method Detection Limit
RL = Reporting Limit
E = Indicates value exceeds calibration range
J = Indicates an estimated value
B = Indicates analyte found in associated method blank
N = Indicates presumptive evidence of a compound In some embodiments the PAH content may be less than the following amounts in Table 1, which are typically 90% less than PCB.

TABLE 1

| PAH | mg/kg |
|---|---|
| BENZO(a)PYRENE | <1 |
| BENZO(e)PYRENE | <1 |
| BENZO(a)ANTHRACENE | <1 |
| BENZO(b)FLUORANTHENE | <1 |
| BENZO(j)FLUORANTHENE | <1 |
| BENZO(k)FLUORANTHENE | <1 |
| CHRYSENE | <1 |
| DIBENZO(a,h)ANTHRACENE | <1 |
| BENZO(g,h,i)PERYLENE | <1 |
| INDENO(1,2,3-cd)PYRENE | <1 |
| ACENAPHTHYLENE, ACENAPHTHENE, FLUORENE, PHENANTHRENE, PYRENE, ANTHRACENE, FLUORANTHENE | <50 Sum |
| NAPHTHALENE | <1 |
| Sum of 18 PAH | <50 |

Applications

Some embodiments of pigment dispersions disclosed herein are suitable for digital (inkjet) printing. In some embodiments, the digital ink is used in consumer home printers, and/or in the coloration of textiles, banners, paper, packaging and other materials. In some embodiments, the dispersions disclosed herein are suitable for multiple types of printing and coloring, including but not limited to screen printing, rotary printing, off-set printing, flexo printing, gravure printing, continuous pigment dyeing, pad dyeing, dope dyeing, solution dyeing, foam coating, spray coating or block printing. In some embodiments, the dispersions disclosed herein are suitable for leather or polyurethane coating, paper coating, industrial coatings, paint and wood coloring. In some embodiments, the dispersions disclosed herein are suitable for packaging, such as food packaging or cardboard boxes, and for imprinting plastics or metallic films. In some embodiments, the dispersions disclosed herein are suitable for coloring non-aqueous polymers including molded forms and fibers.

Methods of Manufacturing

Various methods of manufacturing the particles and dispersions used for pigmentation may be used to manufacture pigments and dispersions disclosed herein. A pigment composition may be produced by the method of any one of the following embodiments.

In some embodiments, a method includes the following steps:
 (a) combining a biochar and dispersant and mixing to form a first mixture;
 (b) adding to the first mixture water and optionally defoamer and optionally an anti-coagulant and mixing to form a second mixture;
 (c) letting the second mixture stand for a standing period and optionally decanting water from the top, to form a third mixture
 (d) milling the third mixture in a media or ball mill with beads between 0.1-1.0 mm with a flow rate of 50-200 mL per minute and for 1-8 hours to form a fourth mixture; and
 (e) straining the fourth mixture through a 0.1-10-micron filter under vacuum;
 wherein steps (a) and (b) are optionally performed under a vacuum and the filtrate is the pigment dispersion composition.

In some embodiments, the first mixture is mixed manually or with a z-blade mixer. In some embodiments, the second mixture is mixed with a high shear stirrer for 30-60 minutes. In some embodiments, the standing period is between 1-24 hour, or such that the water uniformly covers the surface of the second mixture. In some embodiments, the ball mill media is 0.5 mm or 0.3 mm. In some embodiments, the flow rate is 80-100 mL per minute. In some embodiments, the third mixture is milled for 3-4 hours. In some embodiments, the filter is a polypropylene bag. In some embodiments, the filter is a 1-5-micron polypropylene bag. In some embodiments, the filter is a screen at the exit point of the mechanical mill. In some embodiments, the screen filter size is 1-10 micron.

In some embodiments a method includes the following steps:
 (a) combining a dispersant and a milling fluid, and optionally a defoamer, and optionally an anti-coagulant and mixing to form a first mixture;
 (b) adding a biochar feed stock to the first mixture and mixing to form a second mixture;
 (c) milling the second mixture with beads having a diameter between 0.1-1.0 mm with a flow rate of 7-200 mL per minute for 1 to 8 hours to form a third mixture; and
 (d) filtering the third mixture through a filter with an average pore size in the range from 1 to 10-microns under vacuum, wherein the filtrate is the pigment composition.

In some embodiments the milling fluid of step (a) comprises water. In some embodiments the milling fluid of step (a) comprises a solvent. In some embodiments the mixing of step (b) is performed as a batch using a mechanical stirrer for 30 to 60 minutes to form the second mixture. In some embodiments step (b) is performed under a vacuum or de-aerator. In some embodiments, the filter is a polypropylene bag. In some embodiments, filter is a 1-5-micron polypropylene bag. In some embodiments, the filter is a screen at the exit point of the mechanical mill. In some embodiments, the screen filter size is 1-10 micron. In some embodiments the filtrate of step (d) is de-aerated under vacuum to form the pigment composition.

In some embodiments a method includes the following steps:
 (a) combining a dispersant and optionally one or more monomer, and optionally one or more oligomer, and optionally an anti-coagulant and mixing to form a first mixture (b) adding a biochar feedstock to the first mixture and mixing to form a second mixture (c) milling the second mixture with a three-roll mill where 1-8 passes are made (d) filtering the third mixture through a filter with an average pore size in the range from 1 to 10 microns under vacuum, and the filtrate is the pigment composition.

Steps (a) and (b) are optionally performed under a vacuum or de-aerator

In some embodiments, the feed stock for pigment particles produced with the technology disclosed herein is plant char feed stock provided as granular solids. In preferred embodiments the plant char is biochar. In some embodiments, granular solids are milled in a micromedia ball mill. In some embodiments, 0.3 mm or 0.5 mm beads may be used, separately, or one at a time to achieve the smallest particle sizes. In some embodiments, the grinding process incorporates these solid materials into a liquid vehicle or grinding resin. In some embodiments, granular solids are milled in a three-roll mill. In some embodiments, the granular solids are milled on a horizontal mill. During each of these processes, the biochar feedstock of granular solids is converted into a dispersion of particulate matter.

Experimental

Dispersions comprising biochar particles were evaluated. The dispersions were prepared according to the general preparation steps below.

Step 1. The pigment feedstock (e.g. wood biochar) and dispersant were weighed and added into a mixing vessel and mixed manually or with a z-blade mixer.

Step 2. Water and auxiliaries such as defoamer, anti-coagulant and optional antimicrobials were added to the mixture. The mixture was mixed using a high shear stirrer, such as a Ross Mixer or Cowles mixer, for 30-60 minutes. For some formulations, the premixing was done under a vacuum to aid in wetting the pigment.

Step 3. The mixture was left to stand for 1-24 hours to "wet out" allowing water to completely cover the surface area of the material. The water was decanted from the top of the mixture.

Step 4. The decanted mixture was placed into a media or ball mill with either 0.5 mm or 0.3 mm beads depending on pigment percentage in mix. Milling started at a flow rate of 80-100 ml per minute and ran for 3-4 hours depending on type of mill and formulation. A dispersion was formed.

Step 5. Using a vacuum, the dispersion was filtered through a 1-5-micron polypropylene bag filter, based on final application needs, to remove any large particles.

Formulations

Formulation 1

Formulation 1 is a dispersion for formulation by a general method described above. The formulation is 35% Bamboo wood biochar, 10% 100% active comb-branched copolymer dispersant, and the remainder iso-propyl acetate.

Formulation 2

Formulation 2 is a dispersion for formulation by a general method described above. The formulation is 40% Oak wood biochar, 26% aromatic polyethylene glycol ether phosphate dispersant, 9% micro fibrillated cellulose, 0.5% oil-silica based defoamer, and the remainder deionized water.

Formulation 3

Formulation 3 is a dispersion for formulation by a general method described above. The formulation is 35% Cottonwood wood biochar, 30% polyether phosphate dispersant, 8% micro fibrillated cellulose, 0.5% molecular based defoamer, and the remainder deionized water.

Formulation 4

Formulation 4 is a dispersion for formulation by a general method described above. The formulation is 40% animal bone biochar, 10% carboxylic acid dispersant, 10% micro fibrillated cellulose, 0.2% silicone based defoamer, and the remainder deionized water.

Formulation 5

Formulation 5 is a dispersion for formulation by a general method described above. The formulation is 70% Tupelo wood biochar, 13% ammonium salt polyacrylate dispersant, 8% micro fibrillated cellulose, 0.5% oil-wax based defoamer, and the remainder deionized water.

Formulation 6

Formulation 6 is a dispersion for formulation by a general method described above. The formulation is 30% Bamboo wood biochar, 5% 100% active structured acrylic copolymer, 30% oligomer and 35% blend of monomers.

Formulation 7

Formulation 7 is a dispersion for formulation by a general method described above. The formulation is 50% Cedar wood biochar, 15% polyurethane based dispersant, 8% micro fibrillated cellulose, 0.5% oil based defoamer, and the remainder deionized water.

Formulation 8

Formulation 8 is a dispersion for formulation by a general method described above. The formulation is 50% Bamboo wood biochar, 20% lecithin dispersant, 8% micro fibrillated cellulose, 0.5% oil based defoamer, and the remainder deionized water.

Formulation 9

Formulation 9 is a dispersion for formulation by a general method described above. The formulation is 50% Cedar wood biochar, 25% polyvinyl acetate dispersant, 8% micro fibrillated cellulose, 0.5% oil based defoamer, and the remainder deionized water.

Formulation 10

Formulation 10 is a dispersion for formulation by a general method described above. The formulation is 20% Maple wood biochar, 10% Phosphoric acid ester salt of a high molecular weight copolymer with pigment affinic groups, 70% ethyl acetate.

Formulation 11

Formulation 11 is a dispersion formulated by a general method described above. The formulation is 40% Pine wood biochar, 25% structured acrylate copolymer with pigment affinic groups with controlled polymerization dispersant 5% micro fibrillated cellulose, 0.5% oil based defoamer, and the remainder deionized water. See characterization data below.

Formulation 12

Formulation 12 is a dispersion formulated by a general method described above. The formulation is 68% Birch tree biochar, 22% ethoxylated fatty acid ester dispersant, and the remainder deionized water.

Formulation 13

Formulation 13 is a dispersion formulated by a general method described above. The formulation is 35% Cottonwood tree biochar, 30% styrene/maleic anhydride copolymer dispersant, 2.5% glycol emulsion defoamer, 3.0% caprylhydroxamic acid preservative, and the remainder deionized water.

Formulation 14

Formulation 14 is a dispersion formulated by a general method described above. The formulation is 15% Elm tree biochar, 20% sorbitan monolaurate dispersant, 8% micro fibrillated cellulose anti-coagulant, 0.3% modified fatty acid based defoamer, and the remainder deionized water.

Formulation 15

Formulation 15 is a dispersion formulated by a general method described above. The formulation is 43% Sugi tree biochar, 47% nitrogen graft polymer dispersant, 0.5% oil based defoamer, 1.0% ortho-phthalaldehyde preservative, and the remainder deionized water.

Formulation 16

Formulation 16 is a dispersion formulated by a general method described above. The formulation is 30% Poplar tree biochar, 25% sodium salt lignosulfonate dispersant, 5% micro fibrillated cellulose, 0.5% oil based defoamer, and the remainder deionized water.

Formulation 17

Formulation 17 is a dispersion for formulation by a general method described above. The formulation is 20% Pine wood tree biochar, 15% acrylate block copolymer with controlled free radical polymerization dispersant, 5% micro fibrillated cellulose, 0.5% oil based defoamer, and the remainder non-deionized water.

Formulation 18

Formulation 18 is a dispersion for formulation by a general method described above. The formulation is 65% Cedar tree biochar, 15% polyurethane-based dispersant, 10% micro fibrillated cellulose anti-coagulant, 0.5% oil-silica based defoamer, and the remainder deionized water.

Formulation 19

Formulation 19 is a dispersion for formulation by a general method described above. The formulation is 55% Cottonwood tree biochar, 20% ethoxylated fatty acid ester dispersant, 10% micro fibrillated cellulose, 0.6% silicone based defoamer, and the remainder deionized water.

Formulation 20

Formulation 20 is a dispersion for formulation by a general method described above. The formulation is 42% Pecan tree biochar, 20% sorbitan monolaurate dispersant, 10% micro fibrillated cellulose, 0.6% oil-wax based defoamer, and the remainder deionized water.

Formulation 21

Formulation 21 is a dispersion for formulation by a general method described above. The formulation is 70% Poplar tree biochar, 15% butyl acetate dispersant, 2% micro fibrillated cellulose anti-coagulant, 0.5% oil based defoamer, 0.1% propyl gallate preservative, and the remainder deionized water.

Formulation 22

Formulation 22 is a dispersion for formulation by a general method described above. The formulation is 54% Elm tree biochar, 20% butyl acetate dispersant, 10% micro fibrillated cellulose, 2.0% oil based defoamer, and the remainder deionized water.

Formulation 23

Formulation 23 is a dispersion for formulation by a general method described above. The formulation is 46% Elm tree biochar, 40% polyether phosphate dispersant, 10% micro fibrillated cellulose, 0.8% oil-wax defoamer, and the remainder deionized water.

Formulation 24

Formulation 24 is a dispersion for formulation by a general method described above. The formulation is 43% Hemlock tree biochar, 15% alkanol-amines dispersant, 6% micro fibrillated cellulose, and the remainder deionized water.

Formulation 25

Formulation 25 is a dispersion for formulation by a general method described above. The formulation is 23% Cottonwood tree biochar, 20% glycerol monostearate dispersant, 5% micro fibrillated cellulose, 2.0% oil based defoamer, and the remainder deionized water.

Formulation 26

Formulation 26 is a dispersion for formulation by a general method described above. The formulation is 25% Boxelder tree biochar, 20% styrene/maleic anhydride copolymer dispersant, 8% micro fibrillated cellulose, 0.05% oil based defoamer, and the remainder deionized water.

Formulation 27

Formulation 27 is a dispersion for formulation by a general method described above. The formulation is 14% Empress tree biochar, 40% polyvinyl acetate dispersant, 6% micro fibrillated cellulose, 0.8% silicone based defoamer, and the remainder deionized water.

Formulation 28

Formulation 28 is a dispersion for formulation by a general method described above. The formulation is 41% Pecan tree biochar, 40% quaternary ammonia salt dispersant, 7% micro fibrillated cellulose, 2.5% oil based defoamer, and the remainder deionized water.

Formulation 29

Formulation 29 is a dispersion for formulation by a general method described above. The formulation is 60% Pine tree biochar, 24% terpolymers of benzyl methacrylate acid dispersants, 8% micro fibrillated cellulose, 0.5% oil based defoamer, and the remainder deionized water.

Formulation 30

Formulation 30 is a dispersion for formulation by a general method described above. The formulation is 63% Birch tree biochar, 24% fatty acid calcium dispersant, 13% micro fibrillated cellulose, 0.5% oil-wax based defoamer, and the remainder deionized water.

Formulation 31

Formulation 31 is a dispersion for formulation by a general method described above. The formulation is 45% Fir tree biochar, 24% quaternary ammonia salt dispersant, 14% micro fibrillated cellulose, and the remainder a solvent.

Formulation 32

Formulation 32 is a dispersion for formulation by a general method described above. The formulation is 23% Fir tree biochar, 35% polyurethane-based dispersant, 14% micro fibrillated cellulose, 0.7% oil based defoamer, and the remainder deionized water.

Formulation 33

Formulation 33 is a dispersion for formulation by a general method described above. The formulation is 40% Hemlock tree biochar, 15% polycarboxylic acid dispersant, 17% micro fibrillated cellulose, 0.7% silicone based defoamer, and the remainder deionized water.

Formulation 34

Formulation 34 is a dispersion for formulation by a general method described above. The formulation is 43% Larch tree biochar, 15% potassium polyacrylate dispersant, 0.09% siloxane defoamer, and the remainder deionized water.

Formulation 35

Formulation 35 is a dispersion for formulation by a general method described above. The formulation is 61% Sugi tree biochar, 10% hydroxy ethyl methyl cellulose dispersant, 10% micro fibrillated cellulose, 0.8% oil based defoamer, and the remainder deionized water.

Formulation 36

Formulation 36 is a dispersion for formulation by a general method described above. The formulation is 52% Empress tree biochar, 10% saponified vegetable oil dispersant, 10% micro fibrillated cellulose, 0.9% oil based defoamer, and the remainder deionized water.

Formulation 37

Formulation 37 is a dispersion for formulation by a general method described above. The formulation is 53% Coffee pulp biochar, 20% 2-amino-2methyl-1-propanol dispersant, 10% micro fibrillated cellulose, 0.7% silicone defoamer, and the remainder deionized water.

Formulation 38

Formulation 38 is a dispersion for formulation by a general method described above. The formulation is 41% Sugi tree biochar, 30% polyethylene wax dispersant, 15% micro fibrillated cellulose, 0.9% glycol emulsion defoamer, and the remainder deionized water.

Formulation 39

Formulation 39 is a dispersion for formulation by a general method described above. The formulation is 46% Sycamore tree biochar, 20% ethoxylated linear fatty alcohol dispersant, 15% micro fibrillated cellulose, 0.8% oil-wax defoamer, and the remainder deionized water.

Formulation 40

Formulation 40 is a dispersion for formulation by a general method described above. The formulation is 45% Redbay tree biochar, 10% alkylpolyamine dispersant, 15% micro fibrillated cellulose, 0.9% oil-silica defoamer, and the remainder deionized water.

Formulation 41

Formulation 41 is a dispersion for formulation by a general method described above. The formulation is 40% Redbay tree biochar, 20% alkyd resin dispersant, 20% micro fibrillated cellulose, 1.0% oil-silica based defoamer, and the remainder deionized water.

Formulation 42

Formulation 42 is a dispersion for formulation by a general method described above. The formulation is 35% Elm tree biochar, 30% mono functional oleo-alkylene oxide block copolymer dispersant, 20% micro fibrillated cellulose, and the remainder deionized water.

Formulation 43

Formulation 43 is a dispersion for formulation by a general method described above. The formulation is 40% Elm tree biochar, 25% methacrylic acid dispersant, 10% micro fibrillated cellulose, 0.5% polyether based defoamer, and the remainder deionized water.

Formulation 44

Formulation 44 is a dispersion for formulation by a general method described above. The formulation is 40% Elm tree biochar, 25% stearic acid dispersant, 10% micro fibrillated cellulose, 0.5 modified fatty acid based defoamer, and the remainder deionized water.

Formulation 45

Formulation 45 is a dispersion for formulation by a general method described above. The formulation is 40% Elm tree biochar, 25% anionic polyether sulfate dispersant, 10% micro fibrillated cellulose, 0.5% silicone based defoamer, and the remainder deionized water.

Formulation 46

Formulation 46 is a dispersion for formulation by a general method described above. The formulation is 40% Elm tree biochar, 25% cation polyacrylate salt with phosphate dispersant, 10% micro fibrillated cellulose, 0.5% siloxane defoamer, and the remainder deionized water.

Formulation 47

Formulation 47 is a dispersion for formulation by a general method described above. The formulation is 40% Ash tree biochar, 40% ethoxylated fatty acid ester dispersant, 15% micro fibrillated cellulose anti-coagulant, and the remainder deionized water.

Formulation 48

Formulation 48 is a dispersion for formulation by a general method described above. The formulation is 40% Ash tree biochar, 40% butyl acetate dispersant, 0.5% silicone based defoamer, 0.1% kathon preservative, and the remainder deionized water.

Formulation 49

Formulation 49 is a dispersion for formulation by a general method described above. The formulation is 23% Elm tree biochar, 57% nitrogen graft polymer dispersant, 10% micro fibrillated cellulose anti-coagulant, 0.3% oil based defoamer, 0.005% caprylhydroxamic acid preservative, and the remainder deionized water.

Formulation 50

Formulation 50 is a dispersion for formulation by a general method described above. The formulation is 65% Birch tree biochar, 25% fatty acid calcium dispersant, 5% micro fibrillated cellulose anti-coagulant, 0.75% oil-silica based defoamer, 0.09% peracetic acid preservative, and the remainder deionized water.

Characterization of Formulations

Scanning Electron Microscope (SEM) and Scanning Transmission Electron Micrography (STEM) Imaging Some embodiments of pigment dispersion compositions having carbonaceous particles derived from biochar as disclosed herein were imaged on a SEM micrograph using a "Sputtering Process," as illustrated in FIGS. 1A, 1B, 2A, and 2B. The Sputtering Process is a particular form of Scanning Electron Microscopy (SEM). It is commonly used to reconstruct the topography of a sample and provide an image of it. For the images in FIGS. 1A, 1B, 2A and 2B, samples of dispersions were dried on an imaging substrate. Because SEM uses electrons to produce the image, the sample must be electrically conductive. Therefore, in the Sputtering Process a metallic thin layer is applied to the dried particles prior to imaging the sample. This is the sputtering. Typically, a Leica EM SCD005 Sputter coater or equivalent is used. For the SEM images in FIGS. 1A, 1B, 2A and 2B the sputtering of the metal layer was done for 25 seconds with a current of 60 mA. Sputtered films typically have a thickness range of 2-20 nm.

A Nova NANOSEM 45 was used to produce the images of FIGS. 1A, 1B, 2A and 2B. The SEM uses a focused beam of electrons at a voltage around 5 kV and an emission current that may vary from 80 to 140 µA. The beam reacts with the sample and one or more detectors collect the resultant electrons to form the image. For the Sputtering Process an SED Everhart-Thornley detector (ETD) is typically used as the detector. The imaging is performed under vacuum so that nothing interferes with the electrons of the beam. The pictures obtained with the Sputtering process are opaque.

Figure 1B:
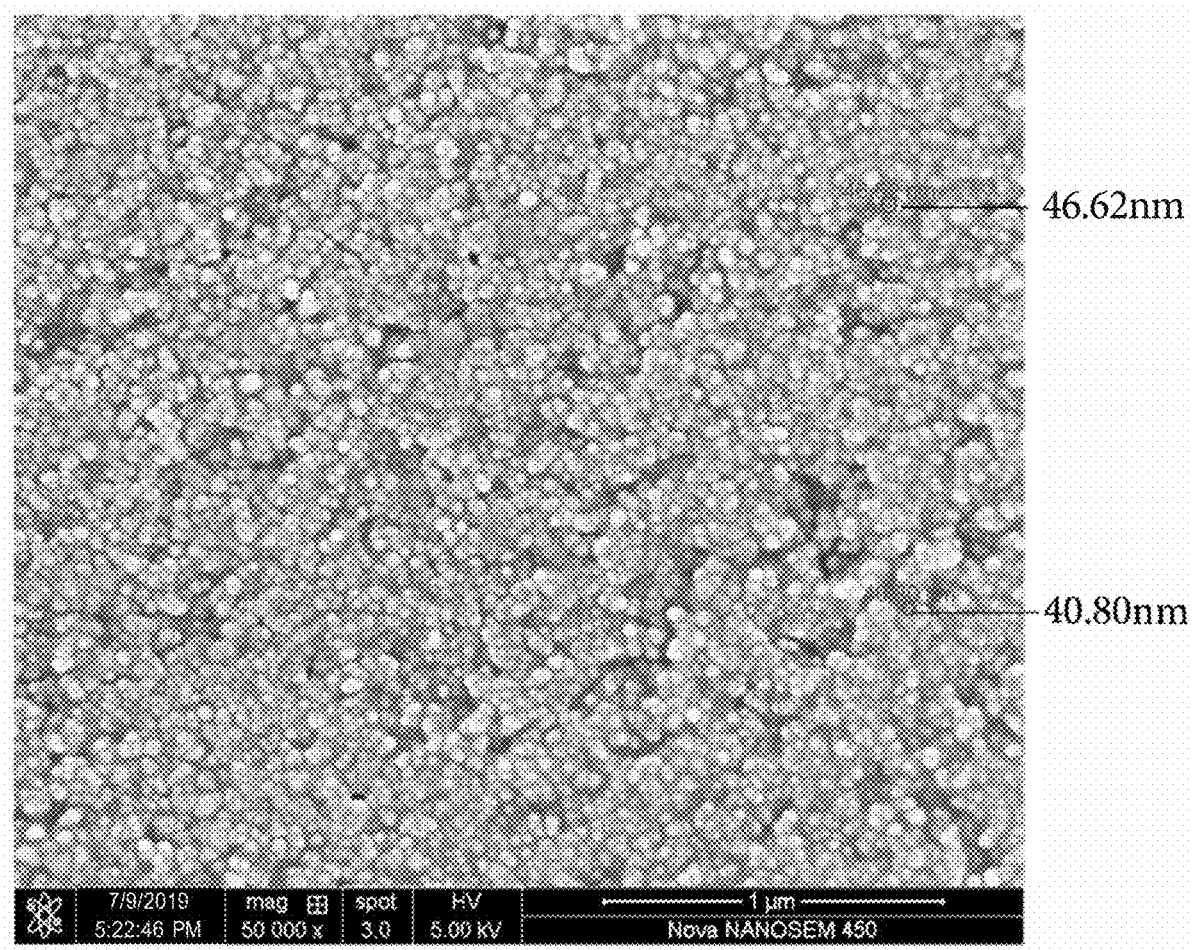
FIG. 1B shows a scanning electron microscope image at a magnification of 50,000× from a Sputtering Process illustrating a randomized sample of pigment particles that have been milled with a fluid and dried. Two representative particles are indicated by surrounding oval circles, with the particle in the upper right portion of the image having a diameter of 46.62 nm and the particle more in the lower right of the image having a diameter of 40.80 nm.
Figure 2A:
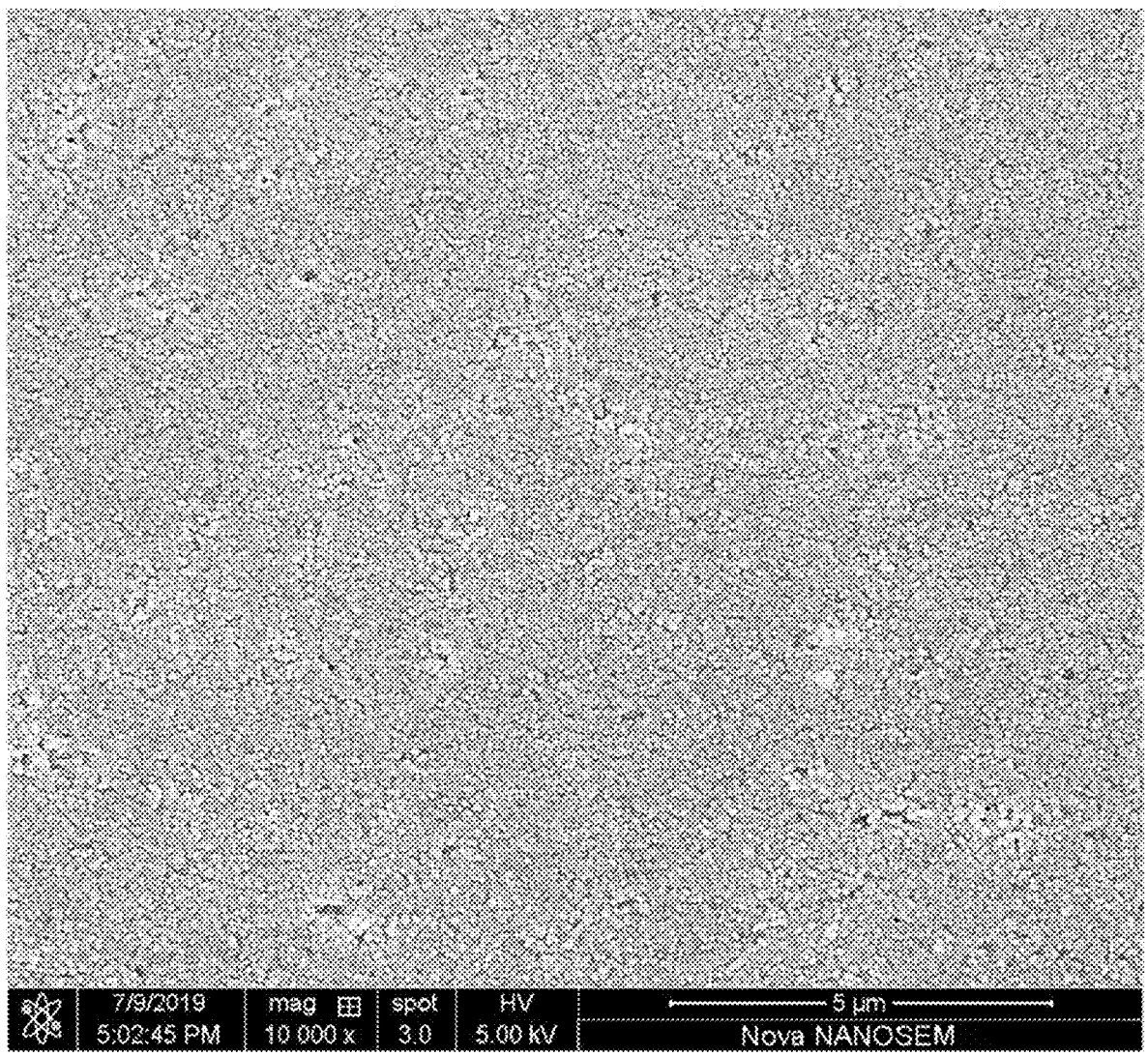
FIG. 2A shows a scanning electron microscope image at a magnification of 10,000× from a Sputtering Process illustrating a randomized sample of pigment particles that have been milled with a fluid and dried.
Figure 2B:
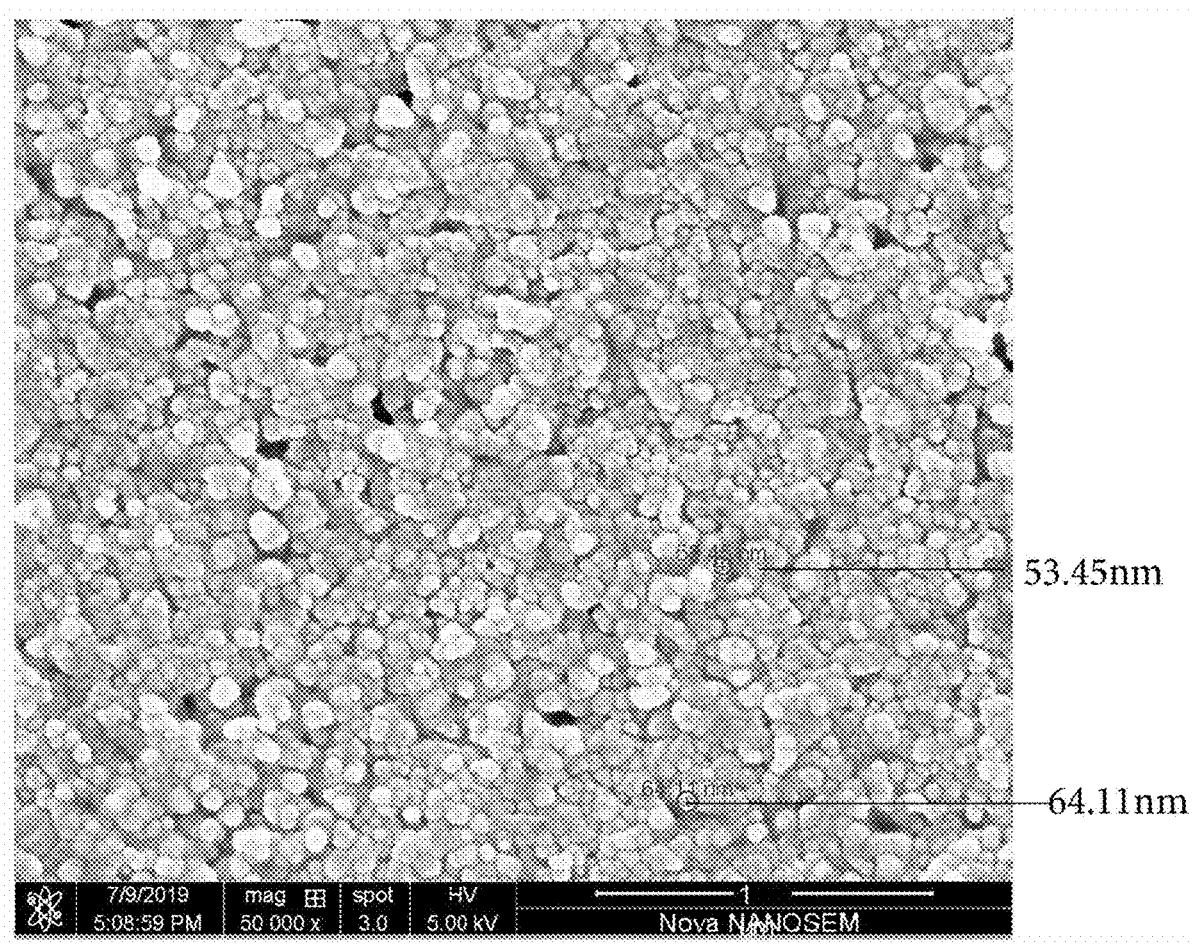
FIG. 2B shows a scanning electron microscope image at a magnification of 50,000× from a Sputtering Process illustrating a randomized sample of pigment particles that have been milled with a fluid and dried. Two representative particles are indicated by surrounding oval circles, with the particle in the middle right portion of the image having a diameter of 53.45 nm and the particle more in lower right of the image having a diameter of 64.11 nm.

FIGS. 1A and 1B illustrate a randomized sample of particulate matter derived from biochar imaged from a first biochar pigment dispersion composition according to Formulation 16, FIGS. 2A and 2B illustrate a randomized sample of particulate matter derived from biochar imaged from a second biochar pigment dispersion composition according to Formulation 17. In FIG. 1B two representative particles are indicated by surrounding oval circles, with the particle in the upper right portion of the image having a diameter of 46.62 nm and the particle more in the lower right of the image having a diameter of 40.80 nm. In FIG. 2B two representative particles are indicated by surrounding oval circles, with the particle in the middle right portion of the image having a diameter of 53.45 nm and the particle more in lower right of the image having a diameter of 64.11 nm. The microscopists noted that FIGS. 1A, 1B, 2A and 2B show the monodispersity or near monodispersity of each dispersion, meaning that it appears that the particulates are all about the same size. The particulates from the first biochar pigment dispersion are between 40 and 50 nm in diameter and particulates from the second biochar dispersion are between 50 and 65 nm in diameter.

Figure 3:
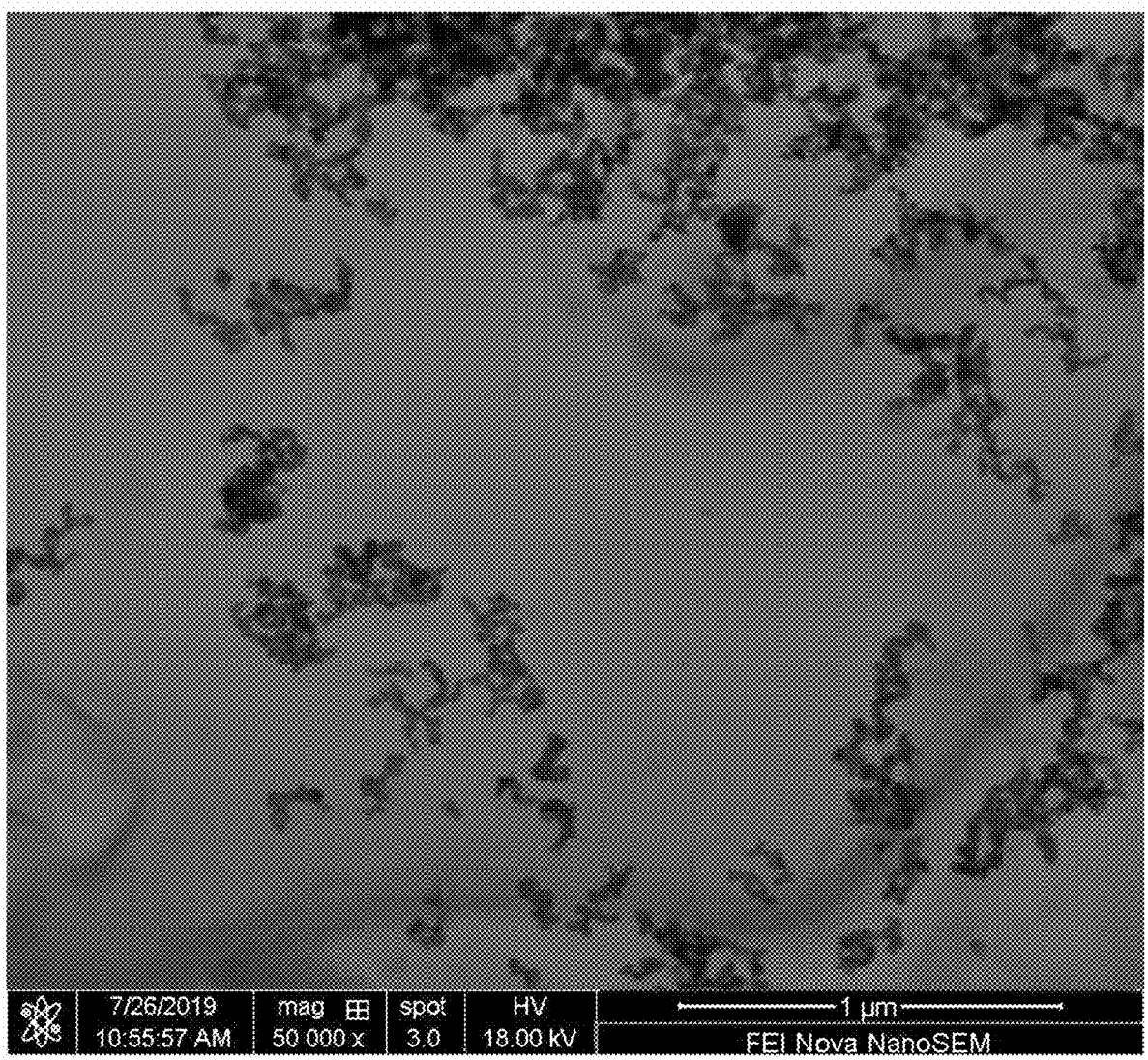
FIG. 3 shows a scanning transmission electron microscope image at a magnification of 50,000× from a STEM Process illustrating a randomized sample of pigment particles where at least 95% of the particles by number, or at least 100 particles, have a diameter in the range between 15 nm and 25 nm.
Figure 4:
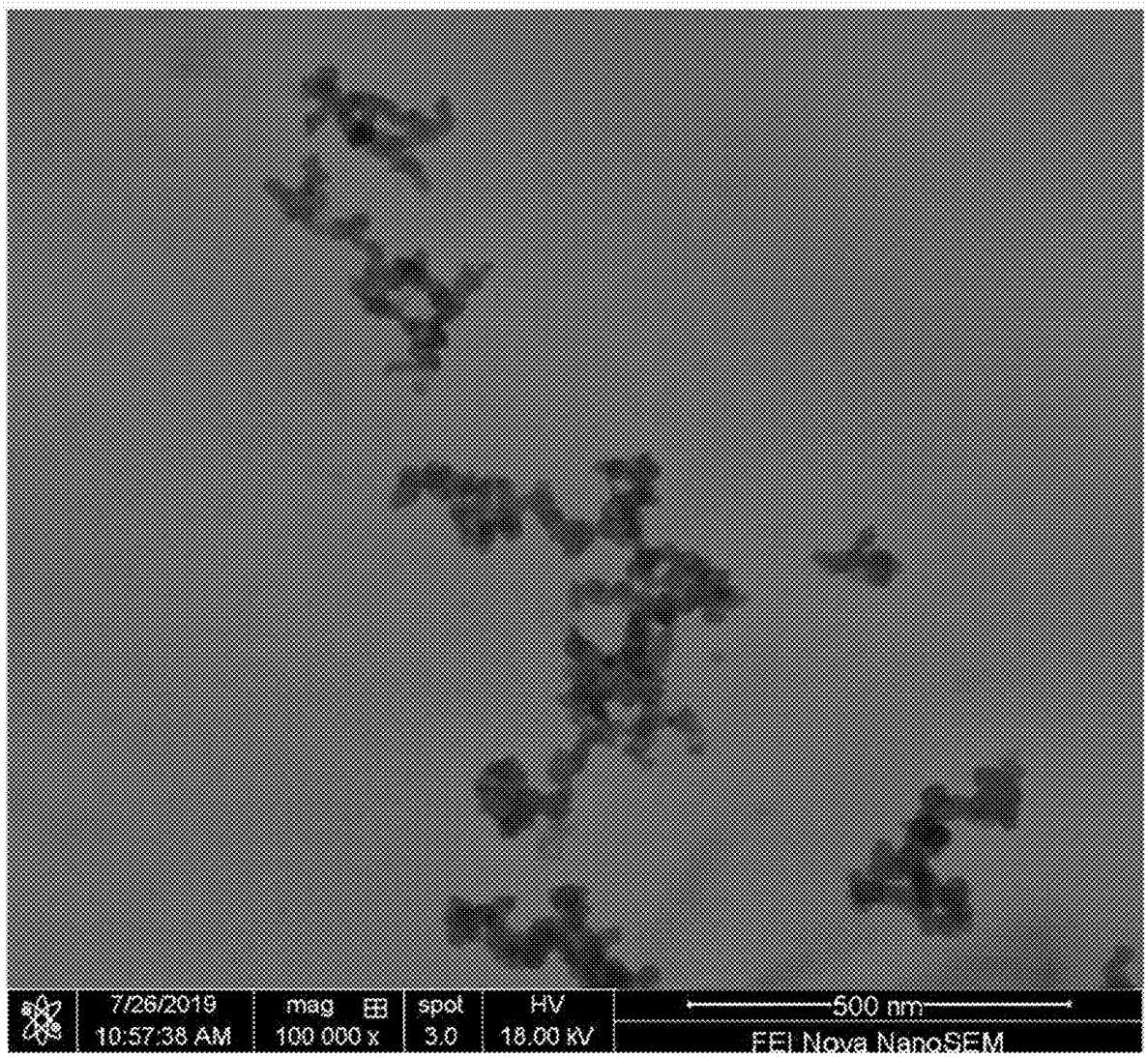
FIG. 4 shows a scanning transmission electron microscope image at a magnification of 100,000× from a STEM Process illustrating a randomized sample of pigment particles where at least 95% of the particles by number, or at least 100 particles, have a diameter in the range between 15 nm and 25 nm.

FIGS. 3, 4, 5 and 6 are STEM images of a randomized sample of pigment particles where at least 95% of the particles by number, or at least 100 particles, have a diameter in the range between 15 nm and 25 nm. FIGS. 3 and 4 are STEM images of the biochar particles gathered from Formulation 16. FIGS. 5 and 6 are STEM images of the biochar particles gathered from Formulation 17.

Some embodiments of the pigment dispersion compositions having carbonaceous particles derived from biochar as disclosed herein were imaged on a STEM micrograph, referred to herein as a "STEM Process." Examples are FIGS. 3 and 4. Some embodiments of the pigment dispersion compositions having carbonaceous particles derived from biochar as disclosed herein were imaged using a "Lacey STEM process" as defined herein. Example images from the Lacey STEM process are depicted in FIGS. 5 and 6. As defined herein, the Lacey STEM process is a particular form of Scanning Transmission Electron Microscopy (STEM). STEM is a technique used to provide images of thin samples of material. The electron beam passes through the sample giving very little information about the surface and more about the shape and structure of particles. In the Lacey STEM Process an FEI Nova NanoSEM 450 scanning electron microscope, or equivalent instrument, is used with a STEM Bright Field and Dark Field (DF) (BF DF) High-Angle Annular Dark-Field (HAADF) detector.

In the Lacey STEM process a droplet of diluted dispersion is added on top of a lacey carbon transmission electron microscopy (TEM) film. The dilutant is typically water if the dispersion is miscible in water or otherwise the dilutant is typically acetone. The lacey structure accounts for the web-like structure in FIGS. 5 and 6. The dispersion is diluted to a sufficient extent that there are not many particles on the web when the image is scanned. Because of the dilution process on the lacey web substrate, the naturally formed clusters are apparent. Surprisingly, the particulate matter has very high structure after milling. In contrast, branches in liquid dispersions of petroleum carbon black are referred to "transient structure" and the structures are generally broken up with milling. Characterization of many dispersion embodiments disclosed herein is made in terms of the processes and images produced by the Lacey STEM process. Other imaging processes, such as the sputtering process, do not illustrate the naturally formed cluster characteristics.

The FEI Nova NanoSEM 450 electron microscope is capable of concurrently taking both an STEM and an SEM image. When taking a picture with image in "in STEM mode" the two detectors are used simultaneously. This is why it is possible to acquire images of the same objects with both modes. The screen is split and images are presented from both detectors. When the image moves in one mode, the image in other mode follows. In order to get a good resolution of the picture the instrument is zoomed in to focus finely and then the instrument is zoomed out to a round number magnification so that the sharpness is even higher at this magnification. Brightness and the contrast of the images are adjusted as needed. Adjustments are then paused so that the image(s) may be saved.

Monodispersive dispersions are dispersions where the variation in size of the particles is very small forming a narrow (unimodal) distribution about an average value.

FIGS. 3, 4, 5 and 6 are STEM images of a randomized sample of pigment particles where at least 95% of the particles by number, or at least 100 particles, have a diameter in the range between 15 nm and 25 nm. STEM images show that Formulation 16 and Formulation 17 form near monodispersions. FIGS. 3 and 4 are STEM images of the biochar particles used in Formulation 16. FIGS. 5 and 6 are Lacey STEM images of the biochar particles used in Formulation 17.

Figure 7:
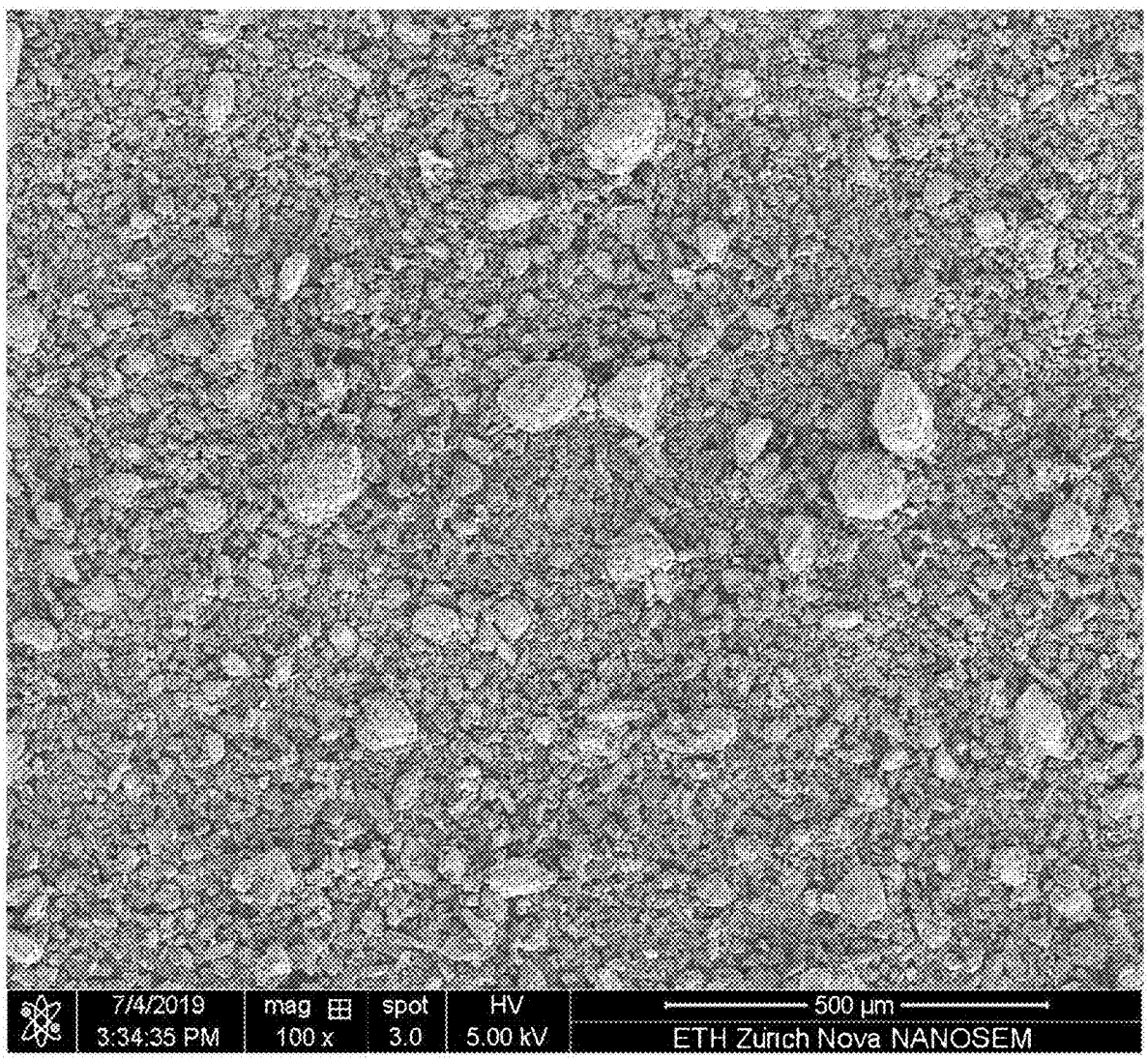
FIGS. 7-8 show scanning electron microscope images of feedstock of granular solids of plant chars that may be utilized as feed stock for manufacturing sub-micron carbonaceous particles.
Figure 8:
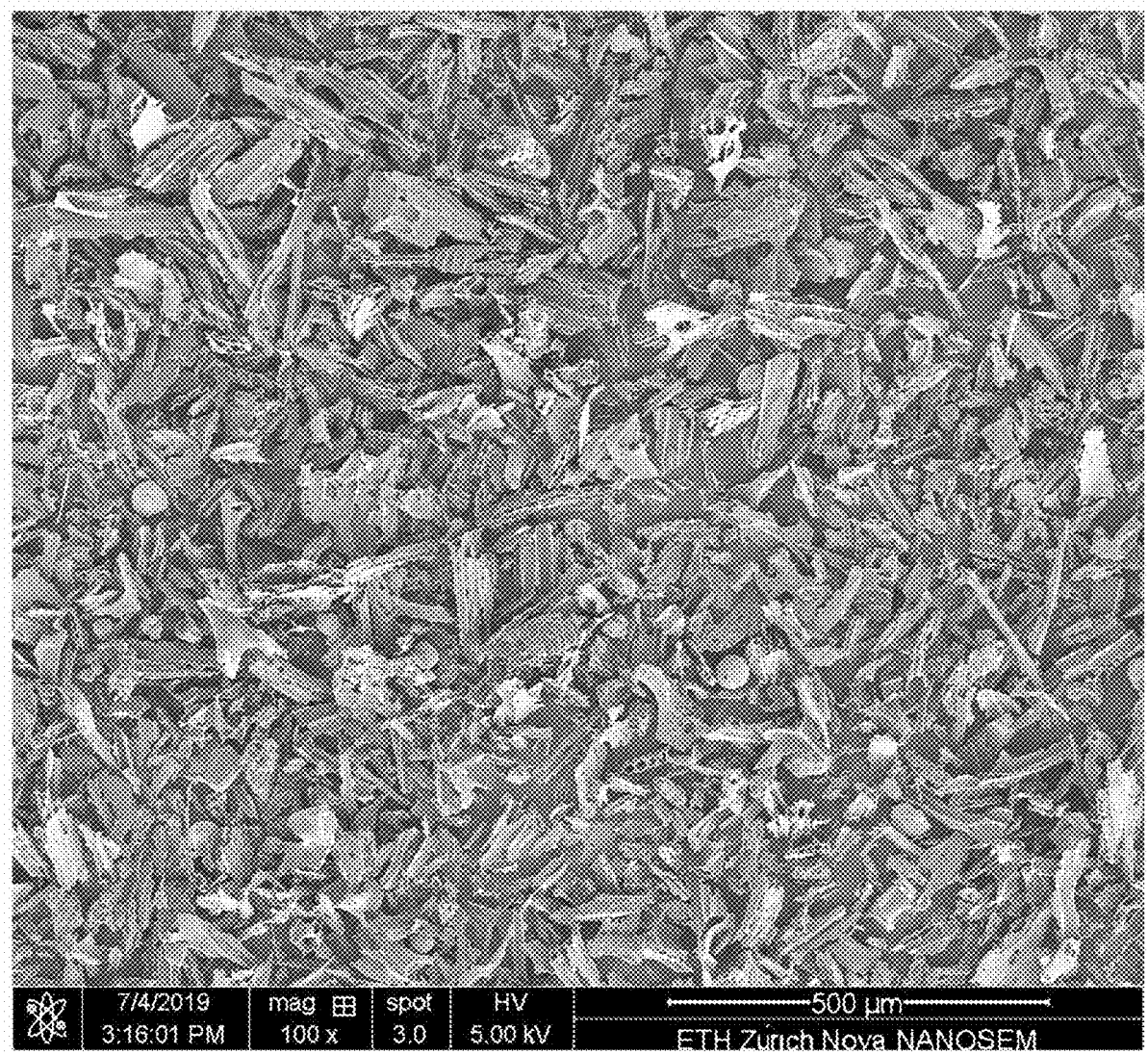
Figures 9A, 9B, 9C:
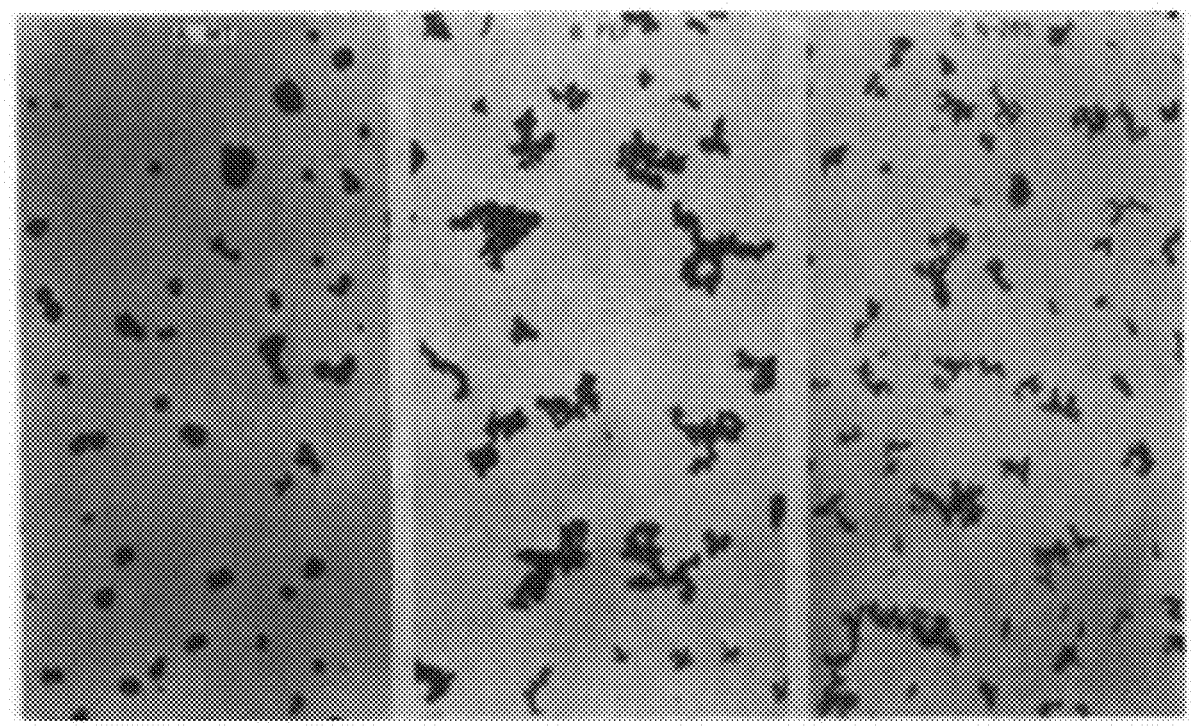
FIG. 9A shows a scanning transmission electron microscope image of a sample of prior art petroleum carbon black exhibiting a spheroidal habit.
FIGS. 9B-9C show scanning transmission electron microscope images of samples of prior art petroleum carbon black exhibiting a clustered habit.

FIGS. 7 and 8 are scanning electron microscope images of plant char feed stock that may be utilized as feed stock for manufacturing sub-micron carbon particles of the type depicted in FIGS. 1A and 1B, using methods disclosed herein. The plant char feed stock depicted in FIG. 7 was utilized in Formulation 17 and the plant char feed stock depicted in FIG. 8 was utilized in Formulation 16.

Laser Scattering

Laser scattering measurements were performed on a liquid dispersion using the following "LDA Protocol":
 (a) Dispersion samples are diluted with water to a concentration of 0.0010% vol.
 (b) A Malvern Mastersizer 2000 laser diffraction particle size analyzer or equivalent is used to analyze the samples.
 (c) Size range is set to: 0.020 µm to 2000 µm.
 (d) Samples are analyzed using Mie scattering for the analysis of the light intensity distribution pattern.

The particle distribution of Formulation 11 was observed as follows: D10 130 nm, D50 333 nm, D90 534 nm. The particle distribution of Formulation 12 was observed as follows: D10 250 nm, D50 605 nm, D90 750 nm. It should be noted that particle sizes indicated by laser diffraction numbers are typically higher than particle sizes calculated from STEM images because laser diffraction numbers account for entire clusters of particles and for chains of particles. STEM images show the individual particle sizes.

Surface Area Determination

Surface area was measured by static pressure gas adsorption, also termed specific surface area analysis by gas physisorption (static volumetric method). The surface of the sample was prepared by heating the samples to 90° C. under vacuum for 0.5 hours in a first round of degassing. In a second subsequent round of degassing, the sample was heated to 200° C. for 3 hours under vacuum. The sample is then exposed to nitrogen gas, and an amount of gas is adsorbed to the surface of the particles. The amount of adsorbed gas is measured at varying relative pressures. The surface area is calculated using the Brunauer-Emmett-Teller (BET) equation below.

$$\frac{1}{V_a\left(\left(\frac{P}{P_0}\right)-1\right)} = \frac{C-1}{V_m C} \times \frac{P}{P_0} + \frac{1}{V_m C} \text{ where}$$

$\frac{P}{P_0}$ = relative pressure, $V_a$ = volume of gas adsorbed,

-continued $V_m$ = volume of gas adsorbed to produce an apparent monolayer on the surface, $C$ = BET constant.          (5)

A series of three relative pressure data points were taken on a Micromeritics Tri Star II 3020 instrument.

The surface area of the particles in Formulation 11 was observed to be 375 $m^2g^{-1}$. The surface area of the particles in Formulation 12 was observed to be 745 $m^2g^{-1}$.

Raman Spectroscopy

Raman spectroscopy may be applied as a method of identifying different carbon phases within a carbonaceous material. For example, Raman spectroscopy may be used to distinguish several types of carbon such as diamond, graphite, and diamond-like carbon. Raman spectra of nanocrystalline and amorphous carbon are dominated by the D (D for disorder) and G (G for graphite) peaks with varied intensity, position, and band-width. The G band at approximately 1540-1600 cm-1 corresponds to the symmetric E mode in graphite-like materials, while the D band at 1350 cm-1 arises from the limitations in the graphite domain size induced by grain boundaries or imperfections.

Raman spectroscopy analyses of two representative biochar samples disclosed herein are as follows: the Raman measurements were performed with a "LabRam" spectrometer equipped with a "BX40 Olympus" microscope in the backscattering geometry (180°). An Ar+ ion laser (514.5 nm wavelength) and an 1800 gr/mm grating were used in these measurements.

Figure 10:
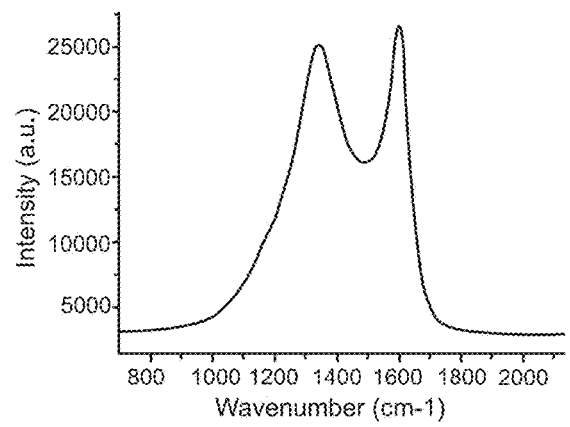
FIG. 10 shows uncorrected Raman spectra for three random samples from Formulation 1 (spectrum 1-3) and three random samples from Formulation 2 (spectrum 4-6).
Figure 10:
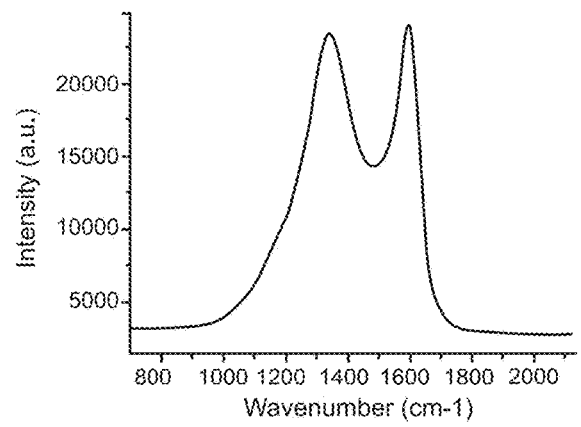
Figure 10:
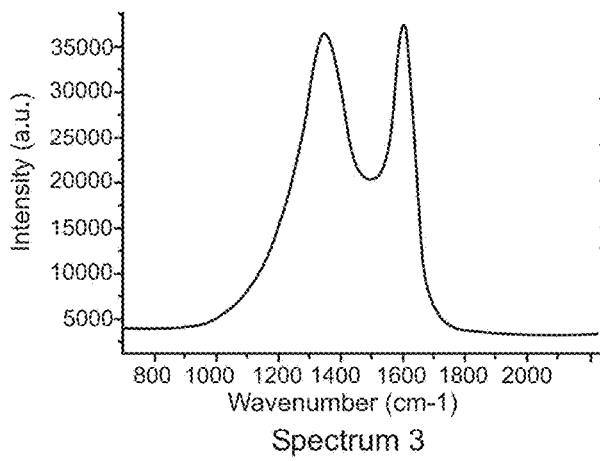
Figure 10:
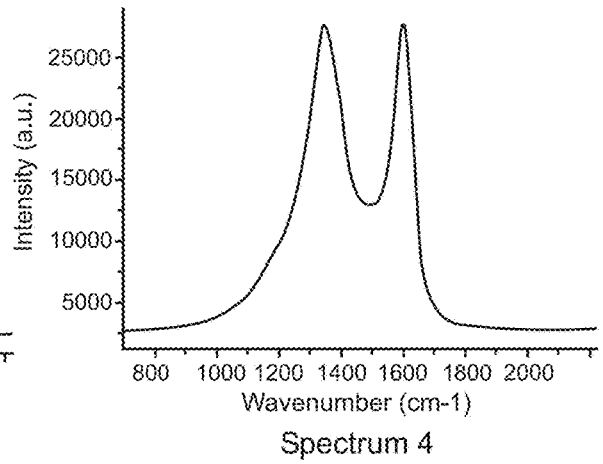
Figure 10:
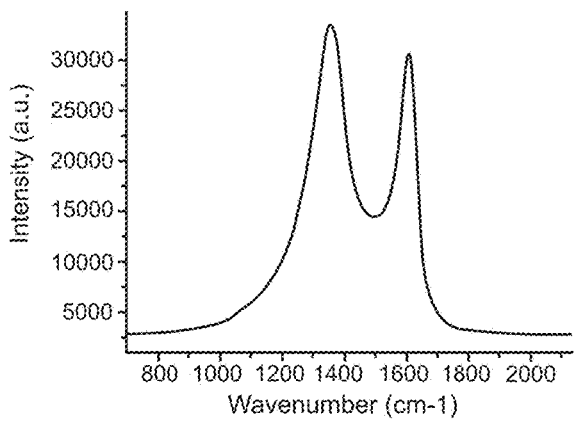
Figure 10:
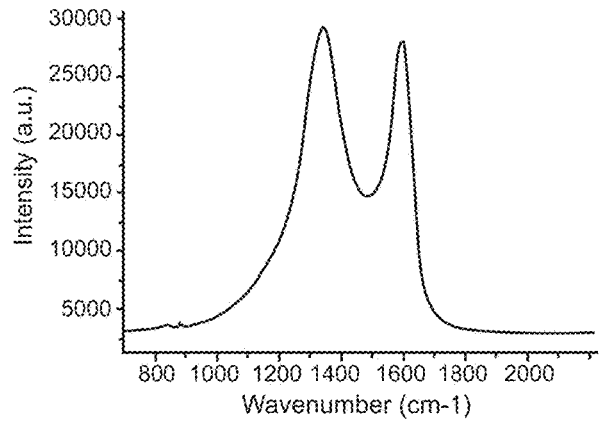
Figure 11:
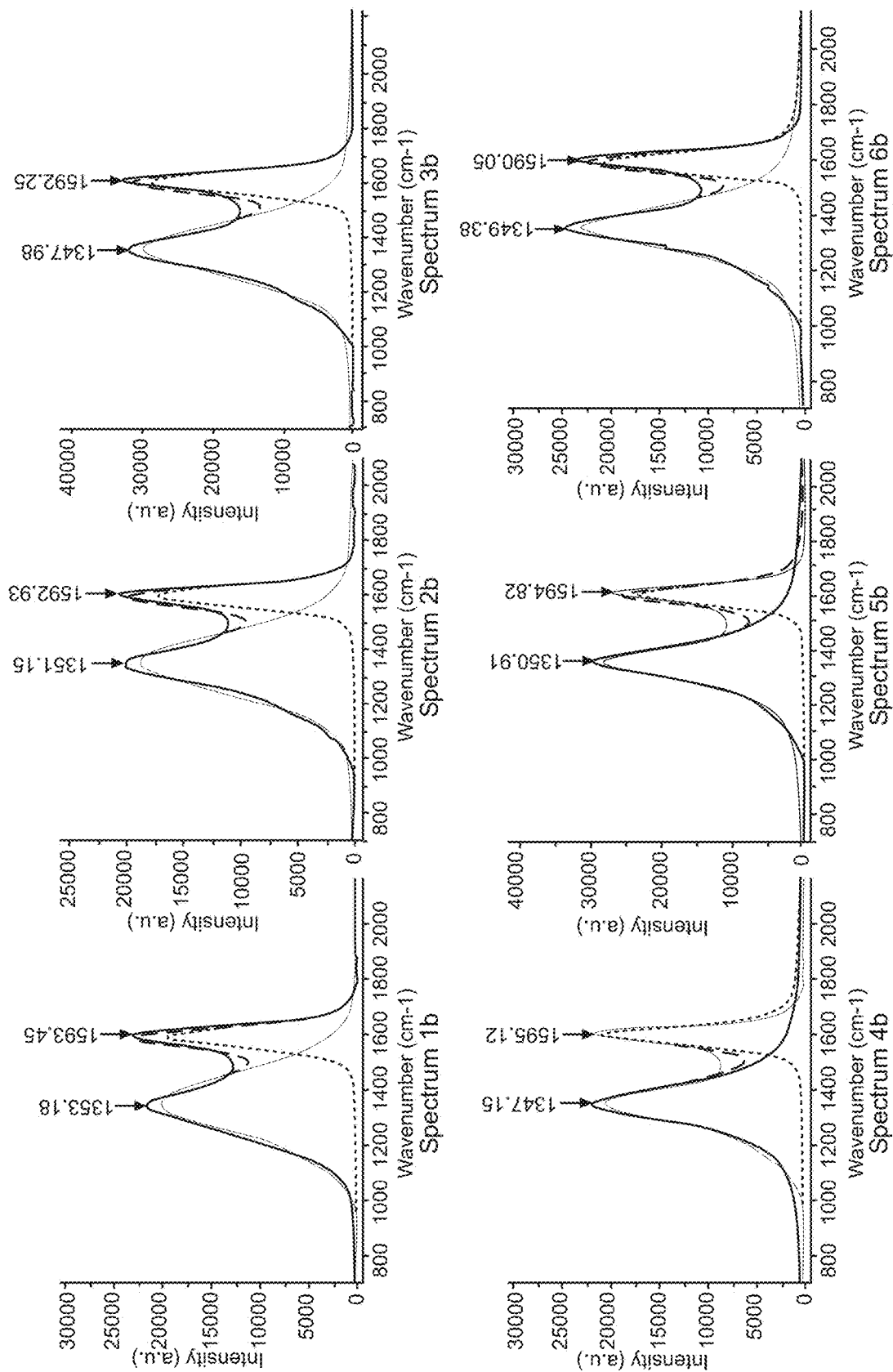
FIG. 11 shows baseline corrected Raman spectra for three random samples from Formulation 1 (spectrum 1-3) and three random samples from Formulation 2 (spectrum 4-6).

Three spectra at random spots were acquired from each sample. Sample 1 is seen in FIGS. 10 and 11 (Spectrum 1, 2 & 3 and baseline corrected Spectra 1-b, 2-b and 3-b). Sample 1 was a randomized sample of pigment particles gathered from Formulation 16. Sample 2 is also seen in FIGS. 10 and 11 (Spectrum 4, 5 & 6 and baseline corrected Spectrum 4-b, 5-b and 6-b)). Sample 2 was a randomized sample of pigment particles gathered from Formulation 17.

The raw spectra were baseline corrected and band-fitted with Lorentzian-Gaussian bands for the D (1350 $cm^{-1}$) and the G (1590 $cm^{-1}$) bands of sp2 bonded carbon. The data for these bands: Positions, widths (Full width at half maximum), intensities (peak areas) and peak heights are presented in Table 2.

TABLE 2

| Sample | Spectrum | Peak($cm^{-1}$) | D-Band Width($cm^{-1}$) | Intensity($I_D$) | Peak height |
|---|---|---|---|---|---|
| 1 | 1-b | 1353 | 238 | 4.04E+06 | 2.00E+04 |
|   | 2-b | 1351 | 230 | 3.71E+06 | 1.88E+04 |
|   | 3-b | 1348 | 211 | 5.45E+06 | 2.98E+04 |
| 2 | 4-b | 1347 | 172 | 3.57E+06 | 2.23E+04 |
|   | 5-b | 1351 | 160 | 4.35E+06 | 2.86E+04 |
|   | 6-b | 1349 | 186 | 4.06E+06 | 2.40E+04 |

| Sample | Peak($cm^{-1}$) | G-Band Width($cm^{-1}$) | Intensity ($I_G$) | Peak height |
|---|---|---|---|---|
| 1 | 1593 | 82 | 1.43E+06 | 1.95E+04 |
|   | 1592 | 81 | 1.23E+06 | 1.74E+04 |
|   | 1592 | 80 | 2.06E+06 | 2.85E+04 |
| 2 | 1595 | 72 | 1.41E+06 | 2.09E+04 |
|   | 1595 | 75 | 1.58E+06 | 2.35E+04 |
|   | 1590 | 79 | 1.46E+06 | 2.09E+04 |

| Sample | | Ratio $I_D/I_G$ | $L_a$(nm) TK | Ratio $H_D/H_G$ | $L_a$(nm) FR |
|---|---|---|---|---|---|
| 1 | | 2.82 | 1.56 | 1.02 | 1.36 |
|   | | 3.02 | 1.46 | 1.08 | 1.40 |
|   | | 2.65 | 1.66 | 1.04 | 1.38 |
|   | Average | 2.83 | 1.56 | 1.05 | 1.38 |
|   | SDEV | 0.18 | 0.10 | 0.03 | 0.02 |
| 2 | | 2.54 | 1.73 | 1.06 | 1.39 |
|   | | 2.75 | 1.60 | 1.22 | 1.49 |
|   | | 2.78 | 1.58 | 1.15 | 1.44 |
|   | Average | 2.69 | 1.64 | 1.14 | 1.44 |
|   | SDEV | 0.13 | 0.08 | 0.08 | 0.05 |

Two formulas are found in the literature for calculating the grain size of graphitic carbon.

Using the intensity ratio $I_D/I_G$, TUINSTRA and KOENIG (1970) proposed a formula for the grain size calculation $L_a$(Å) of graphitic carbon:

$$L_a(\text{Å})_{TK} = 44 \times (I_D/I_G)^{-1} \quad (1)$$

which we will refer to as the TK model. This model can be applied only to pure sp2 carbons from graphite to nanographite samples with $L_a$ larger than 2 nm. $L_a(nm)_{TK}$ determined from the TK formula is reported in Table 1 for each Raman measurements. An average value with SDEV is given for each sample.

ColorLab Analysis

Almost no black pigment is perfectly black. Most black pigments have a slight hue (color). Perfectly black samples absorb all wavelengths of light and reflect no hues. A lab color space test may be used to analyze the hue of black pigments. While most black pigments are not "perfect," they are assumed to be dark enough to prevent most of an incident light from getting to a detector. Samples of embodiments disclosed herein for pigment dispersion formulations comprising carbonaceous particulate matter derived from biochar are tested for hue according to the following "black pigment color analysis protocol."

Samples are diluted in a white suspension:
  2% Hypromellose (to slow separation)
  4% TiO2 (to provide a white background)
  Balance DI H2O.
The dilution is semiquantitative with 10-14 mg pigment being added to 10 g of white suspension.
The samples are mixed well and placed in 10 mm disposable (PS) cuvettes.
The white suspension is run as a blank standard and the samples are read against it so the reported values are the difference.
A Hunter Instruments UltraScan PRO or equivalent instrument is used with the following settings:
  CIELab/D65/10Deg/Sphere/RSEX/0.190"/10 mm PS Cuvette An analysis of five representative dispersants prepared according to technology disclosed herein was conducted using the black pigment color analysis protocol.

Table 3 gives the values in tabular form.

TABLE 3

| ID | L* | a* | b* | dL* |
|---|---|---|---|---|
| TiO2 Blank | 84.99 | −0.16 | 0.69 | 84.99 |
| Sample 1 | 51.9 | −0.41 | 0.16 | −33.09 |
| Sample 2 | 57.97 | −0.36 | 0.84 | −27.02 |
| Sample 3 | 52.48 | −0.34 | 0.87 | −32.52 |
| Sample 4 | 48.97 | −0.24 | 1.22 | −36.02 |
| Sample 5 | 60.84 | 0.04 | 2.17 | −24.15 |

Figure 12:
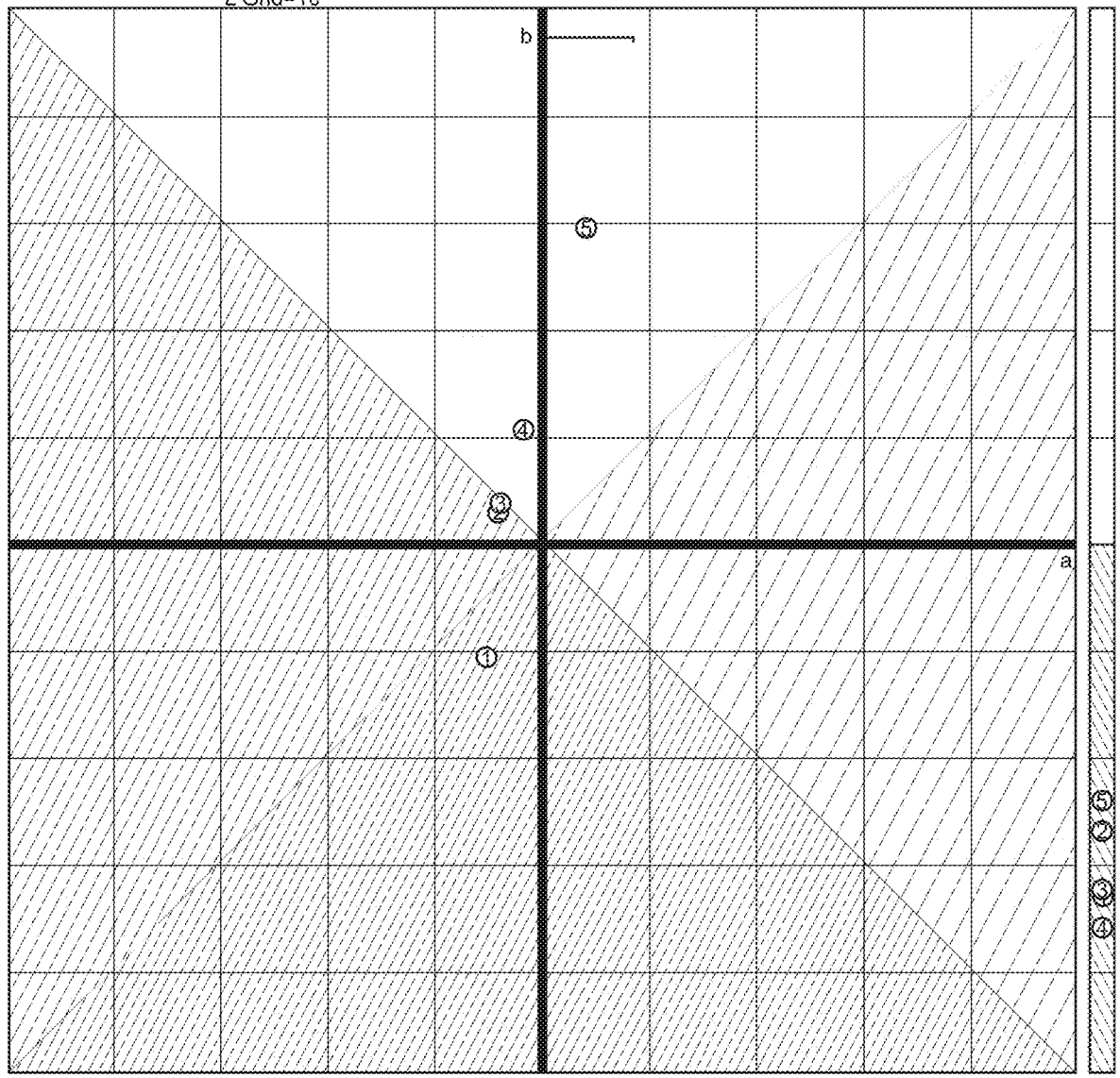
FIG. 12 shows a graphic representation of the hues that were detected as plotted in the CIE Lab color space.
Figure 13:
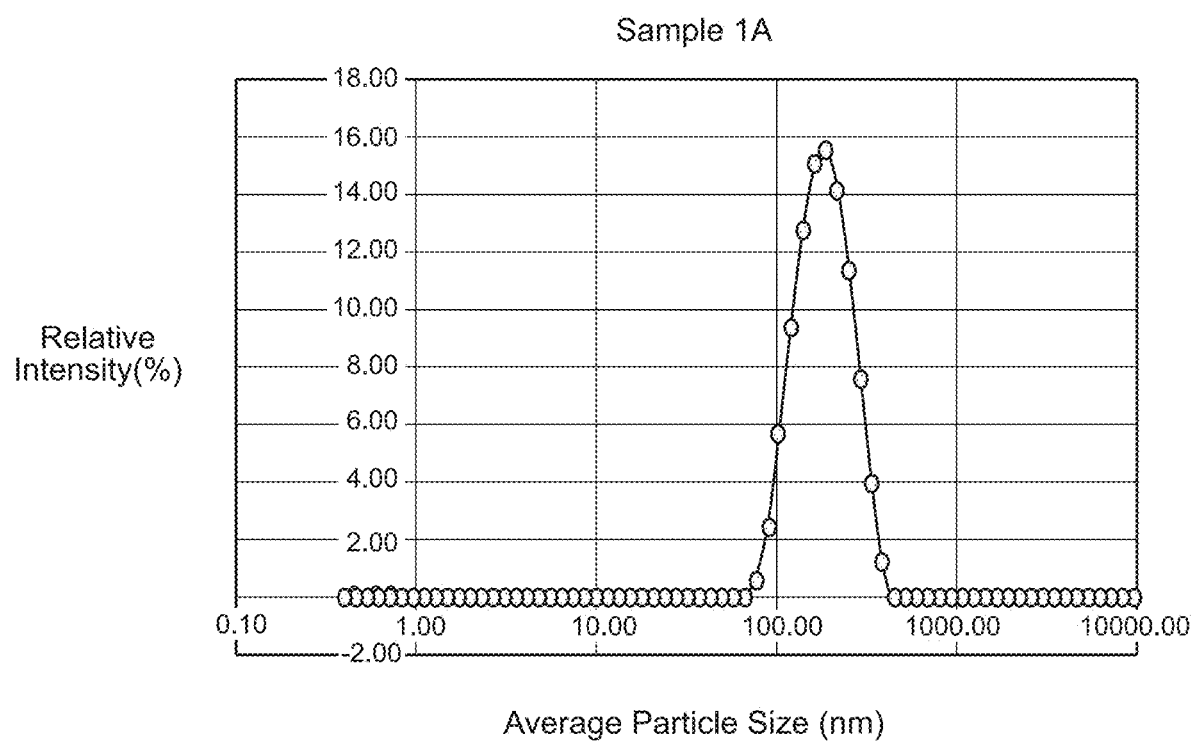
FIGS. 13-18 show a distribution of measurements made using dynamic light scattering to evaluate particle size distribution for Samples 1A-3B according to embodiments of the disclosure.
Figure 14:
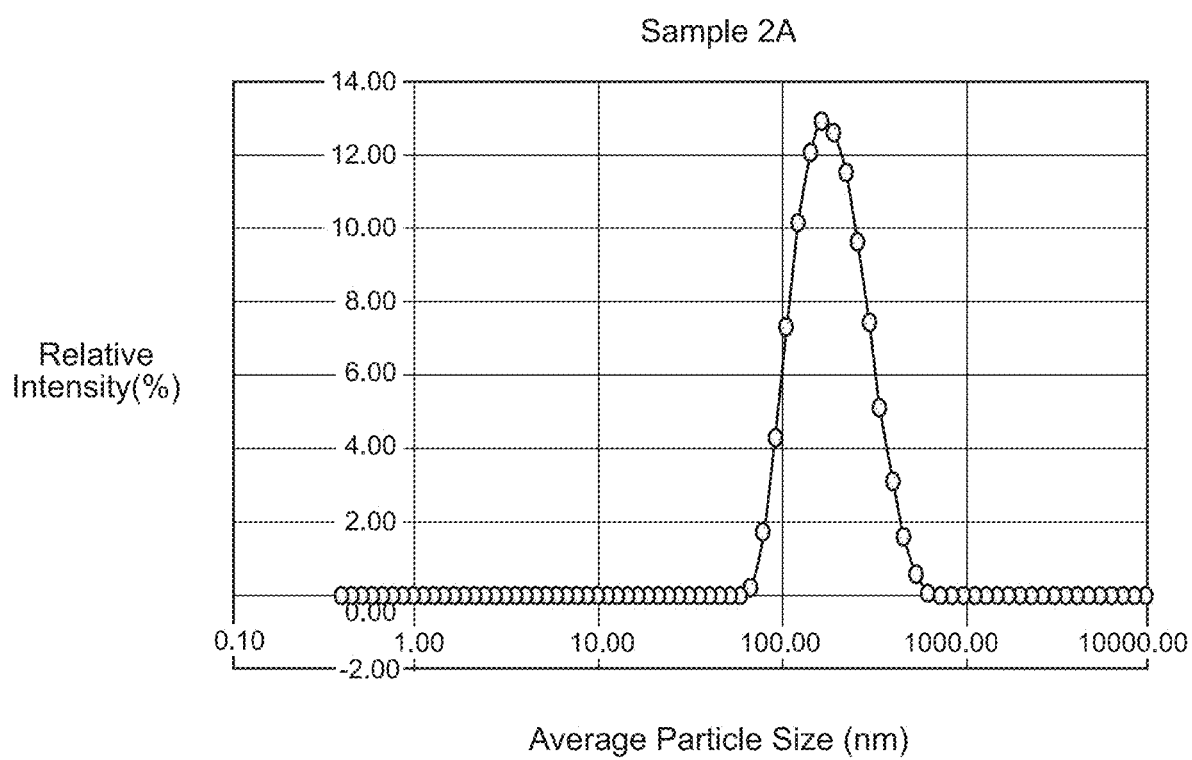
Figure 15:
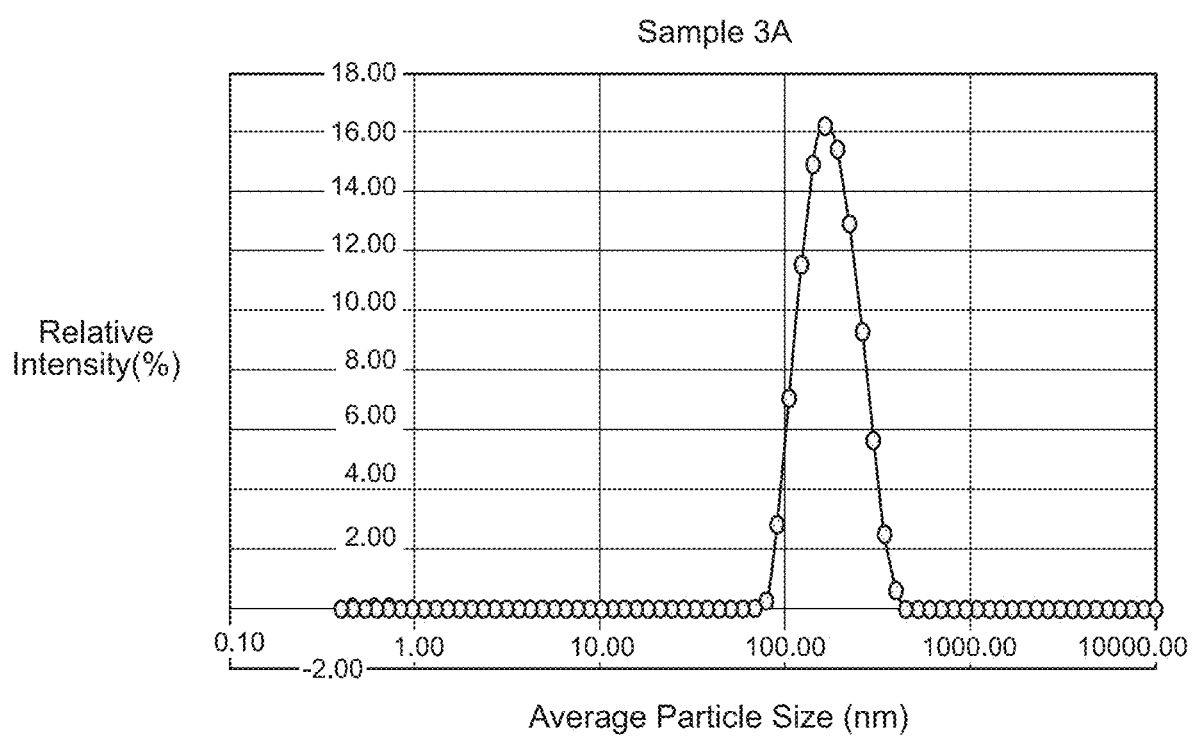
Figure 16:
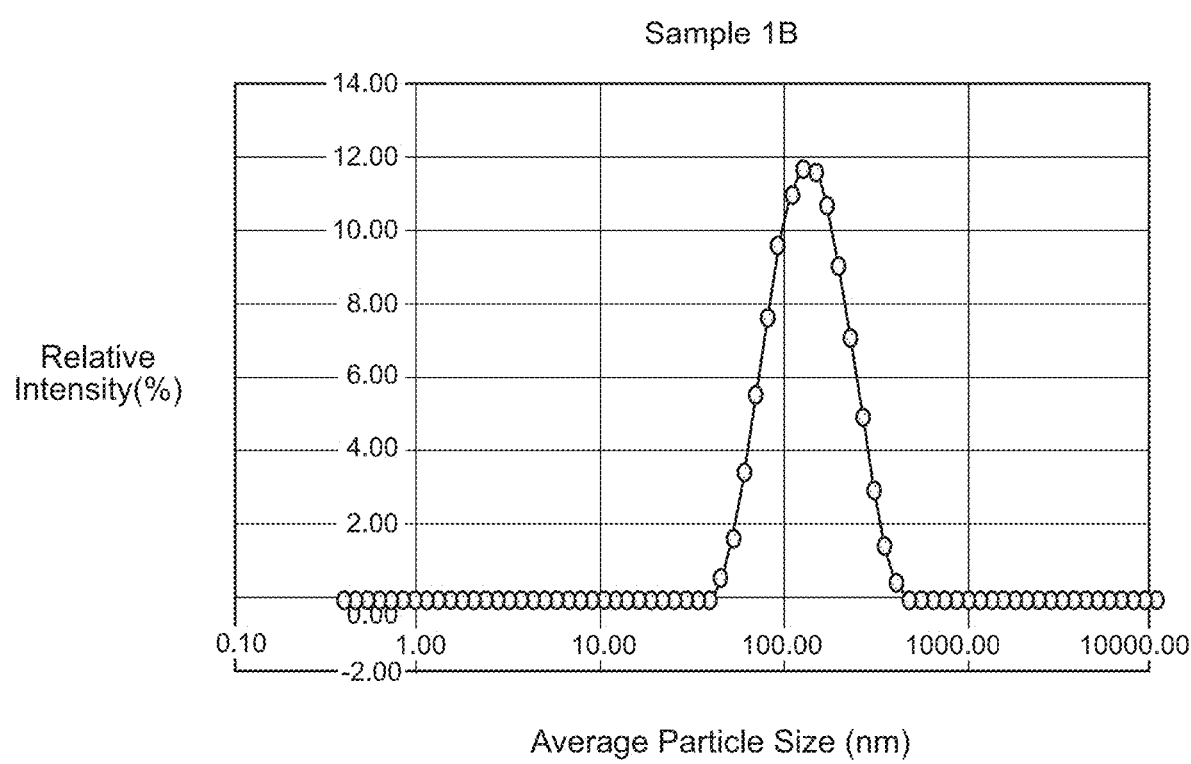
Figure 17:
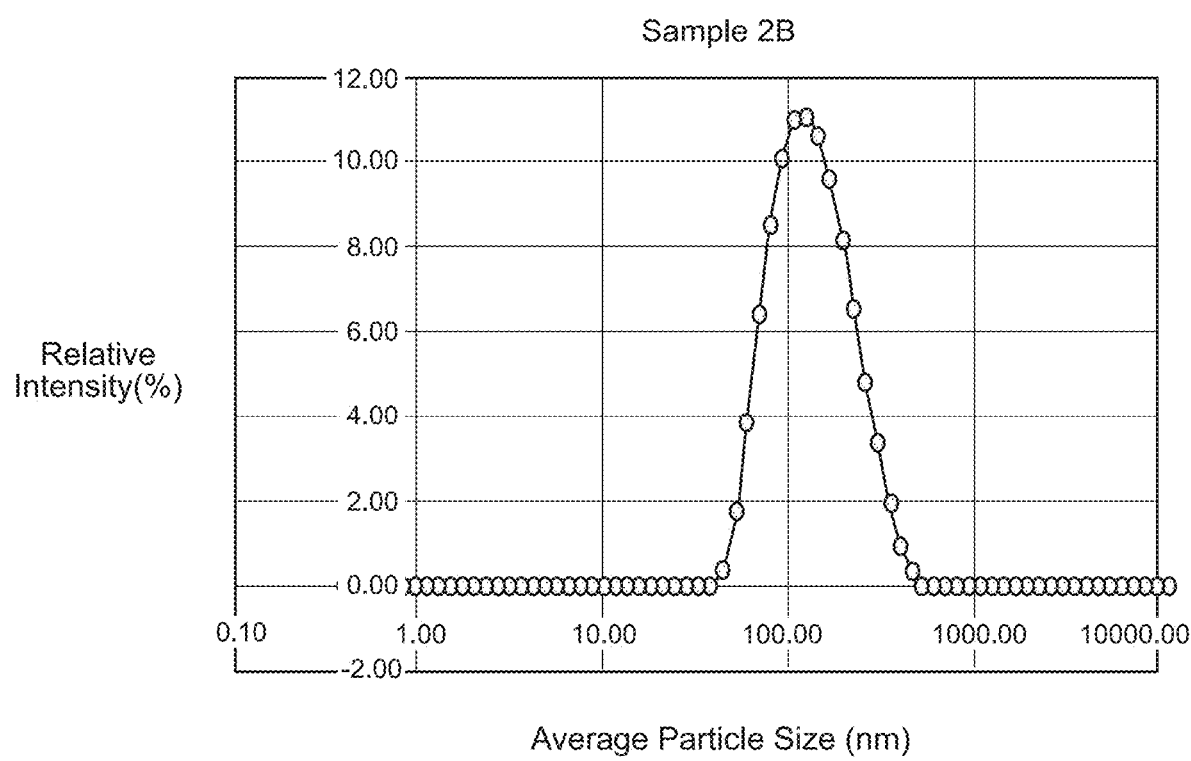
Figure 18:
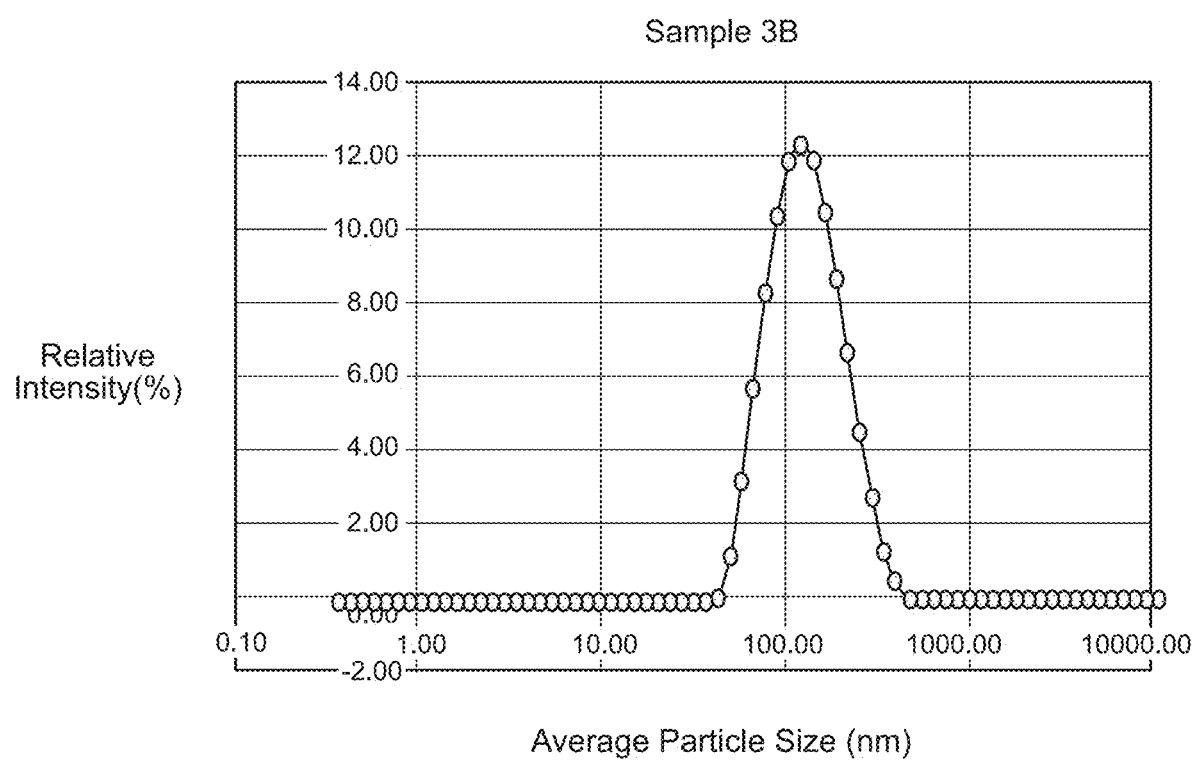

FIG. 12 shows the plot shows a graphic representation of the colors that were detected as plotted in the CIE Lab color space. It should be noted that the distance the samples are from the origin is an indication of the magnitude of color that was measured, however, the dilution procedure was not refined to give quantitative results and an error of up to ~50% is expected.

Dynamic Light Scattering Sub-Micron Particle Size Distributions

Dynamic light scattering (DLS) is a technique that may be used to determine the size distribution profile of small particles in suspension. The following DLS Protocol is used to determine the particle size characteristics of particulate material in dispersion formulations that include carbonaceous particulate matter derived from biochar as disclosed herein.

(a) Samples of dispersions are prepared by dilution in deionized water.

(b) A Malvern Zetasizer Nano Z DLS or equivalent particle analyzer is used to analyze the samples.

(c) Settings are backscatter angle of 173° at 25° C.

Measurements were made for each of two samples of sub-micron particles using the DLS Protocol. Sample A(1-3) was a randomized sample of pigment particles gathered from Formulation 16. Sample B(1-3) was a randomized sample of pigment particles gathered from Formulation 17. The measurements were made using dynamic light scattering based on intensity and based on polystyrene latex with a refractive index of 1.590 and absorption of 0.010 as the reference material. This material is often used as a reference in polymer science at a nanoscale even if the material used is not exactly polystyrene. It should be noted that particle sizes indicated by DLS numbers are typically higher than particle sizes calculated from STEM images because DLS numbers account for entire clusters of particles and for chained aciniform morphologies. STEM images show the individual particle sizes. The results of the DLS measurements are shown below in Table 4.

TABLE 4

| Record | Z-Ave (d · nm) | PdI | PdI as % of Z-Ave | Scattering Angle (°) | Mean Count Rate (kcps) | Diffusion Coefficient (μ²/s) | Derived Count Rate (kcps) |
|---|---|---|---|---|---|---|---|
| Sample A1 | 170.8 | 0.111 | 0.065% | 173 | 231.8 | 2.88 | 18380.5 |
| Sample A2 | 169 | 0.142 | 0.084% | 173 | 231.1 | 2.91 | 18319.8 |
| Sample A3 | 167.9 | 0.135 | 0.080% | 173 | 229.5 | 2.93 | 18191.8 |
| Sample B1 | 118.5 | 0.172 | 0.145% | 173 | 368.3 | 4.15 | 101846 |
| Sample B2 | 118.9 | 0.192 | 0.161% | 173 | 358.3 | 4.14 | 99100.7 |
| Sample B3 | 119.9 | 0.175 | 0.146% | 173 | 337.4 | 4.11 | 93319.9 |

Data for the three measurements of each of the two formulations is shown below in Tables 5-10. FIGS. 13 to 18 plot the data in Tables 5-10 respectively.

TABLE 5

| Sample A1 | |
|---|---|
| Intensities (%) | Sizes (d · nm) |
| 0.00 | 0.40 |
| 0.00 | 0.46 |
| 0.00 | 0.54 |
| 0.00 | 0.62 |
| 0.00 | 0.72 |
| 0.00 | 0.83 |
| 0.00 | 0.96 |
| 0.00 | 1.12 |
| 0.00 | 1.29 |
| 0.00 | 1.50 |
| 0.00 | 1.74 |
| 0.00 | 2.01 |
| 0.00 | 2.33 |
| 0.00 | 2.70 |
| 0.00 | 3.12 |
| 0.00 | 3.62 |
| 0.00 | 4.19 |
| 0.00 | 4.85 |
| 0.00 | 5.62 |
| 0.00 | 6.50 |
| 0.00 | 7.53 |
| 0.00 | 8.72 |
| 0.00 | 10.10 |

TABLE 5-continued

Sample A1

| Intensities (%) | Sizes (d · nm) |
|---|---|
| 0.00 | 11.70 |
| 0.00 | 13.54 |
| 0.00 | 15.69 |
| 0.00 | 18.17 |
| 0.00 | 21.04 |
| 0.00 | 24.36 |
| 0.00 | 28.21 |
| 0.00 | 32.67 |
| 0.00 | 37.84 |
| 0.00 | 43.82 |
| 0.00 | 50.75 |
| 0.00 | 58.77 |
| 0.00 | 68.06 |
| 0.60 | 78.82 |
| 2.50 | 91.28 |
| 5.60 | 105.70 |
| 9.40 | 122.40 |
| 12.80 | 141.80 |
| 15.10 | 164.20 |
| 15.60 | 190.10 |
| 14.20 | 220.20 |
| 11.40 | 255.00 |
| 7.60 | 295.30 |
| 4.00 | 342.00 |
| 1.30 | 396.10 |
| 0.00 | 458.70 |
| 0.00 | 531.20 |
| 0.00 | 615.10 |
| 0.00 | 712.40 |
| 0.00 | 825.00 |
| 0.00 | 955.40 |
| 0.00 | 1106.00 |
| 0.00 | 1281.00 |
| 0.00 | 1484.00 |
| 0.00 | 1718.00 |
| 0.00 | 1990.00 |
| 0.00 | 2305.00 |
| 0.00 | 2669.00 |
| 0.00 | 3091.00 |
| 0.00 | 3580.00 |
| 0.00 | 4145.00 |
| 0.00 | 4801.00 |
| 0.00 | 5560.00 |
| 0.00 | 6439.00 |
| 0.00 | 7456.00 |
| 0.00 | 8635.00 |
| 0.00 | 10000.00 |

TABLE 6

Sample A2

| Intensities (%) | Sizes (d · nm) |
|---|---|
| 0.00 | 0.40 |
| 0.00 | 0.46 |
| 0.00 | 0.54 |
| 0.00 | 0.62 |
| 0.00 | 0.72 |
| 0.00 | 0.83 |
| 0.00 | 0.96 |
| 0.00 | 1.12 |
| 0.00 | 1.29 |
| 0.00 | 1.50 |
| 0.00 | 1.74 |
| 0.00 | 2.01 |
| 0.00 | 2.33 |
| 0.00 | 2.70 |
| 0.00 | 3.12 |
| 0.00 | 3.62 |
| 0.00 | 4.19 |
| 0.00 | 4.85 |
| 0.00 | 5.62 |
| 0.00 | 6.50 |
| 0.00 | 7.53 |
| 0.00 | 8.72 |
| 0.00 | 10.10 |
| 0.00 | 11.70 |
| 0.00 | 13.54 |
| 0.00 | 15.69 |
| 0.00 | 18.17 |
| 0.00 | 21.04 |
| 0.00 | 24.36 |
| 0.00 | 28.21 |
| 0.00 | 32.67 |
| 0.00 | 37.84 |
| 0.00 | 43.82 |
| 0.00 | 50.75 |
| 0.00 | 58.77 |
| 0.20 | 68.06 |
| 1.70 | 78.82 |
| 4.30 | 91.28 |
| 7.30 | 105.70 |
| 10.10 | 122.40 |
| 12.00 | 141.80 |
| 12.90 | 164.20 |
| 12.60 | 190.10 |
| 11.50 | 220.20 |
| 9.60 | 255.00 |
| 7.40 | 295.30 |
| 5.10 | 342.00 |
| 3.10 | 396.10 |
| 1.60 | 458.70 |
| 0.60 | 531.20 |
| 0.10 | 615.10 |
| 0.00 | 712.40 |
| 0.00 | 825.00 |
| 0.00 | 955.40 |
| 0.00 | 1106.00 |
| 0.00 | 1281.00 |
| 0.00 | 1484.00 |
| 0.00 | 1718.00 |
| 0.00 | 1990.00 |
| 0.00 | 2305.00 |
| 0.00 | 2669.00 |
| 0.00 | 3091.00 |
| 0.00 | 3580.00 |
| 0.00 | 4145.00 |
| 0.00 | 4801.00 |
| 0.00 | 5560.00 |
| 0.00 | 6439.00 |
| 0.00 | 7456.00 |
| 0.00 | 8635.00 |
| 0.00 | 10000.00 |

TABLE 7

Sample A3

| Intensities (%) | Sizes (d · nm) |
|---|---|
| 0.00 | 0.40 |
| 0.00 | 0.46 |
| 0.00 | 0.54 |
| 0.00 | 0.62 |
| 0.00 | 0.72 |
| 0.00 | 0.83 |
| 0.00 | 0.96 |
| 0.00 | 1.12 |
| 0.00 | 1.29 |
| 0.00 | 1.50 |
| 0.00 | 1.74 |

TABLE 7-continued

| Sample A3 | |
|---|---|
| Intensities (%) | Sizes (d · nm) |
| 0.00 | 2.01 |
| 0.00 | 2.33 |
| 0.00 | 2.70 |
| 0.00 | 3.12 |
| 0.00 | 3.62 |
| 0.00 | 4.19 |
| 0.00 | 4.85 |
| 0.00 | 5.62 |
| 0.00 | 6.50 |
| 0.00 | 7.53 |
| 0.00 | 8.72 |
| 0.00 | 10.10 |
| 0.00 | 11.70 |
| 0.00 | 13.54 |
| 0.00 | 15.69 |
| 0.00 | 18.17 |
| 0.00 | 21.04 |
| 0.00 | 24.36 |
| 0.00 | 28.21 |
| 0.00 | 32.67 |
| 0.00 | 37.84 |
| 0.00 | 43.82 |
| 0.00 | 50.75 |
| 0.00 | 58.77 |
| 0.00 | 68.06 |
| 0.30 | 78.82 |
| 2.80 | 91.28 |
| 7.10 | 105.70 |
| 11.60 | 122.40 |
| 15.00 | 141.80 |
| 16.30 | 164.20 |
| 15.50 | 190.10 |
| 13.00 | 220.20 |
| 9.40 | 255.00 |
| 5.70 | 295.30 |
| 2.60 | 342.00 |
| 0.70 | 396.10 |
| 0.00 | 458.70 |
| 0.00 | 531.20 |
| 0.00 | 615.10 |
| 0.00 | 712.40 |
| 0.00 | 825.00 |
| 0.00 | 955.40 |
| 0.00 | 1106.00 |
| 0.00 | 1281.00 |
| 0.00 | 1484.00 |
| 0.00 | 1718.00 |
| 0.00 | 1990.00 |
| 0.00 | 2305.00 |
| 0.00 | 2669.00 |
| 0.00 | 3091.00 |
| 0.00 | 3580.00 |
| 0.00 | 4145.00 |
| 0.00 | 4801.00 |
| 0.00 | 5560.00 |
| 0.00 | 6439.00 |
| 0.00 | 7456.00 |
| 0.00 | 8635.00 |
| 0.00 | 10000.00 |

TABLE 8

| Sample B1 | |
|---|---|
| Intensities (%) | Sizes (d · nm) |
| 0.00 | 0.40 |
| 0.00 | 0.46 |
| 0.00 | 0.54 |
| 0.00 | 0.62 |
| 0.00 | 0.72 |
| 0.00 | 0.83 |
| 0.00 | 0.96 |
| 0.00 | 1.12 |
| 0.00 | 1.29 |
| 0.00 | 1.50 |
| 0.00 | 1.74 |
| 0.00 | 2.01 |
| 0.00 | 2.33 |
| 0.00 | 2.70 |
| 0.00 | 3.12 |
| 0.00 | 3.62 |
| 0.00 | 4.19 |
| 0.00 | 4.85 |
| 0.00 | 5.62 |
| 0.00 | 6.50 |
| 0.00 | 7.53 |
| 0.00 | 8.72 |
| 0.00 | 10.10 |
| 0.00 | 11.70 |
| 0.00 | 13.54 |
| 0.00 | 15.69 |
| 0.00 | 18.17 |
| 0.00 | 21.04 |
| 0.00 | 24.36 |
| 0.00 | 28.21 |
| 0.00 | 32.67 |
| 0.00 | 37.84 |
| 0.60 | 43.82 |
| 1.70 | 50.75 |
| 3.50 | 58.77 |
| 5.60 | 68.06 |
| 7.70 | 78.82 |
| 9.60 | 91.28 |
| 11.00 | 105.70 |
| 11.70 | 122.40 |
| 11.60 | 141.80 |
| 10.70 | 164.20 |
| 9.10 | 190.10 |
| 7.10 | 220.20 |
| 5.00 | 255.00 |
| 3.00 | 295.30 |
| 1.50 | 342.00 |
| 0.50 | 396.10 |
| 0.00 | 458.70 |
| 0.00 | 531.20 |
| 0.00 | 615.10 |
| 0.00 | 712.40 |
| 0.00 | 825.00 |
| 0.00 | 955.40 |
| 0.00 | 1106.00 |
| 0.00 | 1281.00 |
| 0.00 | 1484.00 |
| 0.00 | 1718.00 |
| 0.00 | 1990.00 |
| 0.00 | 2305.00 |
| 0.00 | 2669.00 |
| 0.00 | 3091.00 |
| 0.00 | 3580.00 |
| 0.00 | 4145.00 |
| 0.00 | 4801.00 |
| 0.00 | 5560.00 |
| 0.00 | 6439.00 |
| 0.00 | 7456.00 |
| 0.00 | 8635.00 |
| 0.00 | 10000.00 |

TABLE 9

Sample B2

| Intensities (%) | Sizes (d · nm) |
| --- | --- |
| 0.00 | 0.40 |
| 0.00 | 0.46 |
| 0.00 | 0.54 |
| 0.00 | 0.62 |
| 0.00 | 0.72 |
| 0.00 | 0.83 |
| 0.00 | 0.96 |
| 0.00 | 1.12 |
| 0.00 | 1.29 |
| 0.00 | 1.50 |
| 0.00 | 1.74 |
| 0.00 | 2.01 |
| 0.00 | 2.33 |
| 0.00 | 2.70 |
| 0.00 | 3.12 |
| 0.00 | 3.62 |
| 0.00 | 4.19 |
| 0.00 | 4.85 |
| 0.00 | 5.62 |
| 0.00 | 6.50 |
| 0.00 | 7.53 |
| 0.00 | 8.72 |
| 0.00 | 10.10 |
| 0.00 | 11.70 |
| 0.00 | 13.54 |
| 0.00 | 15.69 |
| 0.00 | 18.17 |
| 0.00 | 21.04 |
| 0.00 | 24.36 |
| 0.00 | 28.21 |
| 0.00 | 32.67 |
| 0.00 | 37.84 |
| 0.40 | 43.82 |
| 1.80 | 50.75 |
| 3.90 | 58.77 |
| 6.40 | 68.06 |
| 8.50 | 78.82 |
| 10.10 | 91.28 |
| 11.00 | 105.70 |
| 11.10 | 122.40 |
| 10.60 | 141.80 |
| 9.60 | 164.20 |
| 8.20 | 190.10 |
| 6.60 | 220.20 |
| 4.90 | 255.00 |
| 3.40 | 295.30 |
| 2.00 | 342.00 |
| 1.00 | 396.10 |
| 0.40 | 458.70 |
| 0.10 | 531.20 |
| 0.00 | 615.10 |
| 0.00 | 712.40 |
| 0.00 | 825.00 |
| 0.00 | 955.40 |
| 0.00 | 1106.00 |
| 0.00 | 1281.00 |
| 0.00 | 1484.00 |
| 0.00 | 1718.00 |
| 0.00 | 1990.00 |
| 0.00 | 2305.00 |
| 0.00 | 2669.00 |
| 0.00 | 3091.00 |
| 0.00 | 3580.00 |
| 0.00 | 4145.00 |
| 0.00 | 4801.00 |
| 0.00 | 5560.00 |
| 0.00 | 6439.00 |
| 0.00 | 7456.00 |
| 0.00 | 8635.00 |
| 0.00 | 10000.00 |

TABLE 10

Sample B3

| Intensities (%) | Sizes (d · nm) |
| --- | --- |
| 0.00 | 0.40 |
| 0.00 | 0.46 |
| 0.00 | 0.54 |
| 0.00 | 0.62 |
| 0.00 | 0.72 |
| 0.00 | 0.83 |
| 0.00 | 0.96 |
| 0.00 | 1.12 |
| 0.00 | 1.29 |
| 0.00 | 1.50 |
| 0.00 | 1.74 |
| 0.00 | 2.01 |
| 0.00 | 2.33 |
| 0.00 | 2.70 |
| 0.00 | 3.12 |
| 0.00 | 3.62 |
| 0.00 | 4.19 |
| 0.00 | 4.85 |
| 0.00 | 5.62 |
| 0.00 | 6.50 |
| 0.00 | 7.53 |
| 0.00 | 8.72 |
| 0.00 | 10.10 |
| 0.00 | 11.70 |
| 0.00 | 13.54 |
| 0.00 | 15.69 |
| 0.00 | 18.17 |
| 0.00 | 21.04 |
| 0.00 | 24.36 |
| 0.00 | 28.21 |
| 0.00 | 32.67 |
| 0.00 | 37.84 |
| 0.10 | 43.82 |
| 1.20 | 50.75 |
| 3.20 | 58.77 |
| 5.70 | 68.06 |
| 8.30 | 78.82 |
| 10.40 | 91.28 |
| 11.80 | 105.70 |
| 12.30 | 122.40 |
| 11.80 | 141.80 |
| 10.50 | 164.20 |
| 8.70 | 190.10 |
| 6.70 | 220.20 |
| 4.60 | 255.00 |
| 2.80 | 295.30 |
| 1.40 | 342.00 |
| 0.50 | 396.10 |
| 0.10 | 458.70 |
| 0.00 | 531.20 |
| 0.00 | 615.10 |
| 0.00 | 712.40 |
| 0.00 | 825.00 |
| 0.00 | 955.40 |
| 0.00 | 1106.00 |
| 0.00 | 1281.00 |
| 0.00 | 1484.00 |
| 0.00 | 1718.00 |
| 0.00 | 1990.00 |
| 0.00 | 2305.00 |
| 0.00 | 2669.00 |
| 0.00 | 3091.00 |
| 0.00 | 3580.00 |
| 0.00 | 4145.00 |
| 0.00 | 4801.00 |
| 0.00 | 5560.00 |
| 0.00 | 6439.00 |
| 0.00 | 7456.00 |
| 0.00 | 8635.00 |
| 0.00 | 10000.00 |

Dispersant Identification

Dispersants and surfactants have been tested in order to identify appropriate candidates. The technical requirements were to create a stable fluid based dispersion where the particles did not settle to the bottom of a vessel; the dispersion did not "break" when diluted in water or solvent; the dispersion did not gel in or after manufacturing; the dispersion remained fluid and viscous in manufacturing; the dispersion did not separate from water or solvent after manufacturing; and the dispersant and formula aided in achieving submicron particle sizes in manufacturing.

To achieve the most eco-friendly compositions, preferred dispersants were selected to be petroleum free, low petroleum or petroleum-derived product free; have as much bio-renewable content as possible; have zero to low VOC content and be non-toxic to aquatic life, ecology and human health.

Specific dispersants work better with specific chars, and a dispersion may work better for specific applications. The addition of a defoamer helps to keep the viscosity low for manufacturing. Also, it may be beneficial to add an anticoagulant to prevent settling of pigment particles in a dispersion while in storage.

In one example a pigment is made from pulverized wood biochar. It is compatible with dispersants that are made of modified, structured or unstructured acrylic or acrylate polymers or co-polymers with pigment affinic groups. Acrylic co-polymers are branched or comb-shaped and create a matrix around pigment particles, keeping them suspended in solutions. This pigment is also compatible with hydroxyl-functional carboxylic acid esters with pigment affinic groups.

In a second example a pigment is made from pulverized wood biochar. It is compatible with sodium lignosulfonate or lignosulfonic acid, sodium salt-based dispersants and hydroxyl-functional carboxylic acid esters with pigment affinic groups.

Both the first and second example dispersions are compatible with bio-renewable rape seed oil as a defoamer.

It has been found that the use of an unstructured or structured acrylic polymer or co-polymer dispersant or an unstructured or structured acrylate polymer or co-polymer dispersant or sodium lignosulfonate or lignosulfonic acid, sodium salt-based dispersants may enhance the blackness $M_y$ of plant char pigments.

It will be appreciated that compositions described herein may also be devoid of a dispersant. In other words, the disclosure also relates to a pigment formulation that includes carbonaceous particulate matter derived from biochar and a milling fluid, and is devoid of a dispersant.

It is contemplated that a pigment formulation may be provided as carbonaceous particulate matter derived from biochar having the following characteristics:

Randomized samples of the carbonaceous particulate matter imaged on a scanning transmission electron micrography two-dimensional micrograph from a Sputtering process with a magnification of at least 50,000× reveals that the particles are sphere-like in shape;

Randomized samples of the carbonaceous particulate matter imaged on a scanning transmission electron micrography two-dimensional micrograph from a Lacey STEM process with a magnification of at least 50,000× reveals that the particles have a circularity greater than about 0.8 with a standard deviation less than about 30% of the circularity;

Randomized samples of the carbonaceous particulate matter imaged on a scanning transmission electron micrography two-dimensional micrograph from a Lacey STEM process with a magnification of at least 50,000× reveals that the particles have smooth surfaces;

Randomized samples of the carbonaceous particulate matter imaged on a scanning transmission electron micrography two-dimensional micrograph from a Lacey STEM process with a magnification of at least 50,000× reveals that the carbonaceous particulate matter has a chained aciniform morphology;

Randomized samples of the carbonaceous particulate matter reveal that the particles have a diameter that is less than about 100 nm or less than about 80 nm or less than about 60 nm with a standard deviation that is less than 25% of the mean diameter and a standard deviation that is less than 25% of the mean diameter as calculated from spatial measurements of a randomized sample of the particles imaged on a two-dimensional micrograph from a Lacey STEM process with a magnification of at least 50,000×;

Randomized samples of the carbonaceous particulate matter reveal that the particles have a mean diameter that is in a range between about 10 nm and about 100 nm or in a range between about 10 nm and about 80 nm or in a range from 10 nm to 60 nm with a standard deviation that is less than 25% of the mean diameter as calculated from spatial measurements of a randomized sample of the particles imaged on a scanning transmission electron micrography two-dimensional micrograph from Lacey STEM process with a magnification of at least 50,000×;

Randomized samples of the carbonaceous particulate matter reveal that particles have a circularity that is at least about 0.8 or at least about 0.75 with a standard deviation that is less than 30% of the circularity as calculated from spatial measurements of a randomized sample of the particles imaged on a scanning transmission electron micrography two-dimensional micrograph from Lacey STEM process with a magnification of at least 50,000×;

Randomize samples of the carbonaceous particulate matter reveal that the surface area of the carbonaceous particulate matter is greater or equal to about 300 $m^2g^{-1}$ as measured by static volumetric gas physisorption.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A pigment dispersion formulation comprising carbonaceous particulate matter derived from biochar, a dispersant, micro fibrillated cellulose, and a milling fluid.

2. A pigment dispersion formulation comprising carbonaceous particulate matter derived from biochar, a dispersant and a milling fluid, wherein under laser excitation at a wavelength of 514.5 nm with an 1800 gr/mm grating the formulation exhibits a Raman spectra with a G position between about 1580 ($cm^{-1}$) and about 1605 ($cm^{-1}$) and an I(D)/I(G) ratio between about 2.49 and about 3.07.

3. A pigment dispersion formulation comprising carbonaceous particulate matter derived from biochar, a dispersant and a milling fluid, wherein blackness (My) is greater than about 250.

4. A pigment dispersion formulation comprising carbonaceous particulate matter derived from biochar, a dispersant and a milling fluid, wherein jetness (Mc) is greater than about 250.

5. A pigment dispersion formulation comprising carbonaceous particulate matter derived from biochar, a dispersant and a milling fluid, wherein tint strength is greater or equal to 94%.

6. A pigment dispersion formulation comprising carbonaceous particulate matter derived from biochar, a dispersant and a milling fluid, wherein color fastness is 8.

7. A mill base for milling a pigment comprising carbonaceous particulate matter derived from biochar, said mill base comprising said pigment and further comprising a dispersant, micro fibrillated cellulose, and a milling fluid.

8. A pigment dispersion formulation comprising carbonaceous particulate matter derived from biochar, a 100% active dispersant, micro fibrillated cellulose and an activator/vehicle.

9. A pigment dispersion formulation comprising carbonaceous particulate matter derived from biochar, a 100% active dispersant, and an activator/vehicle, wherein under laser excitation at a wavelength of 514.5 nm with an 1800 gr/mm grating the formulation exhibits a Raman spectra with a G position between about 1580 ($cm^{-1}$) and about 1605 ($cm^{-1}$) and an I(D)/I(G) ratio between about 2.49 and about 3.07.

10. A pigment dispersion formulation comprising carbonaceous particulate matter derived from biochar, a 100% active dispersant, and an activator/vehicle, wherein blackness (My) is greater than about 250.

11. A pigment dispersion formulation comprising carbonaceous particulate matter derived from biochar, a 100% active dispersant, and an activator/vehicle, wherein jetness (Mc) is greater than about 250.

12. A pigment dispersion formulation comprising carbonaceous particulate matter derived from biochar, a 100% active dispersant, and an activator/vehicle, wherein tint strength is greater or equal to 94%.

13. A pigment dispersion formulation comprising carbonaceous particulate matter derived from biochar, a 100% active dispersant, and an activator/vehicle, wherein color fastness is 8.

14. The mill base of claim 7, further comprising an activator/vehicle, wherein the dispersant is a 100% active dispersant.

15. A pigment dispersion formulation comprising carbonaceous particulate matter derived from biochar, a dispersant and a milling fluid, wherein a randomized sample of the carbonaceous particulate matter has a size distribution with a mean size (Z-Ave (d·nm)) that is within a range between 118 nm and 171 nm and a polydispersity index that is within a range between 0.05% and 0.15% of the mean size (Z-Ave (d·nm)).

16. A pigment dispersion formulation comprising carbonaceous particulate matter derived from biochar, a 100% active dispersant, and an activator/vehicle, wherein a randomized sample of the carbonaceous particulate matter has a size distribution with a mean size (Z-Ave (d·nm)) that is within a range between 118 nm and 171 nm and a polydispersity index that is within a range between 0.05% and 0.15% of the mean size (Z-Ave (d·nm)).

* * * * *